US008290822B2

(12) United States Patent
Gade et al.

(10) Patent No.: US 8,290,822 B2
(45) Date of Patent: Oct. 16, 2012

(54) PRODUCT CONFIGURATION SERVER FOR EFFICIENTLY DISPLAYING SELECTABLE ATTRIBUTE VALUES FOR CONFIGURABLE PRODUCTS

(75) Inventors: Gopikrishna Gade, Hillsborough, NJ (US); Lakshmikant Nalamati, Andhra Pradesh (IN); Anant Iyer, Somerset, NJ (US); Venkatesh Sankaranarayanan, Hyderabad (IN)

(73) Assignee: ValueMomentum, Inc., South Plainfield, NJ (US)

( * ) Notice: Subject to any disclaimer, the term of this patent is extended or adjusted under 35 U.S.C. 154(b) by 68 days.

(21) Appl. No.: 12/806,812

(22) Filed: Aug. 20, 2010

(65) Prior Publication Data

US 2012/0047045 A1 Feb. 23, 2012

(51) Int. Cl.
*G06Q 30/00* (2006.01)
(52) U.S. Cl. ...................................... 705/26.1
(58) Field of Classification Search ................... 705/26.1
See application file for complete search history.

(56) References Cited

U.S. PATENT DOCUMENTS

| | | | |
|---|---|---|---|
| 7,584,079 B2 | 9/2009 | Lichtenberg et al. | |
| 7,739,635 B2 | 6/2010 | Baumgartner et al. | |
| 2002/0073001 A1* | 6/2002 | Palmer et al. | 705/29 |
| 2006/0112119 A1 | 5/2006 | Vian et al. | |
| 2010/0050145 A1 | 2/2010 | Baumgartner et al. | |

OTHER PUBLICATIONS

Fujitsu Launches New Sleek and Light Stylistic ST6012 Slate Tablet PC for On-Your-Feet Computing; First Slate With Embedded, Biometric Pre-Boot Authentication Delivers Added Data Protection; Marketwire. Toronto: Dec. 16, 2008; http://proquest.umi.com/pqdweb?did=1612835461&sid=3&Fmt=2&clientId=19649 &RQT=309&VName=PQD.*
International Search Report and Written Opinion for PCT/US2011/048428 dated Mar. 20, 2012.
ILOG JConfigurator White Paper, Technical White Paper, Jun. 2003, pp. 1-24.
Fernadez A. J. et al, A Comparative Study of Eight Constraint Programming Languages or the Boolean and Finite Domains, Constraints, 5, 275-301 (2000).
Schenner et al., Modifying configurations with model finding, 2003.
Junker et al., The Logic of ILOG (J)Configurator: Combining Constraint Programming with a Description Logic, 2003.
ILOG JConfigurator High-Performance, Lightweight Java Configuration Engine, Jul. 2001.
Anderson, "An Introduction to Binary Decision Diagrams", Lecture notes for 49285 Advanced Algorithms E97, Oct. 1997.

* cited by examiner

*Primary Examiner* — Mila Airapetian
(74) *Attorney, Agent, or Firm* — Lerner, David, Littenberg, Krumholz & Mentlik, LLP

(57) ABSTRACT

A computer-implemented system leverages binary decision diagram (BDD) structures to provide selectable attribute values for one or more configurable products. The BDD structures may define offering attribute nodes and non-offering attribute nodes. The offering attribute nodes may represent product attribute values selectable by the user based on product configuration rules, and the non-offering attribute nodes may represent product attribute values not selectable by the user based on the product configuration rules. The computer-implemented system may further include at least one memory storage device that stores one or more product configuration rules used to define permissible product configurations and attributes of the products. By evaluating the BDD structures and the product configuration rules, the computer-implemented system may prepare a customized set of product records for transmission to a user, wherein the customized set of product records contains product attribute values corresponding to the offering attribute nodes.

58 Claims, 36 Drawing Sheets

| | Coverages | Limits | Deductibles | Attributes | Inclusion/Exclusion | Forms |
|---|---|---|---|---|---|---|
| | Personal Auto | | | Policy Term [1▼] | | |
| ☑ | Liability | | | | | |
| ☑ | Bodily Injury | BI Per Accident Limit [40.0▼]<br>BI Per Person Limit [20.0▼] | | | | |
| ☑ | Medical Payment | MP Limit [20▼] | | | | |
| ☑ | Property Damage | PD Limit [15▼] | | | | |
| | Own Damage | | | | | |
| ☐ | Collision | | Coll Ded [50▼] | | | |
| ☐ | Comprehensive | | Comp Ded [50▼] | | | |
| ☑ | Medical Expenses | Medical Expenses Limit [50▼] | | | | |
| ☑ | BloodMoney | BloodMoneyLimit [40000] | | | | |

Execute Rules

☐ Configured Product
Executable Event [DriverRuleEvent ▼]
[ExecuteRules]

[Back] [get Quote]

FIG. 24

| PersonalAuto:1 | | | | | | |
|---|---|---|---|---|---|---|
| | Coverages | Limits | Deductibles | Attributes | Inclusion/Exclusion | Forms |
| ☑ | Personal Auto | | | Policy Term [1▼] | | |
| ☑ | Liability | | | | | |
| ☑ | Bodily Injury | BI Per Accident Limit [40.0▼]<br>BI Per Person Limit [20.0▼] | | | | |
| ☑ | Medical Payment | MP Limit [20▼] | | | | |
| ☑ | Property Damage | PD Limit [15▼] | | | | |
| | Own Damage | | | | | |
| ☐ | Collision | | Coll Ded [150▼] | | | |
| ☐ | Comprehensive | | Comp Ded [50▼] | | | |
| ☑ | Medical Expenses | Medical Expenses Limit [50▼] | | | | |
| ☑ | BloodMoney | BloodMoneyLimit [40000▼] | | | | |

Execute Rules
☐ Configured Product
Executable Event [DriverRuleEvent ▼]
[ExecuteRules]

[Back] [get Quote]

2402 (callout)
2304, 2306 (callouts)

FIG. 25

| PersonalAuto:1 | Coverages | Limits | Deductibles | Attributes | Inclusion/Exclusion | Forms |
|---|---|---|---|---|---|---|
| ☐ | Personal Auto | | | Policy Term [1▼] | | |
| ☐ | Liability | | | | | |
| ☐ | Bodily Injury | BI Per Accident Limit [40.0▼]<br>BI Per Person Limit [40.0▼] | | | | |
| ☐ | Medical Payment | MP Limit [20▼] | | | | |
| ☐ | Property Damage | PD Limit [15▼] | | | | |
| ☐ | Own Damage | | | | | |
| ☐ | Collision | | Coll Ded [50▼] | | | |
| ☐ | Comprehensive | | Comp Ded [50▼] | | | |
| ☐ | Medical Expenses | Medical Expenses Limit [50▼] | | | | |
| ☐ | BloodMoney | BloodMoneyLimit [400000▼] | | | | |

─── Execute Rules ───

☐ Configured Product
Executable Event [DriverRuleEvent ▼]
[ExecuteRules]

[Back] [get Quote]

LocationBased Property.1

| Coverages | Limits | | Deductibles | | Attributes | |
|---|---|---|---|---|---|---|
| | | 3004 | Voluntary Deductible For Non | 1000000.0 | | |
| | | | Voluntary Deductible For A06 | 2000000.0 | | |
| Standard Fire Special Perils | | | | | | |
| Material Damage | Fire Sum Insured | Derived | | | | |
| Building Structure | Building Structure Sum Insured | 100000.0 * | | | Building Escalation Percentage | |
| Furniture Fixture Fittings | Furn. Fixture Fittings Sum Insured | 100000.0 * | | | Furniture Fixture Fittings Escalation | |
| Plant Machinery | Plant Machinery Sum Insured | 100000.0 * | | | Plant Machinery Escalation Per | |
| Plinth Foundation | Plinth Foundation Sum Insured | 100000.0 * | 3006 | | Do you want Fire Cover for Plinth | Yes |
| Specially Covered Items | Specially Covered Items Sum Insured | 100000.0 * | | | | |
| Stocks | Stock In Open Sum Insured | 100000.0 * | | | | |
| | Stock In Godwon Sum Insured | 100000.0 * | | | | |
| | Stock In Process Sum Insured | 100000.0 * | | | | |
| | Stock Sum Insured | 800000.0 | | | | |
| Add On Perils | | | | | | |
| EarthQuake | EarthQuake Sum Insured | 800000.0 | 3008 | | Class of Construction | Superior Class |
| | | | | | No of Floors | Up to 3 Floors |
| Riot, Strike Malicious Damage | Riot Strike Malicious Damage Sum Insured | 800000.0 | | | Class of Construction | Superior Class |

| LocationBased Property:1 | Coverages | Limits | | Deductibles | | Attributes | |
|---|---|---|---|---|---|---|---|
| ☑ | Standard Fire Special Perils | 3004 | | Voluntary Deductible For Non | 1000000.0 | | |
| | | | | Voluntary Deductible For AOG | 2000000.0 | | |
| ☑ | Material Damage | Fire Sum Insured | Derived | 50000.0 / 1000000.0 | | | |
| ☑ | Building Structure | Building Structure Sum Insured | 100000.0 * | 2000000.0 / 3000000.0 | | Building Escalation Percentage | |
| ☑ | Furniture Fixture Fittings | Furn. Fixture Fittings Sum Insured | 100000.0 * | 8000000.0 | | Furniture Fixture Fittings Escalation | |
| ☑ | Plant Machinery | Plant Machinery Sum Insured | 100000.0 * | | | Plant Machinery Escalation Per | |
| ☑ | Plinth Foundation | Plinth Foundation Sum Insured | 100000.0 * | | | Do you want Fire Cover for Plinth | Yes |
| ☐ | Specially Covered Items | Specially Covered Items Sum Insured | 100000.0 * | 3006 | | | |
| | | Stock In Open Sum Insured | 100000.0 * | | | | |
| ☑ | Stocks | Stock In Godwon Sum Insured | 100000.0 * | | | | |
| | | Stock In Process Sum Insured | 100000.0 * | | | | |
| | | Stock Sum Insured | 800000.0 | | | | |
| ☑ | Add On Perils | | | | | | |
| ☑ | EarthQuake | EarthQuake Sum Insured | 800000.0 | 3008 | | Class of Construction | Superior Class |
| | | | | | | No of Floors | Up to 3 Floors |
| ☑ | Riot, Strike Malicious Damage | Riot Strike Malicious Damage Sum Insured | 800000.0 | | | Class of Construction | Superior Class |

FIG. 32

PRODUCT CONFIGURATION SERVER FOR EFFICIENTLY DISPLAYING SELECTABLE ATTRIBUTE VALUES FOR CONFIGURABLE PRODUCTS

BACKGROUND

With the advent of the Internet and high-speed networking, people prefer to purchase or view products using a network browser. These products may include tangible products, such as toys, clothing, electronic devices, jewelry, and other tangible products, as well as intangible products, such as insurance policies, cable television service subscriptions, magazine subscriptions, medical prescriptions, and other intangible products.

While viewing a tangible or intangible product, and before completing the purchase of the tangible or intangible product, a person generally prefers to tailor the tangible or intangible product to the person's needs and/or preferences. For example, a shopper may be using his or her network browser to view a bicycle being offered by an online merchant. The bicycle may have many attributes, such as color, height, male or female versions, available tires, construction materials, or other attributes. Using a network browser, the shopper may configure the bicycle according to these attributes. As another example, a shopper may be using his or her network browser to view a cable television service subscription for a cable television provider. The cable television service subscription may also have numerous attributes, such as available channels, different subscription tiers, renewal policies, or other attributes. A shopper may alter or change these attributes to view a cable television service subscription according to the shopper's preferences.

To offer a variety of products with configurable or selectable attributes, an online merchant ordinarily maintains a database of attributes and products on the merchant side of the transaction. However, as the number of offered products and selectable attributes increases, the amount of effort needed on the merchant side to process a request from a shopper to view configurable products also increases, sometimes exponentially. As the effort required on the merchant side increases, the amount of time spent by the shopper waiting to view a configured product also increases. Hence, current product configuration systems are insufficient for complex configurable products because of their inability to scale with increases to inventory or changes in the number of attributes for configuring a product, and in the necessity for the configuration processing to be done primarily on the merchant side of the transaction.

BRIEF SUMMARY

A system for caching previously identified electronic document resources is provided. In one aspect, the system comprises at least one memory storage device storing a set of product records that identify products potentially selectable by a user. The product records may comprise product attributes that represent one or more features of a product, wherein the product attributes comprise one or more attribute values. The memory storage device may also store one or more product configuration rules used to define permissible or impermissible product configurations and attributes of the products.

The system may further comprise at least one processor programmed to create one or more attribute binary decision diagram (BDD) structures representative of the product attributes. The BDD structures may include offering attribute nodes representative of product attribute values selectable by the user based on the product configuration rules and non-offering attribute nodes representative of product attribute values not selectable by the user based on the product configuration rules. The processor may also evaluate the BDD structures and prepare a customized set of product records for transmission to the user, wherein the customized set of product records contains product attribute values corresponding to the offering attribute nodes.

In one aspect, the processor may be further programmed to analyze the product configuration rules to determine whether the product attributes are involved in evaluating the product configuration rules. Moreover, the when the product attributes are involved in evaluating the product configuration rules, processor may be further programmed to generate and store the BDD structures in the memory storage device.

In another aspect, the at least one processor may be further programmed to assign a query-language formatted expression to each attribute node of at least one attribute BDD structure, wherein each of the query-language formatted expressions identifies the product attribute value corresponding to the attribute node of the assigned query-language formatted expression. The at least one processor may be further programmed to evaluate the at least one attribute BDD structure to identify whether at least one attribute node of the at least one attribute BDD structure is a non-offering attribute node. In addition, when the at least one attribute node of the at least one attribute BDD structure is identified as a non-offering attribute node, the at least one processor may be further programmed to evaluate the query-language formatted expression assigned to the at least one non-offering attribute node to identify a location of the product attribute value in a corresponding at least one product record. Furthermore, the at least one processor may customize at least one customized product record by including the product attribute value of the at least one product record in the at least one customized product record, and identifying that the product attribute value of the at least one customized product record is not selectable by the user.

In a further aspect, the at least one processor may be further programmed to assign a query-language formatted expression to the at least one attribute BDD structure, wherein the query-language formatted expression identifies the location of the product attribute represented by the at least one attribute BDD structure in a corresponding product record. In addition, the at least one processor may customize at least one customized product record by evaluating the query-language formatted expression to locate the at least one attribute in the corresponding product record, identifying whether a product attribute value for the at least one attribute has a corresponding non-offering node in the least one attribute BDD structure, and including the product attribute value of the at least one attribute of the corresponding product record in the at least one customized product record. Moreover, when the product attribute value of the at least one attribute has a corresponding non-offering node in the at least one attribute BDD structure, the at least one processor may customize the at least one customized product record by identifying that the product attribute value of the at least one customized product record is not selectable by the user.

In yet another aspect, the at least one processor may be further programmed to customize the at least one customized product record by including each product attribute value of the product attribute of the corresponding product record in the at least one customized product record, and for each product attribute value of the product attribute, identifying that the product attribute value of the at least one customized product record is not selectable by the user when the product attribute value of the product attribute has a corresponding non-offering node in the at least one attribute BDD structure.

In yet a further aspect, the query-language formatted expression is structured to navigate through an electronic document formatted according to an extensible markup language. In another aspect, at least one product record of the set of products records is structured according to a meta-language syntax, wherein the meta-language syntax comprises at least one element of data content and at least one element identifier that describes the type of content of the at least one element of data content.

In a further aspect, the at least one memory storage device is segmented into at least one product record repository storing the set of product records, wherein each product record of the set of product records is structured according to a meta-language syntax. The at least one memory storage may also be segmented into at least one product configuration rule repository storing the one or more product configuration rules, wherein the one or more product configuration rules are structured according to the meta-language syntax. Moreover, the meta-language syntax may comprise at least one element of data content and at least one element identifier that describes the type of content of the at least one element of data content. In addition, the meta-language syntax may comprise an extensible markup language.

In yet another aspect, at least one product configuration rule of the product configuration rules has a rule type selected from a group of rule types comprising a non-conditional rule type, wherein the non-conditional rule type comprises an action statement that is not dependent upon a conditional statement, a product conditional rule type, wherein the product conditional rule type comprises an action statement dependent upon a conditional statement comprising a product attribute value, and a customer conditional rule type, wherein the customer conditional rule type comprises an action statement dependent upon a conditional statement comprising a customer attribute value.

A computer-implemented method for providing selectable attribute values for one or more products is also provided. In one aspect, the computer-implemented method includes storing a set of product records in at least one memory storage device, wherein the set of product records identify products potentially selectable by a user. In addition, the product records may comprise product attributes that represent one or more features of a product, wherein the product attributes comprise one or more attribute values. The computer-implemented method may also include storing one or more product configuration rules in the at least one memory storage device, wherein the one or more product configuration rules are used to define permissible or impermissible product configurations and attributes of the products.

Furthermore, the computer-implemented method may include creating one or more attribute binary decision diagram (BDD) structures with at least one processor, wherein the BDD structures are representative of the product attributes. The BDD structures may include offering attribute nodes representative of product attribute values selectable by the user based on the product configuration rules, and non-offering attribute nodes representative of product attribute values not selectable by the user based on the product configuration rules.

Moreover, the computer-implemented may include evaluating the BDD structures with the at least one processor and preparing a customized set of product records for transmission to the user with the at least one processor, wherein the customized set of product records contains product attribute values corresponding to the offering attribute nodes.

In one aspect, the computer-implemented method includes analyzing with the at least one processor the product configuration rules to determine whether the product attributes are involved in evaluating the product configuration rules. The computer-implemented method may further include generating and storing the BDD structures in the memory storage device when the product attributes are involved in evaluating the product configuration rules.

In another aspect, the computer-implemented method may include assigning with the at least one processor a query-language formatted expression to each attribute node of at least one attribute BDD structure, wherein each of the query-language formatted expressions identifies the product attribute value corresponding to the attribute node of the assigned query-language formatted expression. In addition, the computer-implemented method may include evaluating with the at least one processor the at least one attribute BDD structure to identify whether at least one attribute node of the at least one attribute BDD structure is a non-offering attribute node. Furthermore, when the at least one attribute node of the at least one attribute BDD structure is identified as a non-offering attribute node, the computer-implemented method may include evaluating the query-language formatted expression assigned to the at least one non-offering attribute node to identify a location of the product attribute value in a corresponding at least one product record.

Additionally, the computer-implemented method may include customizing at least one customized product record by including the product attribute value of the at least one product record in the at least one customized product record and identifying that the product attribute value of the at least one customized product record is not selectable by the user.

In a further aspect, the computer-implemented method may include assigning with the at least one processor a query-language formatted expression to the at least one attribute BDD structure, wherein the query-language formatted expression identifies the location of the product attribute represented by the at least one attribute BDD structure in a corresponding product record. The computer-implemented method may also include customizing at least one customized product record by evaluating the query-language formatted expression to locate the at least one attribute in the corresponding product record and identifying whether a product attribute value for the at least one attribute has a corresponding non-offering node in the least one attribute BDD structure. In addition, the computer-implemented method may provide for including the product attribute value of the at least one attribute of the corresponding product record in the at least one customized product record, and when the product attribute value of the at least one attribute has a corresponding non-offering node in the at least one attribute BDD structure, identifying that the product attribute value of the at least one customized product record is not selectable by the user.

In yet another aspect, customizing the at least one customized product record may provide for including each product attribute value of the product attribute of the corresponding product record in the at least one customized product record, and for each product attribute value of the product attribute, identifying that the product attribute value of the at least one customized product record is not selectable by the user when the product attribute value of the product attribute has a corresponding non-offering node in the at least one attribute BDD structure.

In yet a further aspect of the computer-implemented method, the query-language formatted expression is structured to navigate through an electronic document formatted according to an extensible markup language.

In another aspect of the computer-implemented method, at least one product record of the set of products records is structured according to a meta-language syntax, wherein the meta-language syntax comprises at least one element of data content and at least one element identifier that describes the type of content of the at least one element of data content.

In a further aspect of the computer-implemented method, the at least one memory storage device is segmented into at least one product record repository storing the set of product records, wherein each product record of the set of product records is structured according to a meta-language syntax. In addition, at least one product configuration rule repository storing the one or more product configuration rules, wherein the one or more product configuration rules are structured according to the meta-language syntax. The meta-language syntax may include at least one element of data content and at least one element identifier that describes the type of content of the at least one element of data content. Moreover, the meta-language syntax may include an extensible markup language.

In yet another aspect of the computer-implemented method, at least one product configuration rule of the product configuration rules has a rule type selected from a group of rule types comprising: a non-conditional rule type, wherein the non-conditional rule type comprises an action statement that is not dependent upon a conditional statement, a product conditional rule type, wherein the product conditional rule type comprises an action statement dependent upon a conditional statement comprising a product attribute value, and a customer conditional rule type, wherein the customer conditional rule type comprises an action statement dependent upon a conditional statement comprising a customer attribute value.

A computer-implemented system for efficiently displaying selectable attribute values for a product based on a provided criterion is also provided. In one aspect, the computer-implemented system includes at least one memory storage device storing a set of product records that identify products potentially selectable by a user. The product records may include product attributes that represent one or more features of the product, wherein the product attributes comprise one or more attribute values. The memory storage device may also store one or more product configuration rules used to define permissible or impermissible product configurations and attributes of the products.

The computer-implemented system may also include at least one processor programmed to analyze at least one product configuration rule to determine whether at least one product attribute of at least one product record is used in evaluating the at least one product configuration rule. The at least one processor may also be programmed to create an attribute binary decision diagram (BDD) Structure representative of the at least one product attribute of the least one product record when the at least one processor determines that the at least one product attribute is used in evaluating the at least one product configuration rule. The at least one processor may further be programmed to evaluate the attribute BDD structure and prepare a customized set of product records for transmission to the user, wherein the customized set of product records contains product attribute values selectable by the user.

In one aspect of the computer-implemented system, the attribute BDD structure includes an offering attribute node representative of a product attribute value selectable by the user based on evaluating the at least one product configuration rule. In another aspect of the computer-implemented system, the attribute BDD structure includes a non-offering attribute node representative of a product attribute value that is not selectable by the user based on evaluating the at least one product configuration rule.

In one aspect of the computer-implemented system, the at least one processor may be further programmed to assign a query-language formatted expression to the at least one attribute BDD structure, wherein the query-language formatted expression identifies the location of the product attribute represented by the at least one attribute BDD structure in a corresponding product record. The at least one processor may also be programmed to customize at least one customized product record by evaluating the query-language formatted expression to locate the at least one attribute in the corresponding product record, identifying whether a product attribute value for the at least one attribute has a corresponding non-offering node in the least one attribute BDD structure, and including the product attribute value of the at least one attribute of the corresponding product record in the at least one customized product record. In addition, when the product attribute value of the at least one attribute has a corresponding non-offering node in the at least one attribute BDD structure, the at least one processor may be programmed to identify that the product attribute value of the at least one customized product record is not selectable by the user.

In another aspect of the computer-implemented system, the query-language formatted expression is structured to navigate through an electronic document formatted according to an extensible hypertext markup language.

In a further aspect of the computer-implemented system, at least one product record of the set of products records may be structured according to a meta-language syntax, wherein the meta-language syntax may include at least one element of data content and at least one element identifier that describes the type of content of the at least one element of data content.

In yet another aspect of the computer-implemented system, the at least one memory storage device may be segmented into at least one product record repository storing the set of product records, wherein each product record of the set of product records may be structured according to a meta-language syntax. The at least one memory storage device may also include at least one product configuration rule repository storing the one or more product configuration rules, wherein the one or more product configuration rules are structured according to the meta-language syntax. The meta-language syntax may include at least one element of data content and at least one element identifier that describes the type of content of the at least one element of data content. In addition, the meta-language syntax may include an extensible hypertext markup language.

In yet a further aspect of the computer-implemented system, at least one product configuration rule of the product configuration rules has a rule type selected from a group of rule types including: a non-conditional rule type, wherein the non-conditional rule type comprises an action statement that is not dependent upon a conditional statement, a product conditional rule type, wherein the product conditional rule type comprises an action statement dependent upon a conditional statement comprising a product attribute value, and a customer conditional rule type, wherein the customer conditional rule type comprises an action statement dependent upon a conditional statement comprising a customer attribute value.

A computer-implemented method for efficiently displaying selectable attribute values for a product based on a provided criterion is also provided. In one aspect, the computer-implemented method includes storing in at least one memory storage device a set of product records that identify products potentially selectable by a user. The product records may include product attributes that represent one or more features of the product, wherein the product attributes comprise one or more attribute values. The computer-implemented method may also include storing in the at least one memory storage device one or more product configuration rules used to define permissible or impermissible product configurations and attributes of the products.

The computer-implemented method may also include analyzing with at least one processor at least one product configuration rule to determine whether at least one product attribute of at least one product record is used in evaluating the at least one product configuration rule. The computer-implemented method may further include creating with the at least one processor an attribute binary decision diagram (BDD) structure representative of the at least one product attribute of the least one product record when the at least one processor determines that the at least one product attribute is used in evaluating the at least one product configuration rule. Additionally, the computer-implemented method may include evaluating with the at least one processor the attribute BDD structure, and preparing with the at least one processor a customized set of product records for transmission to the user, wherein the customized set of product records contains product attribute values selectable by the user.

In one aspect of the computer-implemented method, the attribute BDD structure may include an offering attribute node representative of a product attribute value selectable by the user based on evaluating the at least one product configuration rule. In another aspect of the computer-implemented method the attribute BDD structure may include a non-offering attribute node representative of a product attribute value that is not selectable by the user based on evaluating the at least one product configuration rule.

In another aspect, the computer-implemented method may include assigning with the at least one processor a query-language formatted expression to the at least one attribute BDD structure. The query-language formatted expression may identify the location of the product attribute represented by the at least one attribute BDD structure in a corresponding product record. The computer-implemented method may also include customizing at least one customized product record by evaluating the query-language formatted expression to locate the at least one attribute in the corresponding product record, identifying whether a product attribute value for the at least one attribute has a corresponding non-offering node in the least one attribute BDD structure, and including the product attribute value of the at least one attribute of the corresponding product record in the at least one customized product record. When the product attribute value of the at least one attribute has a corresponding non-offering node in the at least one attribute BDD structure, the computer-implemented method may provide for identifying that the product attribute value of the at least one customized product record is not selectable by the user.

In a further aspect of the computer-implemented method, the query-language formatted expression may be structured to navigate through an electronic document formatted according to an extensible hypertext markup language.

In yet another aspect of the computer-implemented method, at least one product record of the set of products records is structured according to a meta-language syntax, wherein the meta-language syntax may include at least one element of data content and at least one element identifier that describes the type of content of the at least one element of data content.

In yet a further aspect of the computer-implemented method, the at least one memory storage device may be segmented into at least one product record repository storing the set of product records, wherein each product record of the set of product records is structured according to a meta-language syntax, and at least one product configuration rule repository storing the one or more product configuration rules, wherein the one or more product configuration rules are structured according to the meta-language syntax. The meta-language syntax may include at least one element of data content and at least one element identifier that describes the type of content of the at least one element of data content. Moreover, the meta-language syntax may include an extensible hypertext markup language.

In another aspect of the computer-implemented method, at least one product configuration rule of the product configuration rules has a rule type selected from a group of rule types including: a non-conditional rule type, wherein the non-conditional rule type comprises an action statement that is not dependent upon a conditional statement, a product conditional rule type, wherein the product conditional rule type comprises an action statement dependent upon a conditional statement comprising a product attribute value, and a customer conditional rule type, wherein the customer conditional rule type comprises an action statement dependent upon a conditional statement comprising a customer attribute value.

Another computer-implemented system for efficiently displaying selectable attribute values for a product based on a provided criterion is also provided. In one aspect, the computer-implemented system includes at least one memory storage device storing a set of product records that identify products potentially selectable by a user. The product records may include product attributes that represent one or more features of the product, wherein the product attributes comprise one or more attribute values. The at least one memory storage device may also store a set of product configuration rules used to define permissible or impermissible product configurations and attributes of the products. The product configuration rules may include a non-conditional rule that comprises an action statement that is not dependent upon a conditional statement, a product conditional rule that comprises an action statement dependent upon a conditional statement comprising a product attribute value, and a customer conditional rule that comprises an action statement dependent upon a conditional statement comprising a customer attribute value.

The computer-implemented system may also include at least one server-side processor programmed to receive a customer attribute value for a customer attribute, and prepare a customized product record for transmission to a customer by evaluating the non-conditional rule and evaluating the customer conditional rule using the received customer attribute value as the customer attribute value. The at least one server-side processor may also be programmed to prepare a client-side set of product configuration rules, wherein the client-side set of product configuration rules comprises the product conditional rule.

The computer-implemented system may also include at least one client-side processor programmed to receive the client-side set of product configuration rules, to receive the customized product record, to receive a selection of a product attribute value for a product attribute of the customized product record, and to evaluate the client-side set of product conditional rules using the received product attribute value as the product attribute value for the product conditional rule. The at least one client-side processor may also display a product corresponding to the customized product record having a permissible product attribute value based on the evaluation of the product conditional rule.

In one aspect of the computer-implemented system, the set of product configuration rules further includes a product conditional aggregation rule programmed to perform at least one of an aggregation function or a summation function based on a user selection. In addition, the at least one client-side processor may be further programmed to evaluate the product conditional aggregation rule, wherein the user selection of the product conditional aggregation rule comprises the received selection of the product attribute value for the product attribute of the customized product record. In addition, the at least one client-side processor may display the product corresponding to the customized product record based on the evaluation of the product conditional aggregation rule.

In another aspect of the computer-implemented system, the at least one product configuration rule of the client-side set of product configuration rules is structured according to a meta-language syntax. The meta-language syntax may include at least one element of data content and at least one element identifier that describes the type of content of the at least one element of data content. Moreover, the customized product record may also be structured according to the meta-language syntax.

In a further aspect of the computer-implemented system, the at least one client-side processor may include an expansion module that interacts with a client application, wherein the client application transmits a request to the at least one server-side processor for information regarding a product corresponding to at least one product record of the set of product records.

In another aspect of the computer-implemented system, the at least one server-side processor may be further programmed to analyze at least one product configuration rule to determine whether at least one product attribute of at least one product record is used in evaluating the at least one product configuration rule. In addition, the at least one server-side processor may create an attribute binary decision diagram (BDD) structure representative of the at least one product attribute of the least one product record when the at least one processor determines that the at least one product attribute is used in evaluating the at least one product configuration rule. Furthermore, the at least one server-side processor may evaluate the attribute BDD structure to further prepare the customized product record.

In a further aspect of the computer-implemented system of claim the attribute BDD structure may include an offering attribute node representative of a product attribute value selectable by the user based on evaluating the at least one product configuration rule. In addition, the BDD structure may include a non-offering attribute node representative of a product attribute value that is not selectable by the user based on evaluating the at least one product configuration rule.

In yet another aspect of the computer-implemented system, the at least one server-side processor may be further programmed to assign a query-language formatted expression to the at least one attribute BDD structure, wherein the query-language formatted expression identifies the location of the product attribute represented by the at least one attribute BDD structure in a corresponding product record. The at least one server-side processor may also be programmed to customize at least one customized product record by evaluating the query-language formatted expression to locate the at least one attribute in the corresponding product record and identifying whether a product attribute value for the at least one attribute has a corresponding non-offering node in the least one attribute BDD structure. The at least one server-side processor may also be programmed to include the product attribute value of the at least one attribute of the corresponding product record in the at least one customized product record. Moreover, when the product attribute value of the at least one attribute has a corresponding non-offering node in the at least one attribute BDD structure, the at least one server-side processor may be programmed to identify that the product attribute value of the at least one customized product record is not selectable by the user.

In yet a further aspect of the computer-implemented system, the query-language formatted expression is structured to navigate through an electronic document formatted according to an extensible hypertext markup language.

Another computer-implemented method for efficiently displaying selectable attribute values for a product based on a provided criterion is also provided. The computer-implemented method may include storing in at least one memory storage device a set of product records that identify products potentially selectable by a user. The product records may include product attributes that represent one or more features of the product, wherein the product attributes comprise one or more attribute values. The computer-implemented method may also include storing in the at least one memory storage device a set of product configuration rules used to define permissible or impermissible product configurations and attributes of the products. The set of product configuration rules may include a non-conditional rule that comprises an action statement that is not dependent upon a conditional statement, a product conditional rule that comprises an action statement dependent upon a conditional statement comprising a product attribute value, and a customer conditional rule that comprises an action statement dependent upon a conditional statement comprising a customer attribute value.

The computer-implemented method may also include receiving with at least one server-side processor a customer attribute value for a customer attribute and preparing with the at least one server-side processor a customized product record for transmission to a customer by evaluating the non-conditional rule, evaluating the customer conditional rule using the received customer attribute value as the customer attribute value, and preparing a client-side set of product configuration rules, wherein the client-side set of product configuration rules comprises the product conditional rule.

The computer-implemented method may further include receiving with at least one client-side processor the client-side set of product configuration rules, receiving with the at least one client-side processor the customized product record, and receiving with the at least one client-side processor a selection of a product attribute value for a product attribute of the customized product record. The computer-implemented method may additionally include evaluating with the at least one client-side processor the client-side set of product conditional rules using the received product attribute value as the product attribute value for at least one of the client-side set of product configuration rules and displaying with a display device a product corresponding to the customized product record having a permissible product attribute value based on the evaluation of the client-side set of product configuration rules.

In one aspect of the computer-implemented method, the set of product configuration rules may further include a product conditional aggregation rule programmed to perform at least one of an aggregation function or a summation function based on a user selection. The computer-implemented method may further include evaluating with the client-side processor the product conditional aggregation rule, wherein the user selection of the product conditional aggregation rule comprises the received selection of the product attribute value for the product attribute of the customized product record. In addition, the computer-implemented method may include displaying the product corresponding to the customized product record based on the evaluation of the product conditional aggregation rule.

In another aspect of the computer-implemented method, the at least one product configuration rule of the client-side set of product configuration rules may be structured according to a meta-language syntax. The meta-language syntax may include at least one element of data content and at least one element identifier that describes the type of content of the at least one element of data content. In a further aspect of the computer-implemented method, the customized product record may be structured according to the meta-language syntax.

In yet another aspect, the computer-implemented method may include transmitting with the at least one client-side processor a request to the server-side processor for information regarding a product corresponding to at least one product record of the set of product records.

In yet a further aspect, the computer-implemented method may include analyzing with the at least one server-side processor at least one product configuration rule to determine whether at least one product attribute of at least one product record is used in evaluating the at least one product configuration rule. The computer-implemented method may also include creating with the at least one server-side processor an attribute binary decision diagram (BDD) structure representative of the at least one product attribute of the least one product record when the at least one server-side processor determines that the at least one product attribute is used in evaluating the at least one product configuration rule. The computer-implemented method may also include evaluating with the at least one server-side processor the attribute BDD structure to further prepare the customized product record.

In another aspect of the computer-implemented method, the attribute BDD structure may include an offering attribute node representative of a product attribute value selectable by the user based on evaluating the at least one product configuration rule. Moreover, the attribute BDD structure may include a non-offering attribute node representative of a product attribute value that is not selectable by the user based on evaluating the at least one product configuration rule.

In yet a further aspect, the computer-implemented method may include assigning with the at least one server-side processor a query-language formatted expression to the at least one attribute BDD structure, wherein the query-language formatted expression identifies the location of the product attribute represented by the at least one attribute BDD structure in a corresponding product record. The computer-implemented method may also include customizing with the at least one server-side processor at least one customized product record by evaluating the query-language formatted expression to locate the at least one attribute in the corresponding product record and identifying whether a product attribute value for the at least one attribute has a corresponding non-offering node in the least one attribute BDD structure. Customizing the at least one customized product record may also further comprise including the product attribute value of the at least one attribute of the corresponding product record in the at least one customized product record, and when the product attribute value of the at least one attribute has a corresponding non-offering node in the at least one attribute BDD structure, identifying that the product attribute value of the at least one customized product record is not selectable by the user.

In yet another aspect of the computer-implemented method, the query-language formatted expression may be structured to navigate through an electronic document formatted according to an extensible hypertext markup language.

BRIEF DESCRIPTION OF THE DRAWINGS

FIGS. 16-21 illustrate various examples of a graphical user interface for defining one or more product configuration rules of varying product configuration rule types.

Figure 22:
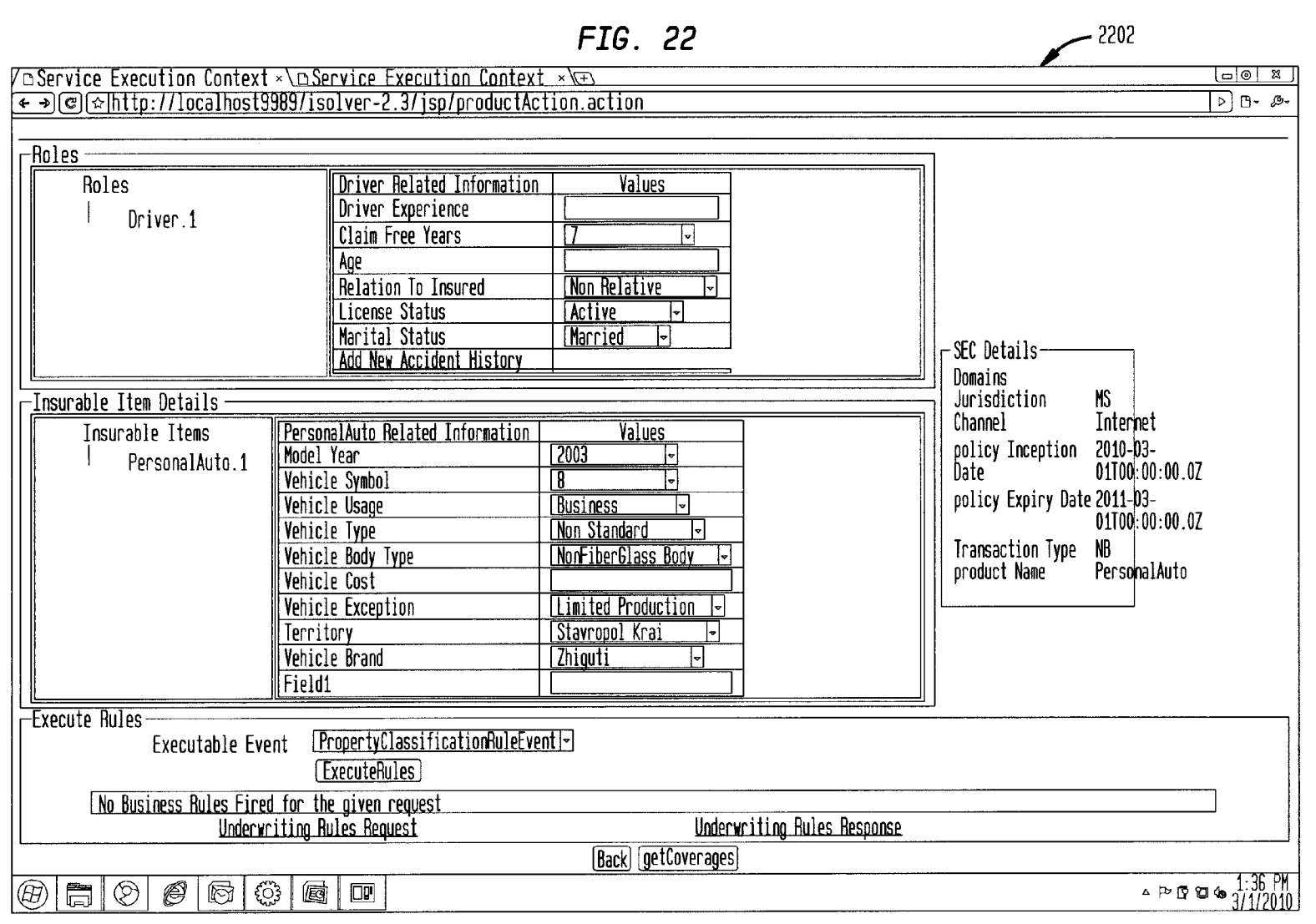

FIG. 22 illustrates one example of a graphical user interface for providing and selecting customer attribute values for a configurable product.

FIGS. 23-24 illustrate various examples of graphical user interfaces displayed during the evaluation of a product configuration rule of the non-conditional product rule type.

FIGS. 25-29 illustrate various examples of graphical user interfaces displayed during the evaluation of product configuration rules of the product conditional rule type.

FIGS. 30-32 illustrate various examples of graphical user interfaces displayed during the evaluation of a product configuration rule of the product aggregation rule type.

DETAILED DESCRIPTION

Figure 1:
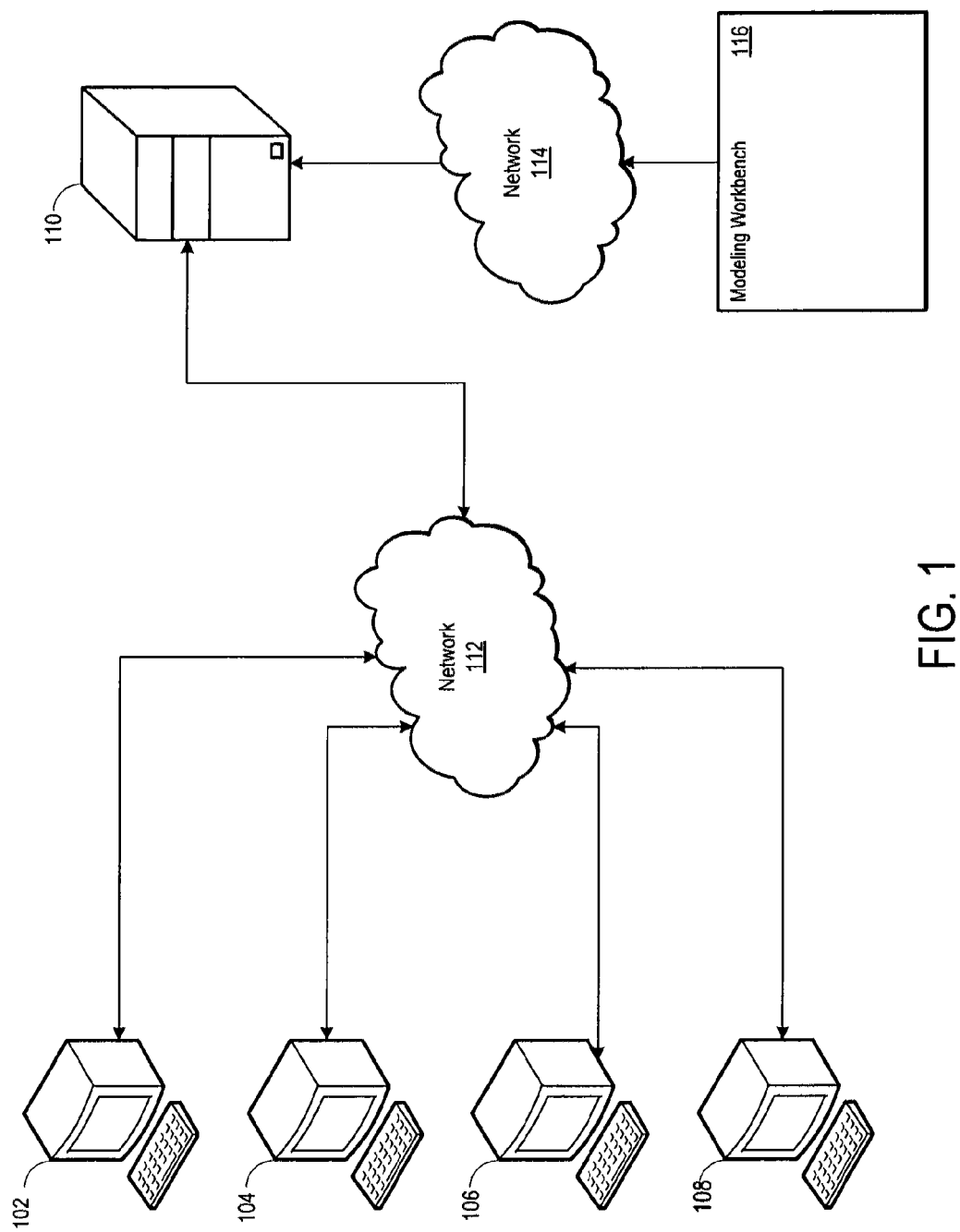
FIG. 1 illustrates one example of client devices in communication with a product configuration server to configure one or more configurable products.

FIG. 1 illustrates one example of client devices 102-108 in communication with a product configuration server 110 via a network 112. The client devices 102-108 may be any type of client devices, such as mobile devices, desktop computers, laptop computers, netbooks, tablet computers, or any other type of client device. Examples of mobile devices include personal display assistants, smartphones, cellular phones, portable digital music players, or any other type of mobile device.

The client devices 102-108 may request to view and/or configure one or more configurable products from the product configuration server 110. The one or more configurable products may be any type of product, including tangible or intangible products. A tangible product may be a physical object or an object discernable by touching. Examples of tangible products include toys, such as action figures and dolls, software products, sporting equipment, such as bicycles, baseballs, and basketballs, eating utensils, kitchen appliances, automobiles, or any other tangible products now known or later developed. An intangible product may be non-physical object, such as a subscription or service. Examples of intangible products include cable television service subscriptions, insurance policies, magazine subscriptions, a vehicle repair service, a home cleaning service, or any other intangible product now known or later developed.

The product configuration server 110 is operative to display one or more configurable products to the client devices 102-108. The product configuration server 110 may be accessible via a network 112, which may be a Wide Area Network ("WAN") such as the Internet, a Local Area Network ("LAN") such as an intranet, or a combination of WANs and LANs. In one implementation, the product configuration server 110 is an online shopping provider operative to provide a website on the Internet for an online shopping forum for access by the client devices 102-108. In this implementation, customers may use the client devices 102-108 to purchase configurable products sold by the online shopping provider. In another implementation, the product configuration server 110 is a corporate intranet server operative to display configurable products to the client devices 102-108. In this implementation, the users of the client devices 102-108 may be employees of a corporation using the corporate intranet server. Other implementations of the product configuration server 110 are also possible, such as providing a website for a beverage vendor, a website for a clothing vendor, or other type of website. Moreover, the interactions between the product configurations server 110 and the client devices 102-108 may be extended to any system or group of systems operative to process services.

The product configuration server 110 and the client devices 102-108 may communicate through the network 112. For example, one or more client devices 102-108 may transmit a request for one or more configurable products from the product configuration server 110. In response, the product configuration server 110 may display one or more configurable products to the client devices 102-108. Moreover, a software application may be available from the product configuration server 110 to facilitate the display and configuration of the configurable products displayed by the product configuration server 110. The software application may be a software extension to an existing application used to display the configurable products offered by the product configuration server 110, such as a software extension for a network browser. As explained below, the software extension may be a plug-in for an Internet browser, such as Mozilla Firefox, available from the Mozilla Foundation, located in Mountain View, Calif.

Although FIG. 1 illustrates that the client devices 102-108 are in communication with a single product configuration server 110, the client devices 102-108 may be in communication with multiple product configuration servers (not shown) via the network 112. Furthermore, the client devices 102-108 may be in communication with each other. In one implementation, a client device 102-108 may be a product configuration server 110. Similarly, in another implementation, a product configuration server 110 may be a client device 102-108. In addition, a single product configuration server 110 may include multiple product configuration servers, and a single client device, such as a client device 102, may include multiple client devices.

The product configuration server 110 may also be in communication with a modeling workbench 116 via a network 114. As with network 112, the network 114 may be a WAN, a LAN, or a combination of WANs and LANs. Moreover, the network 114 may be the network 112.

The modeling workbench 116 is operative to define one or more aspects used in displaying or preparing a configurable product. For example, the modeling workbench 116 may include a modeling environment operative to define various models, such as product models, rule models, and/or pricing models. Moreover, the modeling workbench 116 may include intuitive templates to capture configurable product features, parts and potential relations between one or more configurable products. Although FIG. 1 illustrates that the modeling workbench 116 is in communication with the product configuration server 110, the modeling workbench 116 may be in communication with one or more alternative or additional systems and/or components, such as one or more client devices 102-108. Additional details regarding the modeling workbench 116 are further explained with reference to FIG. 3.

Figure 2:
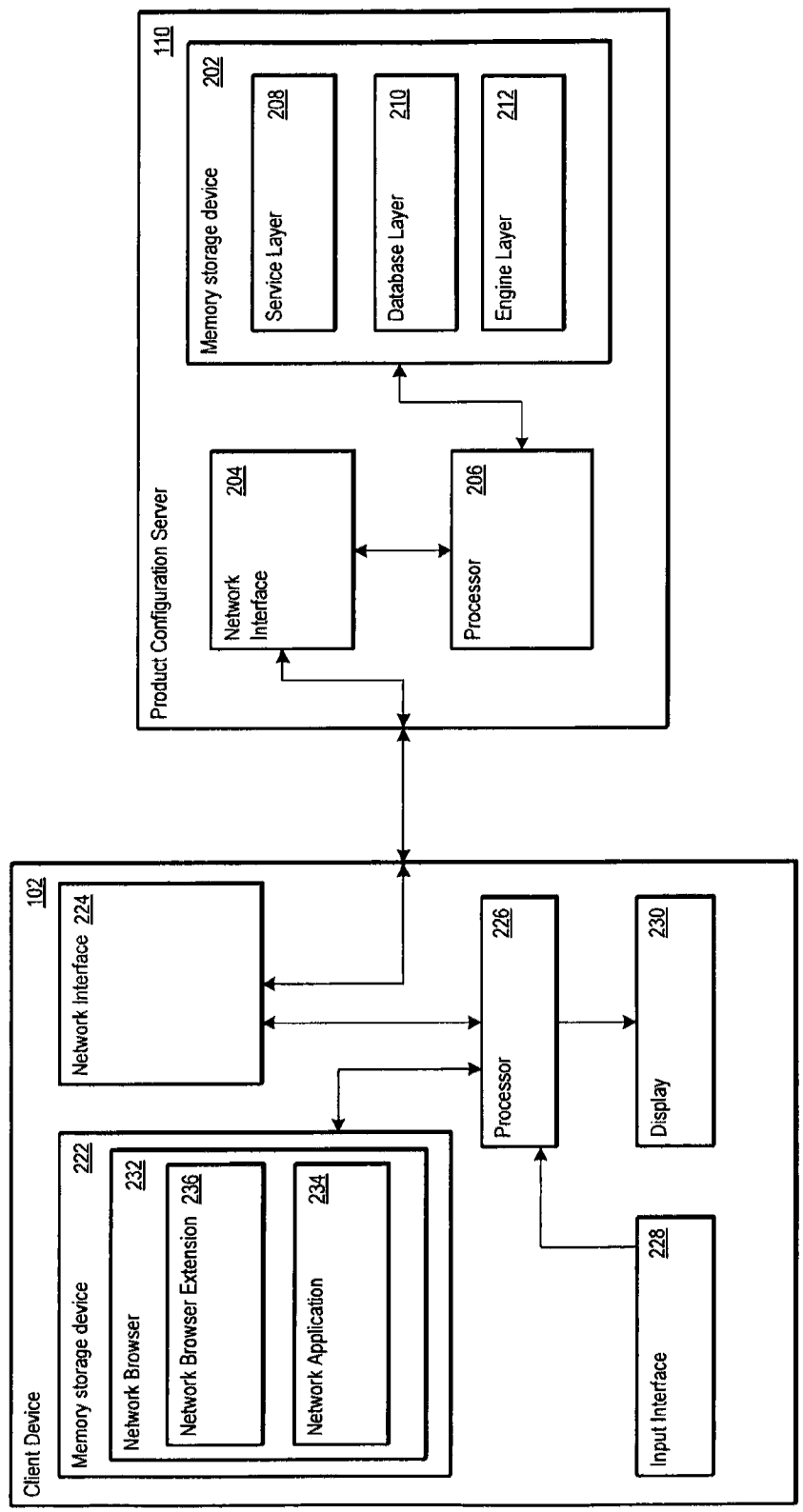
FIG. 2 illustrates one example of a client device in communication with the product configuration server of FIG. 1.

FIG. 2 illustrates one example of a client device 102 in communication with the product configuration server 110 from FIG. 1. In one implementation, the product configuration server 110 includes a computer-readable medium 202, a network interface 204, and a processor 206. The computer-readable medium 202 may be segmented into various layers 208-212 for displaying configurable products. In one implementation, the layers 208-212 may include a service layer 208, a database layer 210, and an engine layer 212. Alternative layers are also possible.

The layers 208-212 may facilitate the display and configuration of one or more configurable products. The server layer 208 may be operative to provide services for displaying the one or more configurable products. As discussed with reference to FIG. 4, these services may include a product service, a rules service, a pricing service, and a publishing service. The configurable product server 110 may provide access to the services of the service layer 208 to one or more external components such as the client devices 102-108 and/or the modeling workbench 116, but also to one or more layers, such as the database layer 210 and/or the engine layer 212.

The database layer 210 may be operative to define one or more databases for storing information to facilitate the configuration of one or more configurable products. As discussed with reference to FIG. 4, the database layer 210 may include one or more databases, such as a product and product rules database, a rules database, and/or a pricing database. The database layer 210 may be accessible by one or more of the other layers, such as the engine layer 212 or the service layer 208. Moreover, the database layer 210 may be accessible to an external component or system, such as the client device 102 and/or the modeling workbench 116 directly or indirectly, such as through the service layer 208.

The engine layer 212 may be operative to provide one or more engines for accessing and/or evaluating information to facilitate the configuration of one or more configurable products. As discussed with reference to FIG. 4, the engine layer 212 may include one or more engines, such as a product engine, a rules engine, and/or a pricing engine. The engine layer 212 may also include a versioning engine operative to select a version of a rule according to one or more rule attributes. Moreover, the engine layer 212 may be accessible by one or more of the other layers, such as the service layer 208 or the database layer 210. Moreover, the engine layer 212 may be accessible to an external component or system, such as the client device 102 and/or the modeling workbench 116 directly or indirectly, such as through the service layer 208. One example of commercially available product that implements the engines 410-416 established in the engine layer 212 is the iFoundry software product, available from ValueMomentum, Inc, located in South Plainfield, N.J., United States.

The processor 206 is operative to process requests for one or more configurable products that the processor 206 may receive from the client device 102. Moreover, the processor 206 may facilitate the operation and/or accessing of one or more components of the layers 208-212. For example, the processor 206 may facilitate the operation and/or control of one or more engines of the engine layer 212. Similarly, the processor 206 may facilitate the accessing of one or more databases of the database layer 210. Additional operations performable by the processor 206 are also possible.

The network interface 204 is operative to communicate with the processor 206 and to transmit requests for one or more configurable products to the client device 102. Moreover, the network interface 204 may receive selections of product attributes from the client device 102 and pass the selection of these attributes to the processor 206 for further processing and/or evaluation. In addition, the network interface 204 may communicate selected rules and/or product configuration information to the client device 102 for processing by the client device 102. The network interface 204 may be any type of wired network interface, wireless network interface, or a combination of wired and wireless network interfaces.

The client device 102 includes one or more components for transmitting requests for configurable products to the product configuration server 110. The client device 102 may also include one or more components for configuring a configurable product or for sending selected product attribute values to the product configuration server 110 for configuring a product. The client device 102 may also include one or more components for selecting product attributes and for displaying a configurable product with various selected product attributes. In one implementation, the client device 102 includes a memory storage device 222, a network interface 224, a processor 226, an input interface 228, and a display 230. Moreover, the client device 102 may include one or more components of the product configuration server 110. Alternative components are also possible.

The network interface 224 is operative to communicate with the processor 226 and to receive information regarding one or more configurable products from the product configuration server 110. For example, the network interface 224 may receive a customized product record representative of a configurable product that the product configuration server 110 has customized based on one or more product configuration rules and/or customer attributes, such as the customer's geographic location, age, area of employment, or other customer attribute. In addition, the network interface 224 may also receive a client-side set of product configuration rules that may be evaluated by the processor 226 in configuring the configurable product represented by a received customized product record. Moreover, during the product configuration process, the network interface 224 may transmit selections of product attributes to the product configuration server 110 for evaluation by the product configuration server processor 206. In general, the network interface 204 may communicate product configuration rules, product attribute values, customer attribute values, or any other information relating to the product configuration process. The network interface 204 may be any type of wired network interface, wireless network interface, or a combination of wired and wireless network interfaces.

The processor 226 is operative to receive and process information from the network interface 224, the memory storage device 222, the input interface 228, or combinations thereof. For example, the processor 226 may be operative to receive the client-side set of product configuration rules from the network interface 224 and evaluate the client-side set of product configuration rules. In addition, the processor 226 may receive a selection of product attribute values, customer attribute values, or any other type of attribute values from the input interface 228.

The input interface 228 is operative to receive input from a user. However, the input interface 228 may also receive input from another component, machine, computer system, or any other device operative to provide input. The input interface 228 may be a tactile interface, such as a keyboard or mouse, an audio interface, such as a microphone, a machine interface, such as a Universal Serial Bus ("USB") interface, or any other combination of input interfaces now known or later developed.

The display device 230 is operative to display information regarding the configurable product being configured by the client device 102. As explained with reference to FIGS. 16-35 the client device may display a graphical user interface for accessing the client device 102, the product configuration server 110, or both. For example, the display device 230 may display the graphical user interface for network browser stored on the client device 102 and operative to configure a configurable product, such as by receiving selections of one or more product attribute values. As another example, the display device 230 may display a graphical user interface operative to receive input regarding the configuration of a product, the configuration of pricing model, the configuration of a product configuration rule, or any other configuration information used by the product configuration server 110. In other words, the display device 230 may display a graphical user interface to remotely administer the databases of the database layer 210 of the product configuration server 110.

The memory storage device 222 is operative to store a network browser 232 operative to interact with the product configuration server 110, such as by receiving a customized product record corresponding to a configurable product, by receiving a client-side set of product configuration rules, or by transmitting selected product attribute values, or any other type of interaction with the product configuration server 110. In general, interactions between the network browser 232 and the product configuration server 110 may include the direct or indirect transmission and receipt of any kind of information between the network browser 232 and the product configuration server 110. The network browser 232 may be any type of network browser 232, such as an Internet browser, a LAN browser, a file system browser, or any other type of browser now known or later developed. In one implementation, the network browser 232 is Mozilla Firefox. However, the network browser 232 may also be another browser, such as Internet Explorer, Windows Explorer, or any other type of browser.

In interacting with the product configuration server 110, the network browser 232 may include the display of a network application 234 operating in conjunction with a network browser extension 236. However, in some circumstances, the network application 234 may operate without the assistance of the network browser extension 236.

The network application 234 is operative to display a configurable product and receive product attribute values for configuring the configurable product. The underlying code for the network application 234 may reside on the product configuration server 110, but when the network browser 232 interacts with the product configuration server 110, a portion of that code may be transmitted to the client device 110 to act as the network application 234. Exemplary images of a graphical user interface for the network application 234 are discussed with reference to FIGS. 23-35. The network application 234 may be an application written in one or more computer-programming languages, such as Java, C#, PHP, JSP, C, C++, JavaScript, XML, or any other computer programming language now known or later developed.

As discussed above, the product configuration server 110 may provide the network browser extension 236 as a software extension to the network browser 232. In one implementation, the network browser extension 236 is a software application written in a computer-programming language, such as Java, C#, PHP, Silverlight, AJAX, JSP, C, C++, JavaScript, XML, or any other computer programming language now known or later developed. The network browser extension 236 may be operative to perform operations on the client device 102 to expedite the configuration of a configurable product. Moreover, the network browser extension 2336 For example, the network browser extension 236 may evaluate a client-side set of product configuration rules using selected one or more product attribute values to display a product corresponding to the selected attribute values. As the operations are performable by the network browser extension 236, the product configuration server 110 may be free to perform other operations for the client device 102 or other client devices interacting with the product configuration server 110. Moreover, because the network browser extension 236 offloads the evaluation of a selected set of product configuration rules onto the client device 102, the network application 234 may display a configured product more rapidly than if the product configuration server 110 were to perform the evaluation of the same set of production configuration rules.

Figure 3:
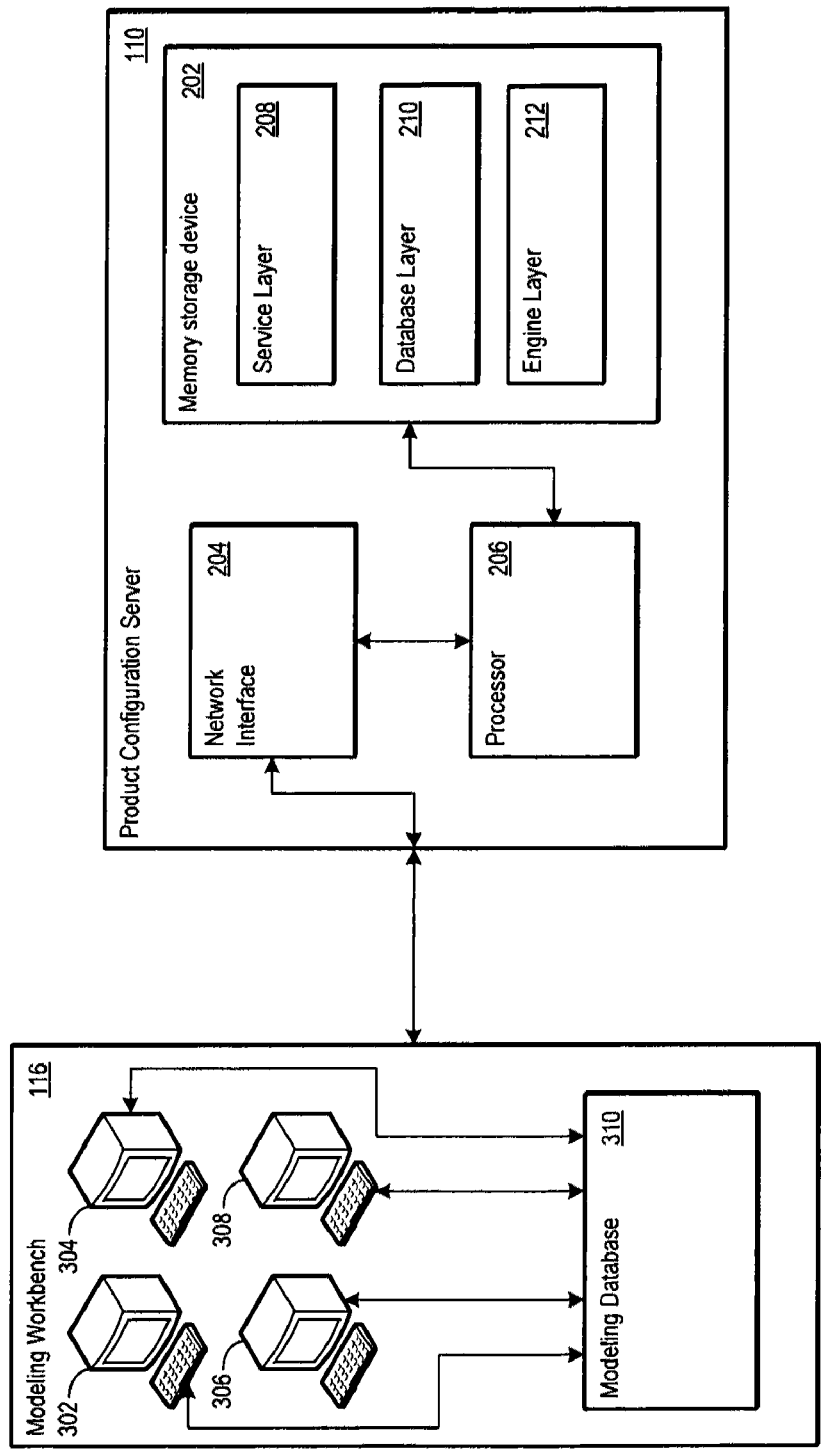
FIG. 3 illustrates one example of a modeling workbench in communication with the product configuration server of FIG. 1.

FIG. 3 illustrates one example of the modeling workbench 116 in communication with the product configuration server 110. In general, the modeling workbench 116 is a modeling environment operative to define configurable products, one or more product configuration rules, and one or more pricing models for the configurable products.

In one implementation, the modeling workbench 116 may include one or more client devices 302-308 in communication with a modeling database 310. The modeling database 310 is one example of a modeling repository. The modeling database 310 is operative to store one or more modeling database records that define models for the configurable products, models for one more product configuration rules, and one or more pricing models.

Moreover, the modeling workbench 116 may assist in the generation and management of one or more versions for a given model. Hence, any model defined by the modeling workbench 116 may have multiple versions.

By using a model, such as a configurable product model, a client device 302 may efficiently define multiple configurable products that are similarly structured. Hence, the client device 302 need not guess or make predictions about the type of attributes the configurable product should have. For example, the client device 302 may define a first cable television service subscription product and then a second cable television service subscription product, where each cable television product has a common set of attributes based on a cable television service subscription model stored in the modeling database 310. The attributes for a configurable product may represent the features of the configurable product, and each product attribute may have one or more product attribute values. In addition, the product structures for the one or more models may be further configured.

The modeling database 310 may leverage one or more syntaxes for implementing the one or more modeling database records. For example, the modeling database 310 may leverage a meta-language syntax that comprises at least one element of data content and at least one element identifier that describes the type of content of the at least one element of data content. Moreover, the meta-language syntax may include an extensible markup language ("XML"). In addition, the modeling database 310 may recognize additional languages, such as a Structured Query Language ("SQL").

The modeling workbench 116 may be used to define product configuration models for one or more product configuration rule types. In general, a product configuration rule may define the permissible and impermissible configurations for a configurable product. A product configuration rule may also define permissible and impermissible attribute values for a product configuration. Hence, when a configurable product is being configured, the configuration of that configurable product may be governed by one or more product configuration rules.

In one implementation, the modeling workbench 116 may be used to define four product configuration rule types. However, alternative product configuration rule types are also possible. The four product configuration rule types may include a non-conditional rule type, a product conditional rule type, a customer conditional rule type, and a product conditional aggregation rule type. Table 1 below clarifies the four rule types that may be defined. Table 2 provides examples of the rule types clarified by Table 1.

TABLE 1

Examples of Product Configuration Rule Types

| Rule Type | Structure | Description |
| --- | --- | --- |
| Non-Conditional | <Action Statement> | A non-conditional rule type may be a rule type that includes an action statement not dependent upon a conditional statement. A non-conditional rule may be executed for a |

TABLE 1-continued

Examples of Product Configuration Rule Types

| Rule Type | Structure | Description |
|---|---|---|
| | | transaction when the non-conditional is selected. |
| Product Conditional | <Conditional Statement(product attribute value)><Action Statement> | A product conditional rule type may be a rule type that includes an action statement dependent upon a conditional statement comprising a product attribute value. A product conditional rule may represent a rule that has a condition defined on one or more product attributes. |
| Customer Conditional | <Conditional Statement(customer attribute value)><Action Statement> | A customer conditional rule type may be a rule type that includes an action statement dependent upon a conditional statement comprising a customer attribute value. In addition, a customer conditional rule may be a rule where the conditions of the rule are not defined on product attributes. |
| Product Conditional Aggregation | <Aggregation Function> | A product conditional aggregation rule type may be a rule type that includes an aggregation function or a summation function based on a user selection. |

As mentioned above, Table 2 below provides examples of the various product configuration rule types clarified in Table 1. The exemplary product configuration rules of Table 2 refer to intangible products, such as a cable television service subscription and an insurance policy. However, exemplary product configuration rules are also possible for other intangible products as well as tangible products.

TABLE 2

Examples of Product Configuration Rules

| Rule Type | Example |
|---|---|
| Non-Conditional | The Cinemax channel is not offered in Florida. |
| Non-Conditional | ABC, NBC, CBS, and FOX channels are mandatory channels. |
| Non-Conditional | Rental Reimbursement and Emergency Road Service are mutually exclusive. |
| Non-Conditional | ESPN and Golf channels are mutually exclusive in Florida. (In this example, when a product attribute value of "ESPN" is selected, the Golf channel may not be selected if the customer provides that cable television service subscription is for service in Florida.) |
| Product Conditional | If Collision coverage is Selected then Comprehensive Coverage must be selected. |
| Product Conditional | If a customer attribute value indicates that the customer credit score is greater than 720, the CNBC channel is offered alongside the Bloomberg channel when the Bloomberg channel is selected. (In this example, when a product attribute value of "Bloomberg" is selected, the CNBC channel may be offered to the customer as part of a cable television service subscription if the customer indicates that the customer has a credit score greater than 720.) |
| Product Conditional | If the customer selects that Bodily Injury Per Person Limit is 20, then Bodily Injury Per Accident Limit must be 40. |
| Customer Conditional | If the customer credit score is less than 600, then do not offer Golf and HBO channels to the customer. |
| Customer Conditional | If the customer household has more than 2 children, then offer Nick Jr. and Disney channels free to the customer. |
| Customer Conditional | Bodily injury accident limit must be greater than 100 if the customer provides that the customer is older than 30 years. |
| Product Conditional Aggregation | Total channel selections cannot be more than 30 in Florida. |
| Product Conditional Aggregation | Earth Quake Sum Insured is Derived from Material Damage Sum Insured. |
| Product Conditional Aggregation | Stocks Sum Insured is the sum of Stocks in Process, Stock in Warehouse and Stock in Open Sum Insured. |

As the modeling workbench 116 and/or product configuration server 110 may define one or more product configuration rule types, the product configuration server 110 and/or the modeling workbench 116 may automatically assign a product configuration rule type to a product configuration rule. In one implementation, the modeling workbench 116 and/or product configuration server 110 may identify the constituent parts of the product configuration rule and assign a product configuration rule type based on the constituent parts. For example, where a product configuration rule includes a conditional statement having a customer attribute value followed by an action statement, the modeling workbench 116 and/or the product configuration server 110 may automatically assign the customer conditional product configuration rule type to the product configuration rule. Hence, a user or system of the modeling workbench 116 and/or product configuration server 110 need not concern itself with assigning a product configuration rule type to the product configuration rule.

Moreover, one or more of the product configuration rules may be assigned a class type that indicates when the product configuration server 110 may evaluate or execute the product configuration rule. For example, the classes of the product configuration rules may be assigned based on when the request for the configurable product is received, after the product configuration server 110 receives customer attribute information, during the time while the product configuration server 110 is preparing one or more customized product records, and after the product configuration server 110 has prepared the one or more customized product records. Moreover, the class type of the product configuration rule may indicate the entity to evaluate the product configuration rule. For example, some product configuration rules may be evaluated by the product configuration server 110, whereas other product configuration rules may be evaluated by the client device 102. As mentioned above, the client device may include a network browser extension 236 that may assist in the evaluation of the product configuration rules to be evaluated by the client device 102. Table 3 below indicates the various classes to which one or more product configuration rule types may be assigned and the entity that may evaluate the product configuration rule; Table 4 provides one exemplary configuration of how product configuration rule types may be assigned by the product configuration server 110.

TABLE 3

Product Configuration Rule Classes

| Class | When Evaluated | Evaluating Entity |
|---|---|---|
| Class One | After receiving the initial request for a configurable product with possible customer attribute values. A class one product configuration rule may also be continuously evaluated while a customer or the client device 102 is configuring a configurable product. | Product configuration server 110 |
| Class Two | After the client device 102 receives a customized product record from the product configuration server 110. One or more class two product configuration rules may be sent from the product configuration server 110 to the client device 102. | Client device 102; network browser 232; and/or network browser extension 236 |
| Class Three | Anytime that the class one product configuration rules are evaluated or any time after the class two product configuration rules are evaluated. A class three product configuration rule is usually a product configuration rule that is evaluated for aggregation or calculation purposes. | Product configuration server 110; client device 102; network browser 232; and/or network browser extension 236. |

TABLE 4

Assignment of Class to Product Configuration Rule Type

| Class | Product Configuration Rule Type |
|---|---|
| Class One | Non-Conditional |
| Class One | Customer Conditional |
| Class Two | Product Conditional |
| Class Three | Product Conditional Aggregation |

As discussed above, a model for one or more product configuration rule types may be defined according to a meta-language syntax. The meta-language syntax may comprise an extensible markup language or other language that includes at least one element of data content and at least one element identifier that describes the type of content of the at least one element of data content. One example of a product configuration rule defined according to a meta-language syntax is below:

```
<?xml version="1.0"?>
<xs:schema xmlns:xs=http://www.w3.org/2001/XMLSchema
xmlns:plcm-r=http://www.valuemomentum.com/plcm
targetNamespace="http://www.valuemomentum.com/plcm"
elementFormDefault="qualified"
attributeFormDefault="unqualified">
    <xs:element name="PlcmRules" type="plcm-r:PlcmRulesType"/>
    <xs:complexType name="PlcmRulesType">
    <xs:sequence>
    <xs:element name="Rules" type="plcm-r:RulesType" maxOccurs="unbounded"/>
    </xs:sequence>
    </xs:complexType>
    <xs:complexType name="RulesType">
    <xs:sequence>
    <xs:element name="ruleType" type="xs:string"/>
    <xs:element name="isKnockoutRule" type="xs:boolean" minOccurs="0"/>
    <xs:element ref="plcm-r:rulesMetaData"/>
    <xs:element ref="plcm-r:context" maxOccurs="unbounded"/>
    <xs:choice>
    <xs:element name="exclusionRules" type="plcm-r:coordinationConstraint" minOccurs="0" maxOccurs="unbounded"/>
    <xs:element name="inclusionRules" type="plcm-r:coordinationConstraint" minOccurs="0" maxOccurs="unbounded"/>
    <xs:element name="unidirectionalInclusionRules" type="plcm-r:coordinationConstraint" minOccurs="0" maxOccurs="unbounded"/>
    <xs:element name="unidirectionalExclusionRules" type="plcm-r:coordinationConstraint" minOccurs="0" maxOccurs="unbounded"/>
    <xs:element name="domainReduction" type="plcm-r:domainConstraint" minOccurs="0" maxOccurs="unbounded"/>
    <xs:element name="validityRules" type="plcm-r: coordinationConstraint" minOccurs="0" maxOccurs="unbounded"/>
    <xs:element name="eligibilityRules" type="plcm-r:ruleset" minOccurs="0" maxOccurs="unbounded"/>
    <xs:element name="genericRules" type="plcm-r:genericRuleset" minOccurs="0" maxOccurs="unbounded"/>
    <xs:element name="endorsementValidityRules" type="plcm-r:coordinationConstraint" minOccurs="0" maxOccurs="unbounded"/>
    <xs:element name="endorsementDomainReductionRules" type="plcm-r:domainConstraint" minOccurs="0" maxOccurs="unbounded"/>
    <xs:element name="cardinalityRules" type="plcm-r:cardinalityConstraint" minOccurs="0" maxOccurs="unbounded"/>
    </xs:choice>
    </xs:sequence>
    </xs:complexType>
</xs:schema>
```

In addition to the product configuration rule types, one or more configurable product models may be defined according to the meta-language syntax. The configurable product model may be represented by a modeling record comprising the meta-language syntax. When a user desires to define a configurable product, a user may use one or more of the client devices 302-308 in communication with the modeling database 310 to define the various attributes and attribute values of the configurable product based on the modeling record representing the configurable product model.

However, as is understood in the art, a product configuration rule, a product record, or any other object, may be stored in another format other than an extensible markup language.

The modeling workbench 116 may be operative to communicate a defined configurable product, a product configuration rule, and/or pricing rule to the product configuration server 110. The definition of the configurable product, product configuration rule, and/or pricing rule may be communicated via the network interface 204, which may be made accessible by a service in the service layer 208. As discussed below, the procedure of communicating a defined configurable product, product configuration rule, or pricing rule to the product configuration server 110 may be considered part of a larger publishing process. During the publishing process, the product configuration server 110 may create one or more product records representing the defined object, whether the object is the configurable product, product configuration rule, or pricing rule. As a configurable product, product configuration rule, and/or pricing rule may have one or more attributes and, depending on the complexity of the defined configurable product, product configuration rule, and/or pricing rule, the attributes and attribute values for the defined may be divided into multiple records. For example, a configurable product, along with the attribute and attribute values for the configurable product, may be defined across multiple product records. However, a configurable product, or any other defined object, may be represented by a single record.

Figure 4:
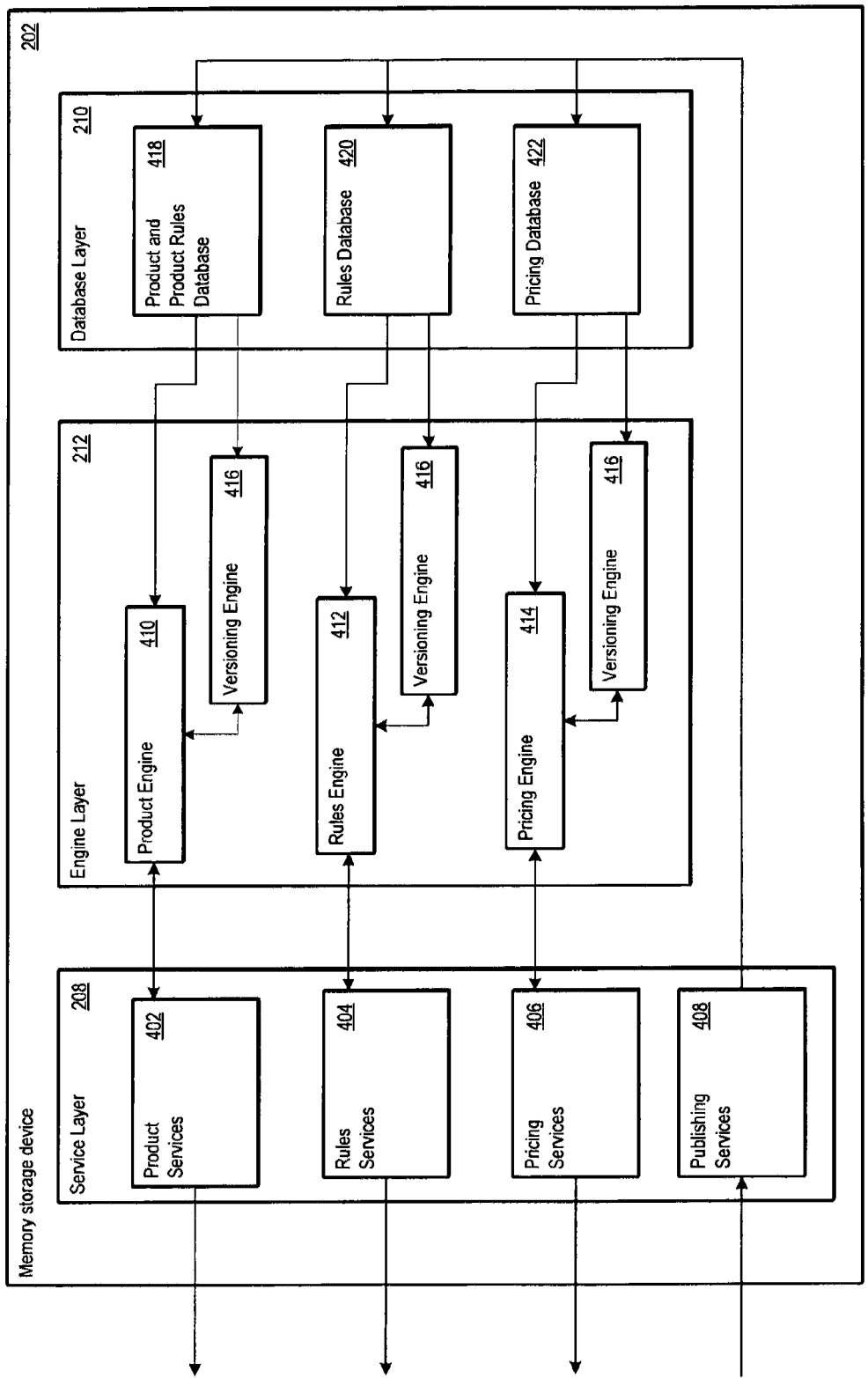
FIG. 4 illustrates one example of various components of the layers leveraged by a product configuration server for providing one or more configurable products

FIG. 4 illustrates the various components of the layers 208-212 leveraged by the product configuration server 110 for providing one or more configurable products. Each of the layers 208-210 may include one or more components for implementing the layer. For example, the service layer 208 may include product services 402, rules services 404, pricing services 406, and publishing services 408. Similarly, the engine layer 212 may include a product engine 410, a rules engine 412, a pricing engine 414, and a versioning engine 416. In addition, the database layer 210 may include various databases, such as a product and product rules database 418, a rules database 420, and a pricing database 422. One example of commercially available product that implements the databases 418-422 established in the database layer 210 and the services 402-408 established in the service layer 208 is the iFoundry software product. FIG. 4 is one implementation of the layers 208-212 and alternative components 402-422 of the layers 208-212 or alternative layers 208-212 are also possible.

As discussed briefly with reference to FIG. 2, the service layer 208 provides one or more services for accessing the database layer 210, the engine layer 212, or any other layer. More particularly, the publishing service 408 of the service layer 208 may facilitate access to one or more of the databases 418-422. Through the publishing service 408, the modeling workbench 116 may access one or more databases 418-422 and modify the records of the databases 418-422. Modifying the records of one or more databases 418-422 may include adding a record, removing a record, editing a record, or any other type of modification to the records of the databases 418-420.

The publishing service 408 may follow a publishing process that generates a one or more configurable product records based on the attributes and attribute values defined using the modeling workbench 116. For example, after a configurable product is defined in the modeling workbench 116, the publishing service 408 may facilitate the addition of the configurable product to the product and product rules database 418, such as by generating one or more product records representing the configurable product. Hence, the product and product rules database may comprise one or more product records that identify configurable products potentially selectable by a user, wherein the product records may include product attributes that represent the features of a configurable product. Moreover, each of the databases 418-420 may store the one or more records in a meta-syntax, that includes at least one element of data content and at least one element identifier that describes the type of content of the at least one element of data content. The meta-syntax may also include an extensible markup language ("XML"). Hence, in one implementation, the records of the databases 418-422 may be stored as one or more XML records.

In addition, one or more of the product records may comprise multiple levels of attributes, attribute values, or other levels. In other words, a product record may be nested and structured according to a hierarchy. Furthermore, a configurable product may correspond to multiple versions of a product record, depending on which features of the configurable product are to be offered to the user or client device 102. As discussed below with reference to FIG. 14, the versioning engine 416 may facilitate the selection of a product record from multiple versions of the product record.

During the publishing process, the publishing service 408 may facilitate the generation of one or more attribute binary decision diagram (BDD) structures representative of the product attributes for a configurable product. In one implementation, the processor 206 is operative to generate the one or more attribute BDD structures. However, any other, component of the product configuration server 110 may also generate the one or more attribute BDD structures.

To generate the one or more BDD structures, one or more components of the product configuration server 110, such as the processor 206, may analyze the meta-syntax representation of a configurable product to determine the attributes of the configurable product and the corresponding attribute values of the configurable product. The processor 206 may then generate an attribute BDD structure based on this analysis. For example, the processor 206 may prepare corresponding attribute BDD structures for each determined configurable product attribute. In yet another implementation, the processor 206 may compare the attributes of the configurable product with one or more product configuration rules to determine which product attributes of the configurable product participate in the product configuration rules. Where a product attribute participates in a product configuration rule, the processor 206 may generate a corresponding attribute BDD structure for the participating configurable product attribute. A product attribute may participate in a product configuration rule when the product configuration rule refers to the product attribute. The participating product attribute may be found in any part of a product configuration rule, such as the conditional statement, the action statement, or any other part of a product configuration rule.

Figure 5:
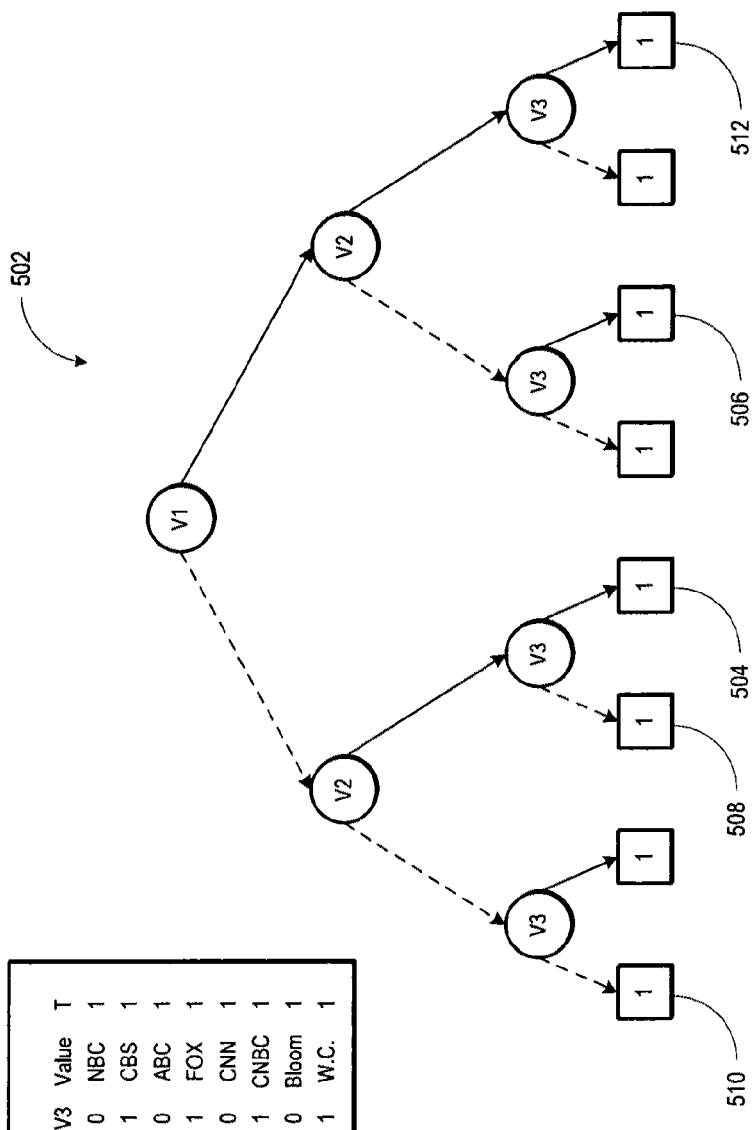
FIG. 5 illustrates one example of a channel attribute binary decision diagram structure.

FIGS. 5-10 show various attribute BDD structures 502-1002. FIG. 5 is an illustration of one example of a channel attribute BDD structure 502 for a "Channel" product attribute where the configurable product may be a cable television service subscription. The "Channel" product attribute may represent the channels available for the cable television service subscription, and the attribute may have one or more attribute values, such as "NBC," "CBS," "ABC," "FOX," "CNN," "CNBC," "Bloomberg," and "Weather Channel." Alternative product attribute values are also possible.

Each of the product attribute values may be represented by a corresponding binary value. For example, the "NBC" attribute value may correspond to the binary value "000." Similarly, the "CBS" attribute may correspond to the binary value "001". By assigning binary values to one or more product attribute values, the product configuration server 110 is able to expeditiously determine whether a product attribute value is selectable by a customer.

In addition to binary values, an attribute BDD structure may include one or more offering nodes and non-offering nodes. An offering node may indicate whether a product attribute value is selectable by a user based on one or more product configuration rules. A non-offering node may indicate that the product attribute value is not selectable by a user. Whether an attribute BDD structure includes one or more offering nodes or one or more non-offering nodes may be determined based on whether a product configuration rule indicates whether a product attribute is selectable by a user. The channel attribute BDD structure 502 may include one or more offering nodes 504-512 that indicate that the product attribute values of "NBC," "CBS," "ABC," "FOX," "CNN," "CNBC," "Bloomberg," and "Weather Channel" are each selectable by a user based on one or more product configuration rules.

Figure 6:
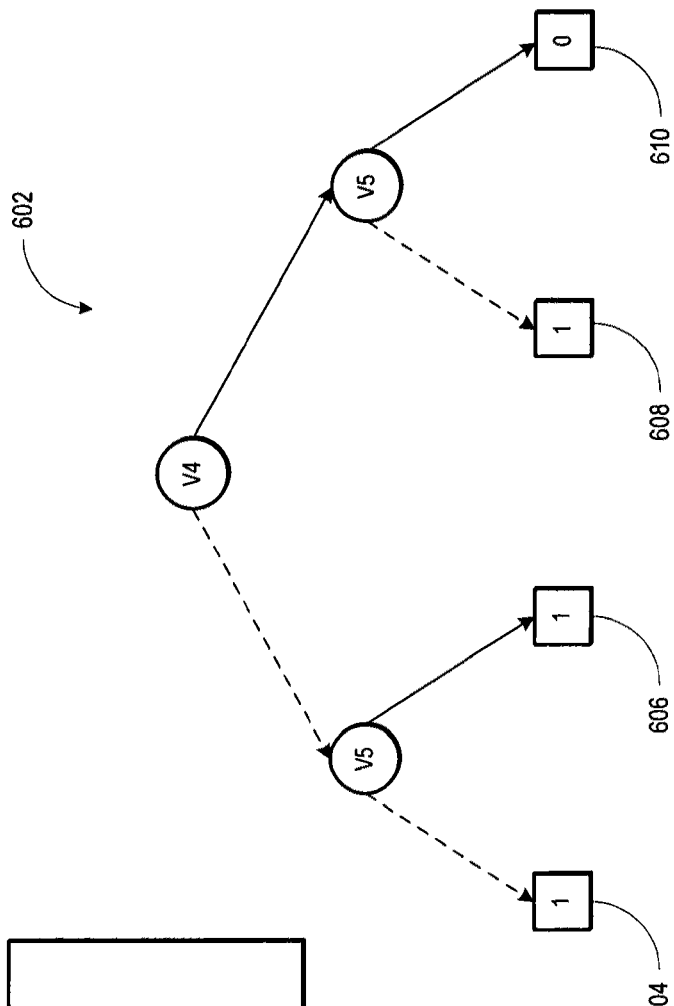
FIG. 6 illustrates one example of a product attribute binary decision diagram structure.

FIG. 6 is an illustration of one example of a product attribute BDD structure 602 for a "Product" product attribute where the configurable product may be a cable television service subscription. The "Product" product attribute may represent one or more telecommunication products offered by a telecommunications service provider and have one or more attribute values, such as "DC," (for "Digital Cable") "HIS," (for "High Speed Internet") and "Phone." Alternative product attribute values are also possible.

Each of the attribute values for the "Product" attribute may be represented by a corresponding binary value. For example, the "DC" attribute value may correspond to the binary value "00." Similarly, the "HIS" attribute may correspond to the binary value "01". Moreover, the product attribute BDD structure 602 may include one or more null values that correspond to one or more binary values. For example, the product attribute BDD structure 602 may include a null value that corresponds to the binary value "11". The "DC," "HIS," and "Phone" attribute values may each correspond to an offering attribute node 604-608, whereas the null value may correspond to a non-offering attribute node 610. Hence, the null value may not be selectable by a customer.

Figure 7:
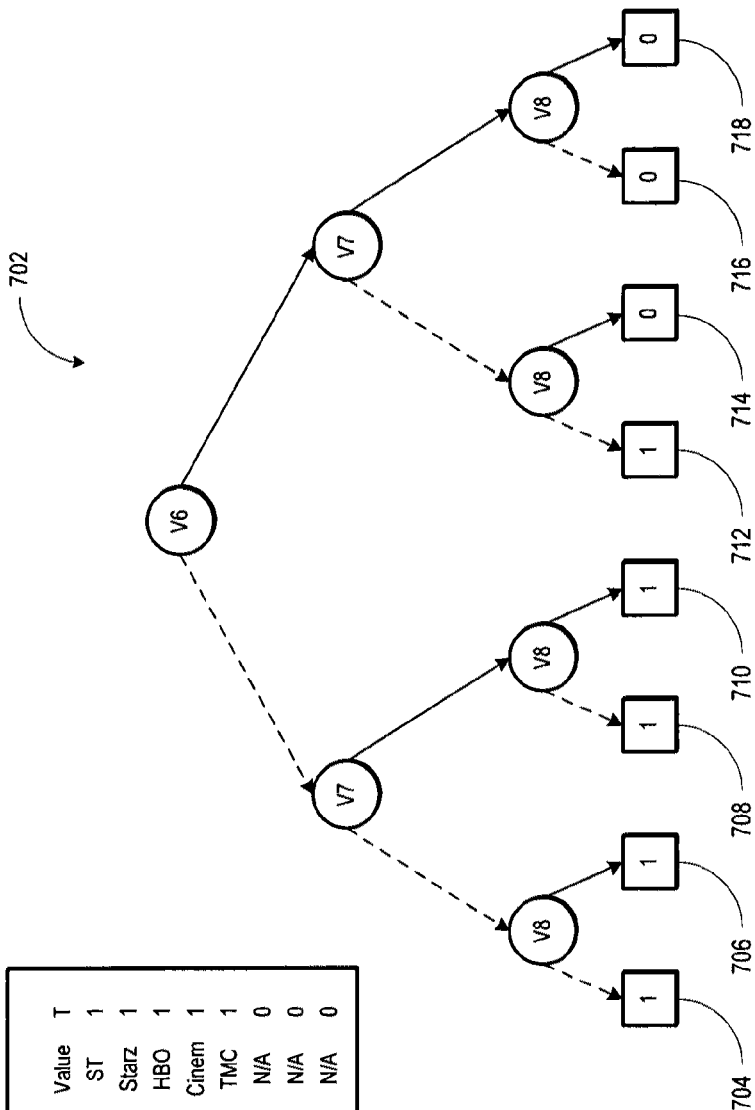
FIG. 7 illustrates one example of a premium channel attribute binary decision diagram structure.

FIG. 7 is an illustration of one example of a premium channels attribute BDD structure 702 for a "Premium Channels" product attribute where the configurable product may be a cable television service subscription. The "Premium Channels" product attribute may represent premium channels that may be offered as part of a cable television service subscription, and the "Premium Channels" product attribute may have one or more attribute values, such as "ST," "Starz," "HBO," "Cinemax," and "TMC." Alternative product attribute values are also possible.

Each of the product attribute values may be represented by a corresponding binary value. For example, the "ST" attribute value may correspond to the binary value "000". Similarly, the "Starz" attribute value may correspond to the binary value "001". Moreover, the premium channels attribute BDD structure 702 may include one or more null values that correspond to one or more binary values. For example, the premium channels attribute BDD structure 702 may include a null value that corresponds to the binary value "101," a null value that corresponds to the binary value "110," a null value that corresponds to the binary value "111," or other null values that correspond to other binary values.

In addition, the "ST," "Starz," "Phone," "HBO," "Cinemax," and "TMC" attribute values may each correspond to an offering attribute node 704-712. Similarly, one or more of the null values may each correspond to a non-offering attribute node 714-718. Hence, the "Premium Channels" product attribute values of "ST," "Starz," "HBO," "Cinemax," and "TMC" may be offered to a customer for selection whereas the null values may not be offered to a customer for selection.

Figure 8:
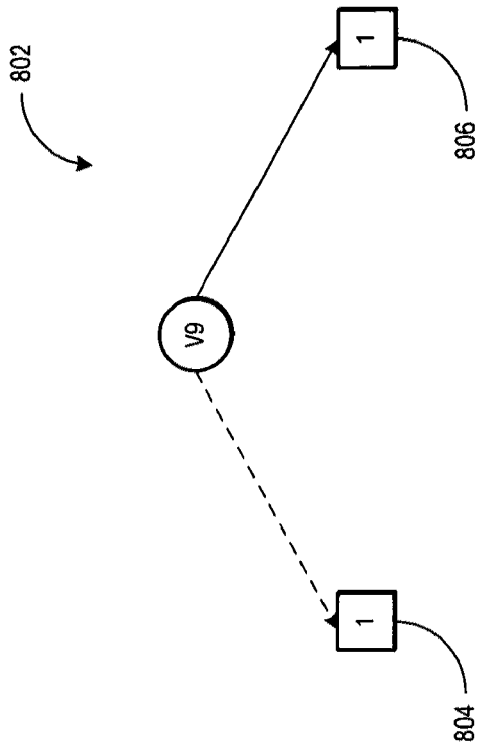
FIG. 8 illustrates one example of a speed attribute binary decision diagram structure.

FIG. 8 is an illustration of one example of a speed attribute BDD structure 802 for a "Speed" product attribute where the configurable product may be a broadband or Internet subscription. The "Speed" product attribute may represent the speed, such as the download speed and/or upload speed, at which the customer accesses the Internet or other online service. The "Speed" product attribute may have one or more product attribute values, such as "12" and "16," where "12" represents 12 megabits per second and where "16" represents 16 megabits per second. Alternative product attribute values are also possible.

Each of the product attribute values may be represented by a corresponding binary value. For example, the "12" attribute value may correspond to the binary value "0". Similarly, the "16" attribute value may correspond to the binary value "1". In addition, the "12" and "16" attribute values may each correspond to an offering attribute node 804-806, where the "Speed" product attribute values of "12" and "16" may be offered to a customer for selection.

Figure 9:
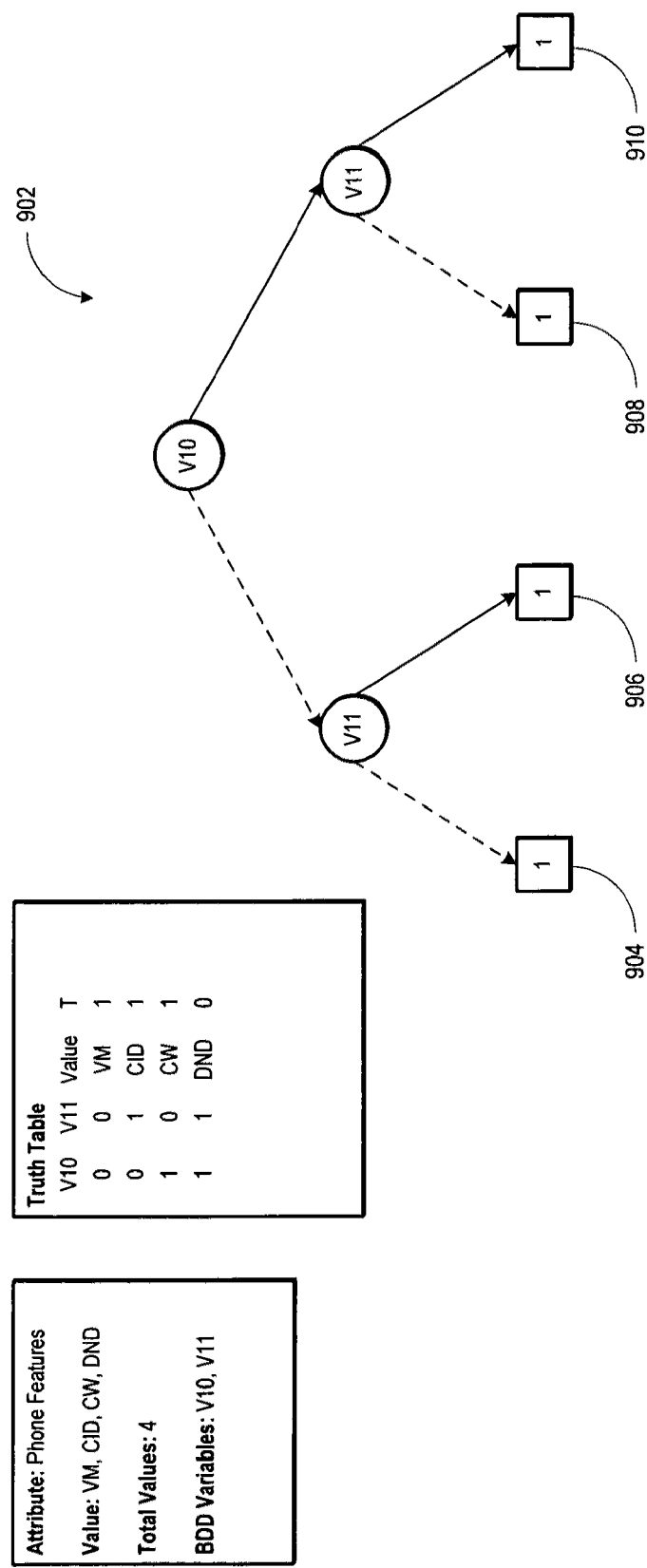
FIG. 9 illustrates one example of a phone feature attribute binary decision diagram structure.

FIG. 9 is an illustration of one example of a phone features attribute BDD structure 802 for a "Phone Features" product attribute where the configurable product may be a telephone service subscription. The "Phone Features" product attribute may represent the available features for a telephone service. The "Phone Features" product attribute may have one or more product attribute values, such as "VM," "CID," "CW," and, "DND," where "VM" represents a voicemail feature, "CID" represents a caller identification feature, "CW," represents a call waiting feature, and "DND" represents a do not disturb feature. Alternative product attribute values are also possible.

Each of the product attribute values may be represented by a corresponding binary value. For example, the "VM" attribute value may correspond to the binary value "00". Similarly, the "CID" attribute value may correspond to the binary value "01". In addition, the "VM," "CID," "CW," and "DND" attribute values may each correspond to an offering attribute node 904-910, where the "Phone Features" product attribute values of "VM," "CID," "CW," and "DND" may be offered to a customer for selection.

Figure 10:
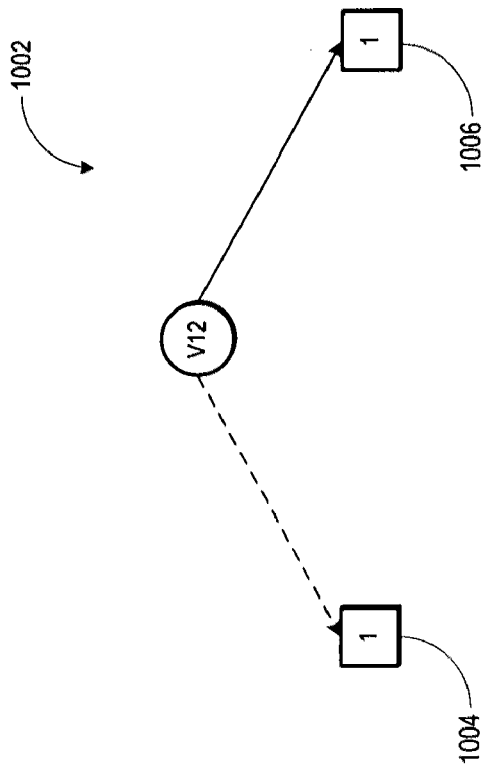
FIG. 10 illustrates one example of an on-demand subscription attribute binary decision diagram structure.

FIG. 10 is an illustration of one example of an on-demand subscription attribute BDD structure 802 for an "On-Demand Subscription" product attribute where the configurable product may be a cable television service subscription. The "On-Demand" product attribute may represent On-Demand channels that a customer may subscribe to while selecting programming. The "On-Demand Subscription" product attribute may have one or more product attribute values, such as "BX" and "WWE," where "BX" represents a boxing channel and where "WWE" represents a World Wrestling Entertainment channel. Alternative product attribute values are also possible.

Each of the product attribute values may be represented by a corresponding binary value. For example, the "DM" attribute value may correspond to the binary value "0". Similarly, the "WWE" attribute value may correspond to the binary value "1". In addition, the "DM" and "WWE" attribute values may each correspond to an offering attribute node 1004-1006, where the "On-Demand Subscription" product attribute values of "DM" and "WWE" may be offered to a customer for selection.

In preparing the product attribute BDD structures 502-1002, the product configuration server 110 may also assign a query-language formatted expression to one or more of the product attribute BDD structures 502-1002. In one implementation, the query-language formatted expression may be an XPATH expression. However, other query-language formatted expressions may also be possible. The query-language formatted expression may identify the location of the product attribute represented by the one or more product attribute BDD structures 502-1002 in one or more corresponding configurable product records. One example of a query-language formatted expression is "product[name='Cable Television']/attribute-numeric[name='PhoneFeatures']".

In another implementation, the product configuration server 110 may assign a query-language formatted expression to each attribute node of at least one attribute BDD structure. In this implementation, each of the query-language formatted expressions may identify the product attribute value corresponding to the attribute node of the assigned query-language formatted expression. Moreover, in this implementation, the product configuration server 110 may evaluate the at least one attribute BDD structure to identify whether at least one attribute node of the at least one attribute BDD structure is a non-offering attribute node. When the at least one attribute node of the at least one attribute BDD structure is identified as a non-offering attribute node, the product configuration server 110 may evaluate the query-language formatted expression assigned to the at least one non-offering attribute node to identify a location of the product attribute value in the corresponding at least one product record.

Once evaluated, the product configuration server 110 may prepare a customized product record for sending to the client device 102. The product configurations server 110 may prepare the customized product record by including the product attribute value of the at least one product record in the at least one customized product record and identifying that the product attribute value of the at least one customized product record is not selectable by the user. As discussed below, a flag or other marker may be embedded in the customized product record to indicate that the product attribute value corresponding to the non-offering node is not selectable by the user. Additionally, a flag or other marker may be embedded in the customized product record to indicate that a product attribute value corresponding to an offering is selectable by the user.

Figure 11:
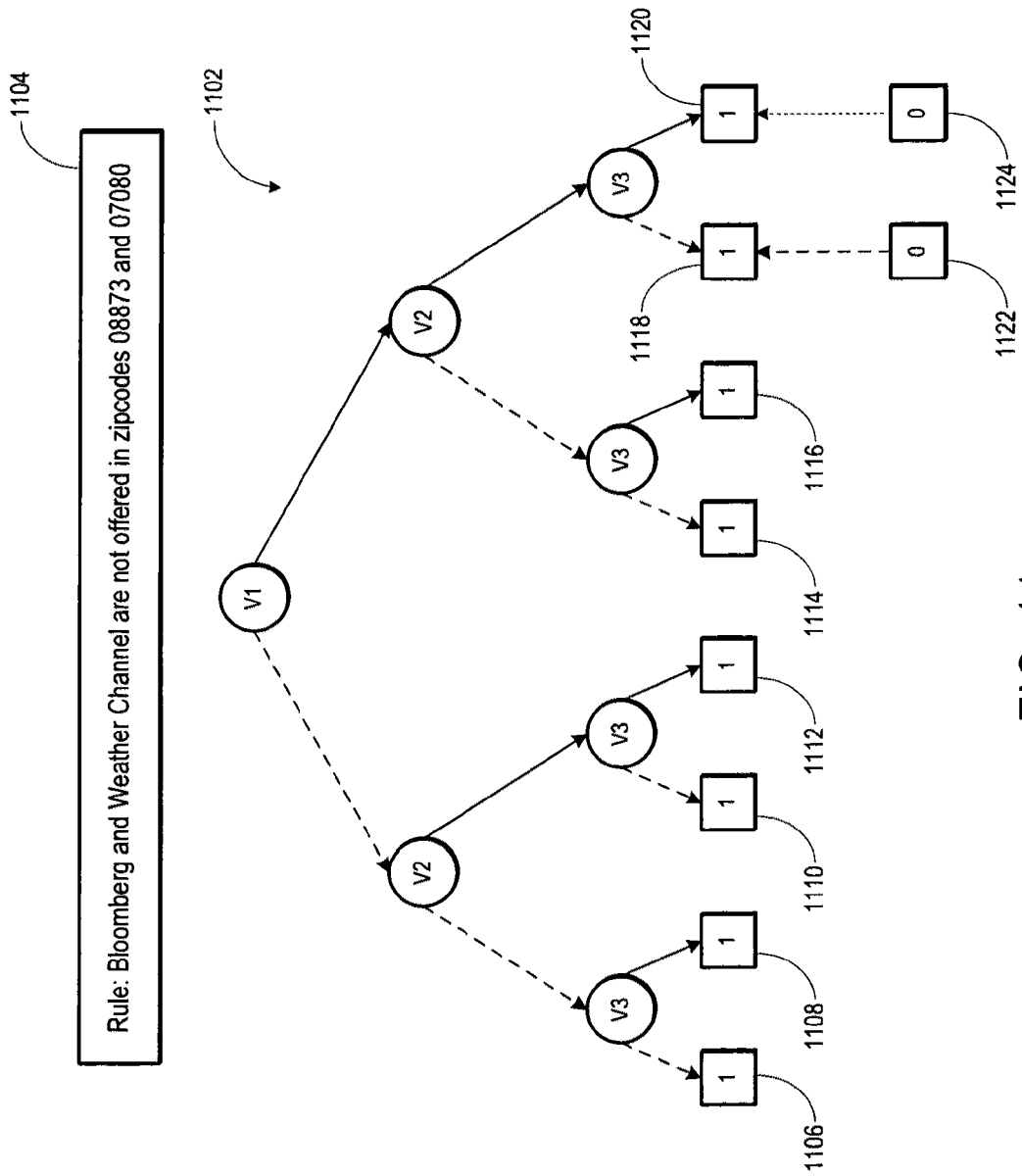
FIG. 11 illustrates one example of modified attribute binary decision diagram structure in accordance with a product configuration rule.

FIG. 11 illustrates one example of a modified product attribute BDD structure 1102 that the product configuration server 110 has prepared in accordance with a product configuration rule 1104. In modifying a product attribute BDD structure, one or more components of the product configuration server 110 may modify the product attribute BDD structure. For example, the product engine 410, the rules engine 412, the pricing engine 414, or any other engine may modify the product attribute BDD structure to yield a modified product attribute BDD structure 1102. In addition, one or more devices other than the product configuration server 110 may modify the product attribute BBD structure to obtain a modified product attribute BDD structure 1102. For example, the client device 102 may modify a product attribute BDD structure. As explained below with reference to FIG. 14, the client device 102 may include a network browser and/or network browser extension operative to modify a product attribute BDD structure.

In modifying a product attribute BDD structure, an engine, such as the product engine 410, may first determine whether one or more attributes of a configurable product participates in a product configuration rule 1104. The product engine 410 may determine that an attribute participates in a product configuration rule 1104 by analyzing the meta-syntax of the product configuration rule 1104 to identify the one or more attributes referenced by the product configuration rule 1104.

As shown in FIG. 11, the exemplary product configuration rule 1104 states that the product attribute values "Bloomberg" and "Weather Channel" are not offered in a zip code having a value of 08873 or 07080. TO prepare the modified attribute BDD structure 1102 based on this rule, the product configuration server 110 may first wait for a request to offer the configurable product associated with this product attribute to a customer. When the product configuration server 110 receives the request to offer this configurable product to the customer, the product configuration server 110 may request additional information about the customer or where the customer intends to use the service. Hence, the product configuration server 110 may request that the customer provide a zip code customer attribute value corresponding to the zip code where the customer intends to use the configurable product. Alternatively, the product configuration server 110 may receive the zip code customer attribute value as part of the request to offer the configurable product.

In this example, when the product configuration server 110 receives a zip code customer attribute value indicating that the customer intends to use the configurable product in the zip code 08873 or 07080, the product configuration server 110 may first retrieve the product attribute BDD structure from one or more of the databases 418-422. After retrieving the product attribute BDD structure from the one or more databases 418-422, the product configuration server 110 may then review the offering nodes 1106-1120 to determine which offering nodes 1118-1120 are associated with the product attribute values "Bloomberg" and "Weather Channel." In one implementation, the product attribute values "Bloomberg" and "Weather Channel" are represented as binary values and the product configuration server 110 references the corresponding binary values to modify the product attribute BDD structure. The product configuration server 110 then prepares the modified product attribute BDD structure 1102 by replacing the offering nodes 1118-1120 with the non-offering nodes 1122-1124. Hence, the non-offering node 1122 indicates that the product attribute value "Bloomberg" is not selectable and the non-offering node 1124 indicates that the product attribute value "Weather Channel" is not selectable when a customer attribute value indicates that the zip code for the intended use of the configurable product is in the 08873 zip code or the 07080 zip code.

Moreover, in preparing the modified product attribute BDD structure 1102, the product configuration server 110 may prepare one or more customized product records that have been modified to reflect that one or more product attribute values are not selectable by a customer. In one implementation, the preparation of the one or more customized product records may occur after evaluating all applicable product configuration rules and/or updating one or more applicable product attribute BDD structures.

To prepare one or more customized products records to reflect that one or more product attribute values are not selectable by a customer, the product configuration server 110 may evaluate a query-language formatted expression assigned to a product attribute BDD structure to locate the product attribute in the corresponding product record. The product configuration server 110 may then identify whether a product attribute value for the product attribute has a non-offering node in a corresponding modified attribute BDD structure 1102 or other attribute BDD structure. In addition, the product configuration server 110 may include the product attribute value of the product attribute for a corresponding product record in the customized product record. When the product configuration server 110 includes the attribute value in the customized product record, the product configuration server 110 may not initially indicate that the attribute value in the customized product record is not selectable by the user. However, when the product attribute value of the attribute has a corresponding non-offering node in a modified attribute BDD structure 1102, or other attribute BDD structure the product configuration server 110 may identify that the product attribute value of the customized product record is not selectable by the user. For example, the product configuration server 110 may include a flag or marker in the customized product record to indicate that the product attribute value corresponding to the non-offering node is not selectable by the user. Moreover, a flag or marker may be embedded in the customized product record to indicate that the product attribute value corresponding to an offering node is selectable by the user. The flag or marker embedded in the customized product record may be identified according to an extensible markup language.

Figure 12:
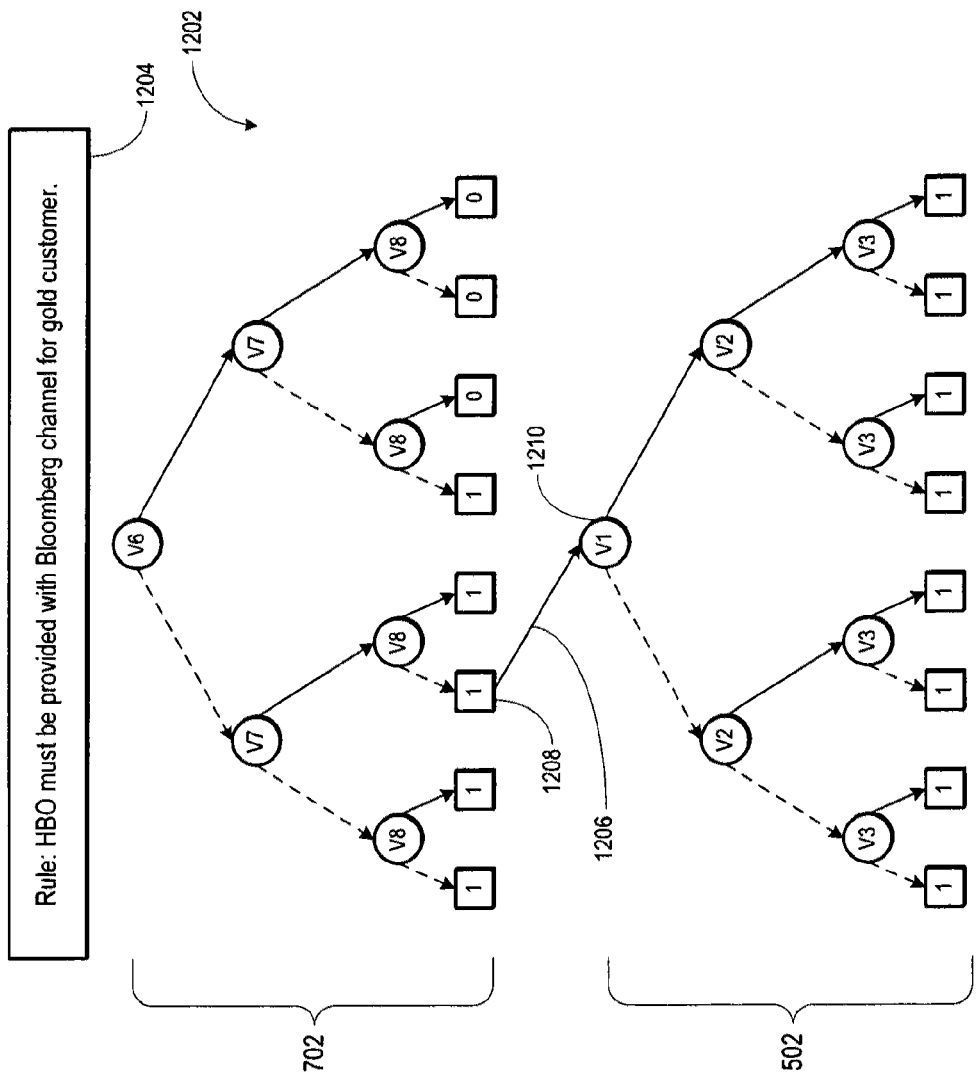
FIG. 12 illustrates one example of a merged binary decision diagram structure in accordance with a product configuration rule.

In addition to preparing a modified product attribute BDD structure 1102, the product configuration server 110 may prepare one or merged BDD structures in accordance with a product configuration rule. FIG. 12 illustrates one example of a merged product attribute BDD structure 1202 in accordance with another product configuration rule 1204. The exemplary product configuration rule 1204 indicates that a Premium Channel product attribute value "HBO" must be provided with the Channel product attribute value "Bloomberg" when a customer attribute value indicates that a customer is a "gold" customer.

In preparing a merged product attribute BDD structure 1202, the product configuration server 110 may analyze a product configuration rule to determine the product attributes that participate in the rule. The product configuration server 110 may determine which product attributes participate in the product configuration rule 1204 by identifying the product attribute values referenced in the product configuration rule 1204, and then correlating the referenced product attribute values with their corresponding product attributes. Accordingly, in one implementation, the product configuration server 110 may identify that the product configuration rule 1204 references the product attribute values "HBO" and "Bloomberg," and these product attribute values correlate to the product attributes correlate to the "Premium Channels" and "Channels" product attributes, respectively.

Once the product attributes are identified, the product configuration server 110 may then retrieve one or more corresponding product attribute BDD structures from one or more databases, such as the product and product rules database 418 and/or the rules database 420. In the example shown in FIG. 11, the product configurations server 110 may retrieve the "Channels" product attribute BDD structure 502 and the "Premium Channels" product attribute BDD structure 702. The product configuration server 110 may then establish a link 1206 between an offering node 1208 corresponding to the "Premium Channels" product attribute value "HBO" and the root node of the "Channels" product attribute BDD structure 502. In an alternative implementation, the product configuration server 110 may establish the link 1206 between an offering node corresponding to the "Channels" product attribute value "Bloomberg" and a root node of the "Premium Channels" product attribute BDD structure 702.

The link 1206 between the "Premium Channels" product attribute BDD structure 702 and the "Channels" product attribute BDD structure 502 may be a product configuration rule. As one or more product configuration rules may provide one or logical relations between various product attributes and the product attribute values may be adjusted based on the evaluation of a product configuration rule, when a product configuration rule is evaluated, the product configuration server 110 may apply binary logic to the corresponding product attribute BDD structures. Moreover, the link 1206 may be any another type of linking structure now known or later developed.

After establishing a link 1206 between the "Premium Channels" product attribute BDD structure 702 and the "Channels" product attribute BDD structure 502 to obtain the merged product attribute BDD structure 1202, the product configuration server 110 may evaluate the merged product attribute BDD structure 1202 in preparing one or more customized product records for a customer, when a customer attribute value indicates that the customer is a "gold" customer. Hence, the product attribute values for the one or more customized product may reflect that when the customer selects the product attribute value "HBO," that the product attribute value "Bloomberg" will also be selected. Thus, the creation of a merged product attribute BDD structure 1202 facilitates the automatic selection of product attribute values when a product configuration rule establishes a relationship between one or more product attribute values.

Although the product configuration rule 1204 in FIG. 12 establishes a relationship between a first product attribute BDD structure 702 and a second product attribute BDD structure 502, a product configuration rule may establish a relationship between any number of product attribute BDD structures, including more than two product attribute BDD structures. Moreover, while the product configuration rule 1204 references a first customer attribute, represented by the "gold" customer attribute value, a product configuration rule may reference any number or any type of customer attribute values. Hence, it is possible that a merged product attribute BDD structure includes a significant number of product attribute BDD structures when the product configuration server 110 evaluates a product configuration rule having multiple customer attribute values.

Figure 13:
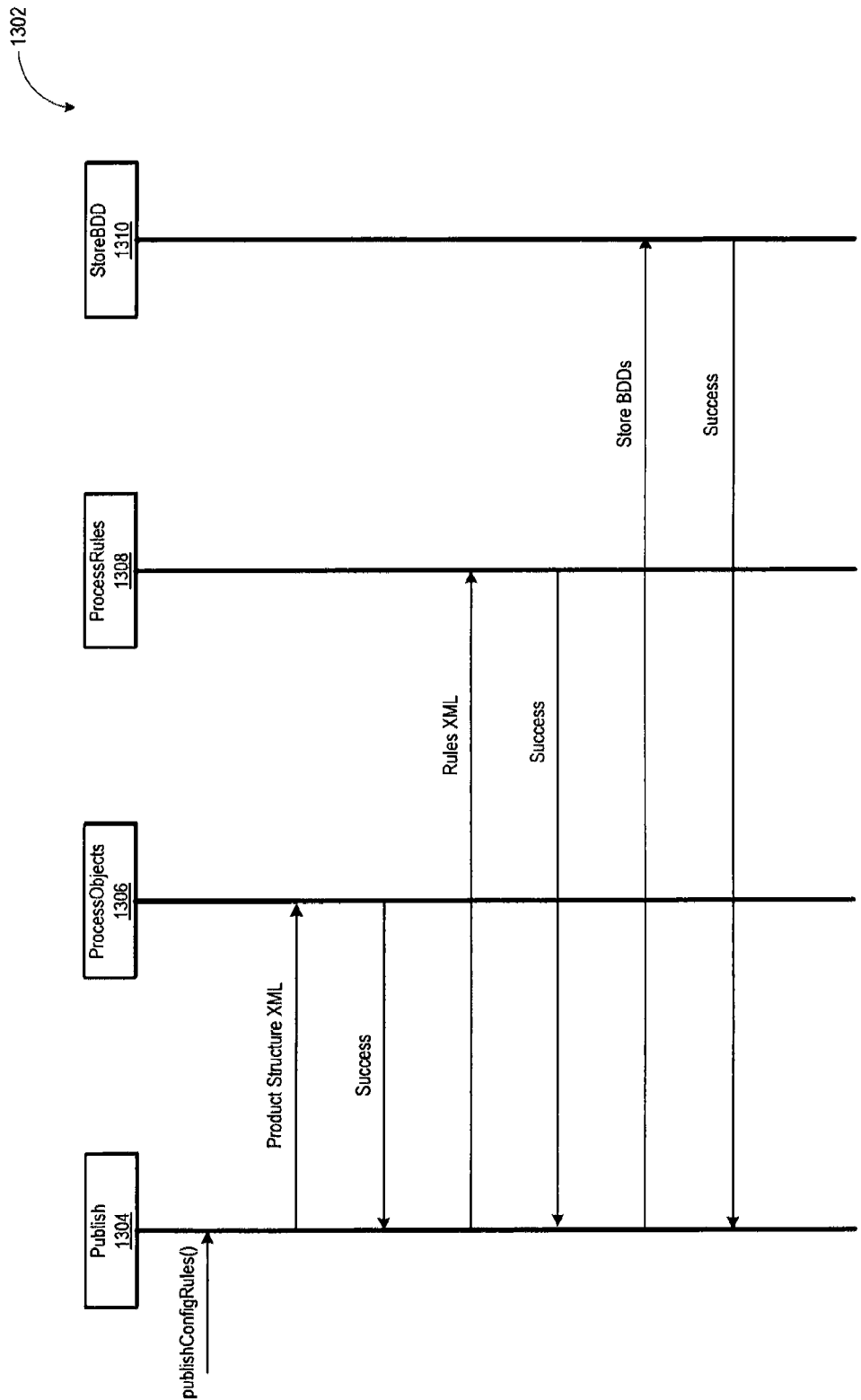
FIG. 13 illustrates one example of a logic flow for a publishing process.

FIG. 13 illustrates one example of a logic flow 1302 for a publishing process between the modeling workbench 116 and the product configuration server 110. In one implementation, the logic flow 1302 includes a publish operation 1304, a process objects operation 1306, a process rules operation 1308, and a store product attribute BDD structure operation 1310. Other operations may also be possible. Table 5 below describes the operations 1304-1310 shown in FIG. 13.

TABLE 5

| Operation | Description |
|---|---|
| Publish (1304) | The publish operation (1304) may include receiving an initiation request for publishing one or more entities, such as a product configuration rule, a configurable product, or other entity. Many of the operations 1306-1310 operate within the scope of the publish operation 1304. In one implementation, when the other operations 1306-1310 have completed, the application that initiated the publish operation 1304 may receive a response indicating the success or failure of the publish operation 1304. |
| Process Objects (1306) | Based on the initiation request for the publish operation (1304), the process objects operation (1306) may include gathering one or more structure details regarding the configurable product or product configuration rule form the initiation request, transforming the structure details into objects, such as XML files, and then sending the objects on for further processing. Examples of structure details include product attributes/entities, relations between one or more product attributes, possible attribute values for the product attributes, and other product structure information. |
| Process Rules (1308) | The process rules operation (1308) may gather one or more product configuration rules and generate product attribute BDD structures for the product attributes that are determined to participate in the one or more product configuration rules. When a product configuration rule is selected, the product configuration rule may be assessed for the product attributes that participate in the product configuration rule. In one implementation, for each of the product attributes determined to participate in one or more product configuration, a product attribute BDD structure may be created. The product attribute BDD structures may be generated as an XML stream, a flat data stream, objects, or combinations thereof. Once all the rules are processed, a successful message may be returned. |
| Store Product Attribute BDD Structure (1310) | The store product attribute BDD structure operation (1310) may store a product attribute BDD structure generated for various product attributes into one or more databases, such as the product and product rules database 418, the rules database 420, or other database. Storing the product attribute BDD structure may also include generating supporting metadata that may be used for search and retrieval during a service execution phase. |

Table 6 below describes possible messages that may be passed during the operations 1304-1310 shown in FIG. 13.

TABLE 6

| Message | Description |
|---|---|
| publishConfigRules | publishConfigRules may be a trigger message to start the publish process (1302). The publishConfigRules message may provide details of the service context that may be the basis for all subsequent search and query activities related to the publish process. |
| ProductStructureXML | The ProductStructureXML message may represent the configurable product structure with attributes, attribute relations, and attribute values that are gathered and passed to the process objects operations (1306) to process the configurable product definition. The ProductStructureXML message may facilitate the creation of the objects that may be used by subsequent processes. The created objects may be returned in a response to a completion of the process objects operations (1306). |
| RulesXML | The RulesXML message may represent the collection of one or more product configuration rules that may be applicable for a publish service request context. The product configuration rules may be returned to assist in the generation of a product attribute BDD structure for the product configuration attributes determined to participate in one or more product configuration rules. |
| StoreBDDs | The StoreBDDs message may represent all the product attribute BDD structures generated for the participating product attributes. The data passed in this request may be stored in one or more databases for subsequent retrieval. |

TABLE 6-continued

Messages of a Publishing Process (1302)

| Message | Description |
|---|---|
| Success | The Success message represents a message indicating a successful execution of an operation or process. |

Figure 14:
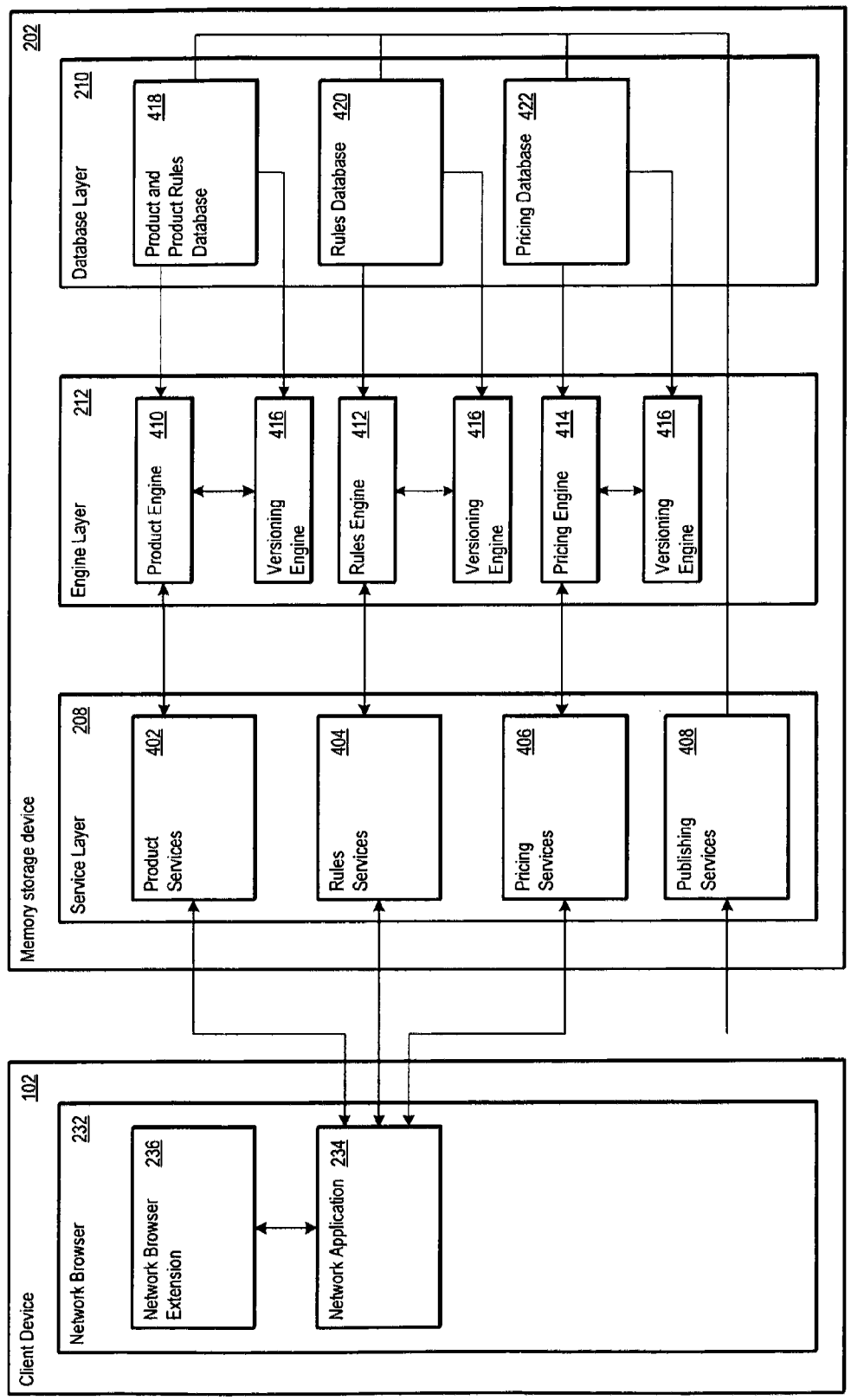
FIG. 14 illustrates one example of a client device in communication with a product configurable server to configure a configurable product.

Turning next to FIG. 14 is an illustration of one example of client device 102 in communication with the product configuration server 110 to configure a configurable product. During the configuration of the configurable product, the client device 102 may communicate, directly or indirectly, with one or more layers 208-210 of the product configuration server 110 and, in particular, with one or more services 402-406.

The client device 102 may include a network browser 232 having a network application 234 working in conjunction with a network browser extension 236 to communicate with the product configuration server 110, and in particular, with the product services 402. The product configuration server 110 may make available a website on a network, such as the Internet or an intranet, and the network browser 232 may communicate with the product configuration server 110 via the network website. Moreover, the network website may function as the network application 234. Hence, requests passed to and responses received from the product configuration server 110 may be transmitted or displayed via the network application 234.

When the network browser 232 initially accesses the product configuration server 110 via the network application 234, the network application 234 may request that the client device 102 provide initial customer information. The initial customer information may include such customer attributes as the location where the configurable product may be used, customer demographic information, the location where the customer lives, or any other type of customer information. The customer information may be transmitted from the client device 102 to one or more services 402-406 of the product configuration server 110, such as the product services 402. The services 402-406 may then pass the customer information to one or more engines 410-416. The customer information may be initially used by the product configuration server 110 to determine which configurable products may apply to the customer.

In deciding which configurable products may be selectable by a customer or client device 102, the product configuration server 110 may execute one or more product configuration rules using the provided customer information as input for evaluating the product configuration rules. However, as the product configuration server 110 may have many different product configuration rules, the product configuration server 110 may invoke the versioning engine 416 to select the appropriate product configuration rule to evaluate given a set of attribute values (customer attribute values, product attribute values, or otherwise).

In one implementation of the product configuration server 110, the product configuration server 110 may store or be established with different versions of a product configuration rule, a product record, a product attribute BDD structure, or any other object. For example, different versions of a product configuration rule may be established for evaluation according to different zip codes, different time zones, during different time periods, or any other criteria. Similarly, different versions of a configurable product may be established for different zip codes, different time periods, or any other criteria.

Although versions of a product configuration rule or configurable product may overall be similar, there may be subtle differences between the versions of the product configuration rule and/or configurable product. As there may be different versions of a product configuration rule and/or different versions of a configurable product, the product configuration server 110 may maintain different versions of product attribute BDD structures to account for the differences between the versions of the product configuration rule and/or configurable product. In generating a product attribute BDD structure, the product configuration server 110 may create a single version of the product attribute BDD structure for a product attribute where the product attribute does not change between multiple versions of a configurable product.

As discussed with reference to Tables 3-4, the product configuration server 110 may evaluate one or more product configuration rules according to the class of the product configuration rule. Hence, when the request for the configurable product is first received, the product configuration server 110 may evaluate product configuration rules of class one. For example, the product configuration server 110 may evaluate non-conditional product configuration rules and customer conditional product configuration rules. Evaluating the class one product configuration rules may indicate which version of the configurable product and/or product attribute BDD structure to use to further select a configurable product for the customer. In one implementation, the versioning engine 416 may provide the details and specifics for one or more product configuration rules and corresponding BDD attribute structures to use for a user selection.

Moreover, after evaluating the class one product configuration rules, the product configuration server 110 may prepare one or more customized product records for the client device 102. Preparing the one or more customized product records may first include determining the one or more product attribute BDD structures that correspond to product attributes of the configurable product that participate in one or more product configuration rules. Once a product attribute BDD structure is determined, the product configuration server 110 may evaluate the query-language formatted expression assigned to the product attribute BDD structure to locate the corresponding product attribute in the corresponding product record and then identify whether a product attribute value for the product attribute has a corresponding non-offering node in the determined product attribute BDD structure. In addition, the product configuration server 110 may identify whether a product attribute value for the product attribute has a corresponding offering node in the determined product attribute BDD structure.

After identify the non-offering and offering product attribute values, the product configuration server 110 may include the product attribute values of the product attribute of the corresponding product record in the customized product record. In one implementation, when the product attribute value of the product attribute has a corresponding non-offering node in the product BDD structure, identify that the product attribute value of the one customized product record is not selectable by the user. For example, the product configuration server 110 may include a flag or marker in the customized product record to indicate whether the product attribute value is selectable by the user. Hence, a customized product record may contain similar product attributes and product attribute values as the initial product record for the configurable product, but the product configuration server 110 may tailor the customized product record according to the evaluated product configuration rules requesting the client device 102.

Once a customized product record is prepared, the product configuration server 110 may transmit the customized product record to the client device 110. In addition, the product configuration server 110 may transmit one or more product attribute BDD structures and/or product configuration rules. For example, the product configuration server 110 may transmit class two product configuration rules to the client device 102 for evaluation by the client device 102. Examples of class two product configuration rules include product conditional product configuration rules. Transmitting the class two product configuration rules to the client device 102 may offload the processing power required to evaluate the class two product configuration rules to the client device 102 and allow the product configuration server 110 to receive and process requests for configurable products from other client devices.

When the client device 102 receives the customized product record, the one or more product attribute BDD structures, and the class two product configuration rules, the client device 102 may display the configurable product, with its corresponding product attributes and product attribute values, to the user for configuration. The configurable product may be displayed using the network browser 232 in conjunction with the network browser extension 236. Selectable product attribute values may be displayed to the user for configuring the configurable product, whereas non-selectable product attribute values may not be displayed to the user. Alternatively, the non-selectable product attributes may be displayed, but non-selectable. As the user selects various product attribute values, the client device 102 may evaluate one or more class two product configuration rules to display various configurations of the configurable product. To evaluate the one or more class two product configuration rules, the client device 102 may employ the use of the network browser extension 236. Hence, the evaluation of the class two product configuration rules may appear transparent to the user while interacting with the network browser 232 and the network application 234.

When the user has finished configuring a configurable product, the user may initiate a transmission to the product configuration server 110 to indicate that the user has finished configuring the configurable product. The transmission to the product configuration server 110 may include the product attribute values that the user selected for the configured product. When the product configuration server 110 receives the transmission from the client device 102, the product configuration server 110 may evaluate one or more class three product configuration rules, such as product conditional aggregation product configuration rules to finalize the attribute values of the configurable product. Depending on how the class three product configuration rule is structured, the client device 102 may also evaluate one or more class three product configuration rules. After evaluation of the class three product configuration rules, the client device 102 may receive a response from the product configuration server 110 that represents the configured product, including any product attribute values that were added to or removed from the configured product based on the evaluation of the class three product configuration rules.

Figure 15:
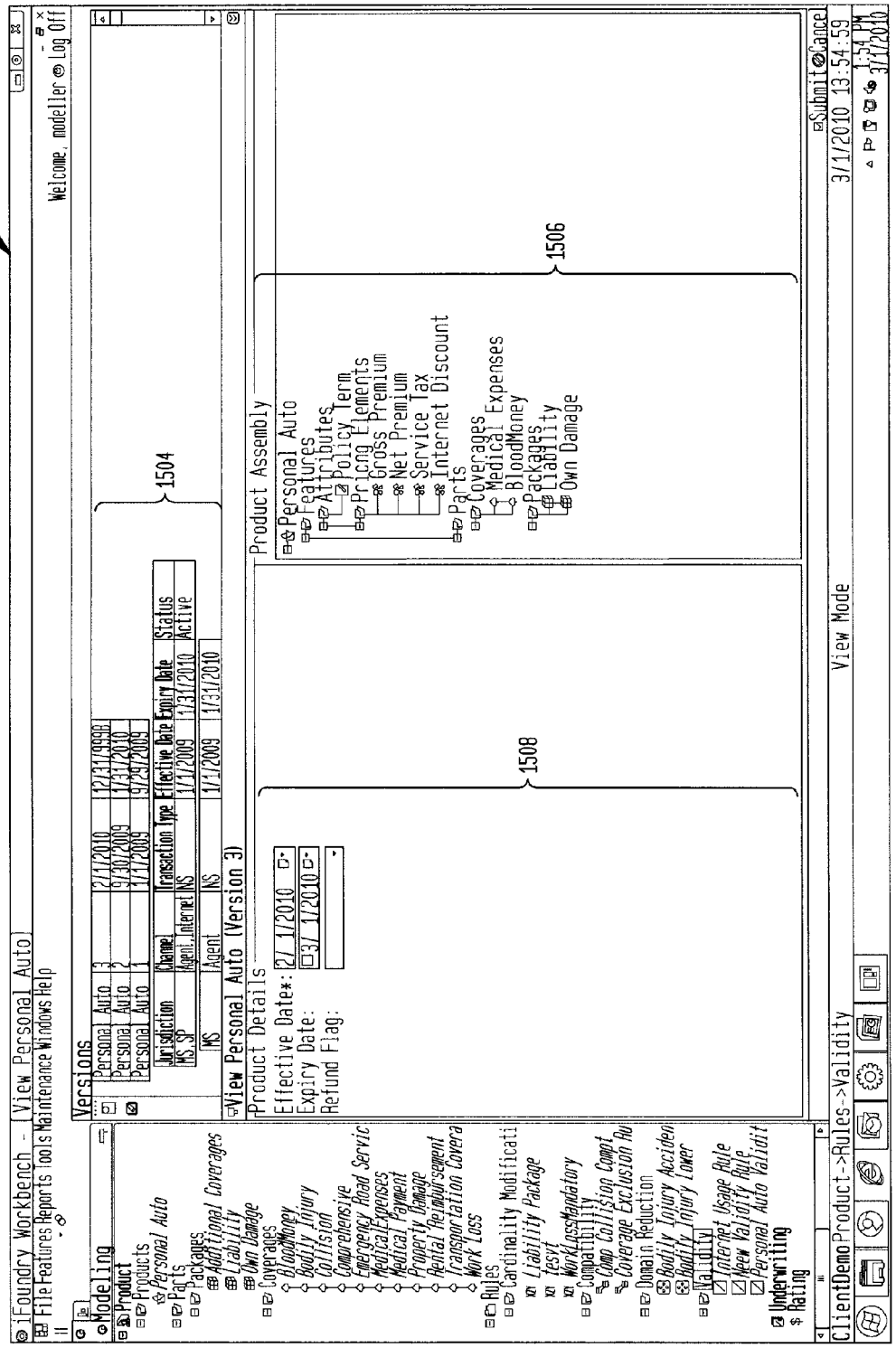
FIG. 15 illustrates one example of a graphical user interface for preparing a product definition for a configurable product.

Turning next to FIGS. 15-20 and with reference to FIG. 3, FIGS. 15-20 illustrate exemplary graphical user interfaces for interacting with the modeling workbench 116 for configuring a configurable product and the various types of product configuration rules. FIG. 15 illustrates one example of a graphical user interface 1502 for preparing a product definition for a configurable product. The product definition may define the various product attributes and product attribute values for the configurable product. The graphical user interface 1502 includes three sections for preparing the product definition, including a versioning section 1504 for interacting with the various versions of the product definition, a product assembly section 1506 for interacting with the various product attributes of the configurable product, and a product detail section 1508 for interacting with the details of the product definition.

Figure 16:
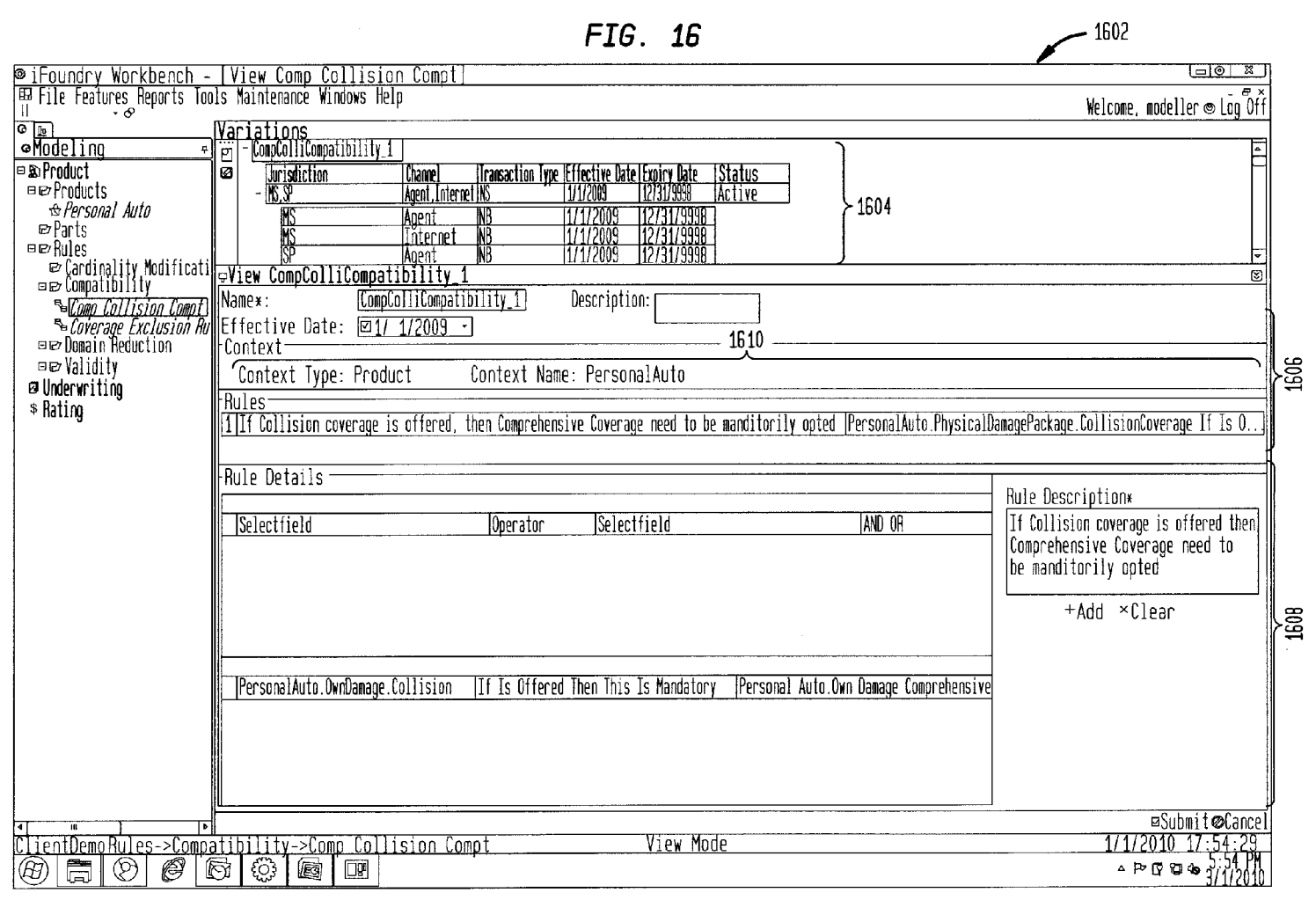
Figure 17:
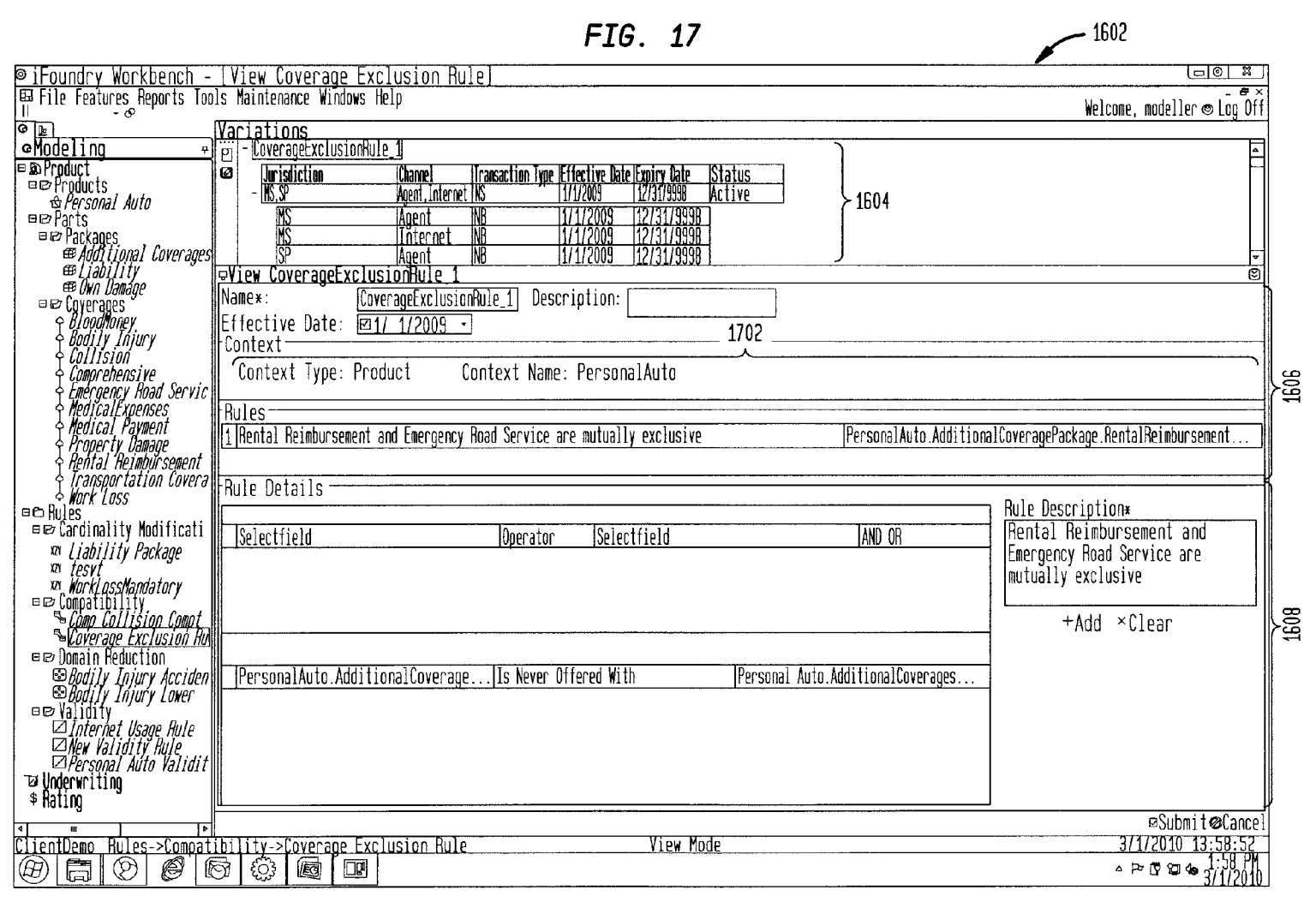
Figure 18:
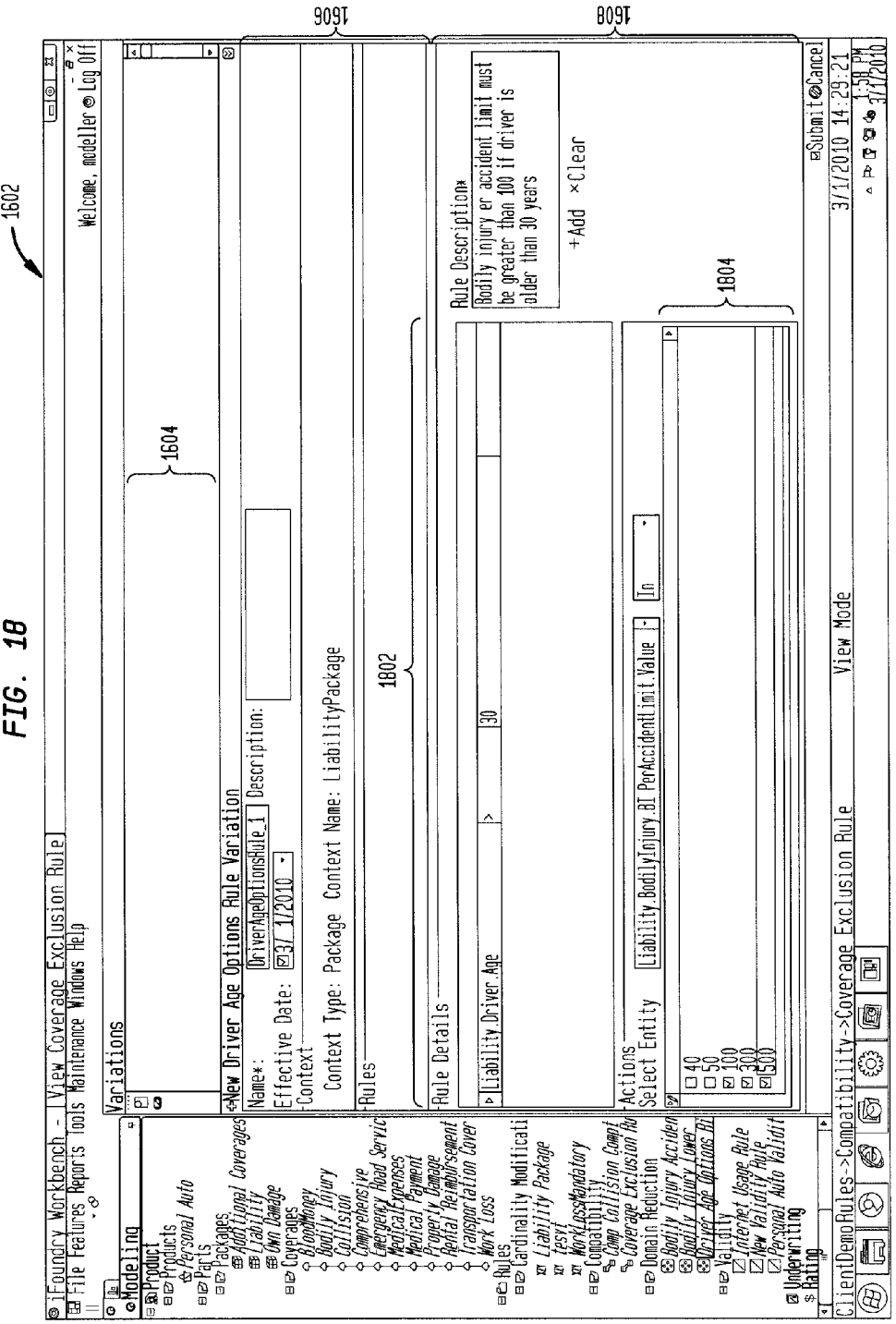

FIGS. 16-18 illustrate an exemplary graphical user interface 1602 for interacting with the modeling workbench 116 to configure various product configuration rules of the non-conditional rule type. As discussed briefly above, a product configuration rule of the non-conditional rule type may be a class one product configuration rule; that is, a product configuration rule evaluated by the product configuration server 110. Starting with FIG. 16, this figure illustrates one example of the graphical user interface 1602 for configuring a collision coverage product configuration rule 1610. In one implementation, the collision coverage product configuration rule 1610 states that if a collision coverage attribute is offered, then a comprehensive coverage attribute is selected. As shown in FIG. 16, the graphical user interface 1602 includes a versioning section 1604 to select a version of the product configuration rule, a view section 1606 to view and/or edit the collision coverage product configuration rule 1610, and a rule detail section 1608 to view and/or edit various details of the collision coverage product configuration rule 1610. As shown in FIGS. 17-21, the graphical user interface 1602, including the sections 1604-1608, may be used to configure other product configuration rules and/or other product configuration rule types.

FIG. 17 illustrates another example of the graphical user interface 1602. In FIG. 17, the graphical user interface 1602 displays the details for a coverage exclusion product configuration rule 1702. In one implementation, the coverage exclusion product configuration rule 1702 states that a rental reimbursement attribute and an emergency road service attribute are mutually exclusive.

FIG. 18 illustrates a further example of the graphical user interface 1602. In FIG. 18, the graphical user interface 1602 displays the details for a bodily injury accident limit product configuration rule 1802. In one implementation, the bodily injury accident limit product configuration rule 1802 states that a bodily injury accident limit attribute value must be greater than 100 if a driver is older than 30 years of age. The graphical user interface may further display various attribute values 1804 that may be selected by a user configuring the bodily injury accident limit product configuration rule 1802 for offering to a customer when the bodily injury accident limit product configuration rule 1802 is evaluated for a driver older than 30 years of age.

Figure 19:
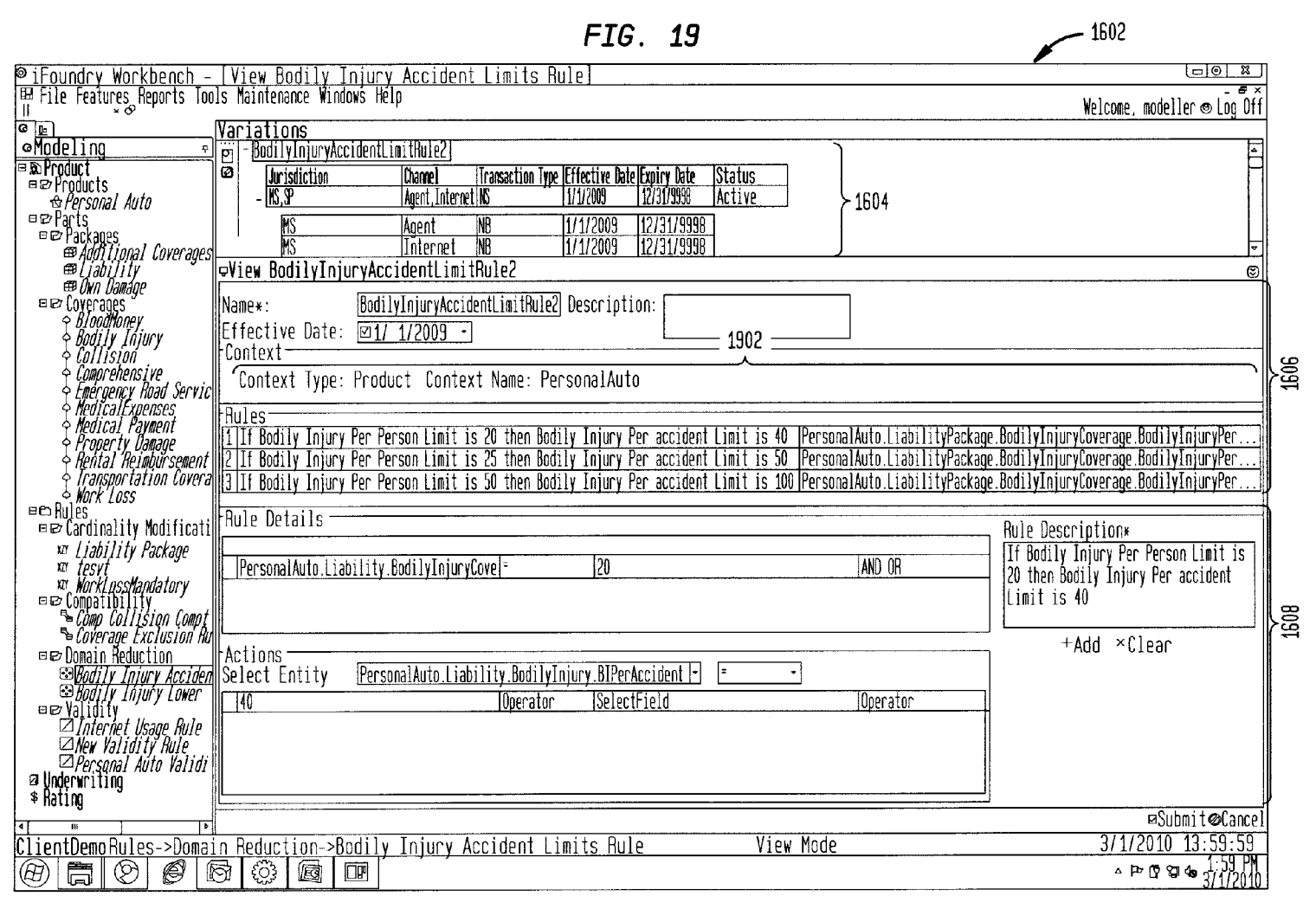

FIG. 19 illustrates yet another example of the graphical user interface 1602. In FIG. 19, the graphical user interface 1602 displays the details for several bodily injury accident limit product configuration rules 1902. However, in contrast to the bodily injury accident limit product configuration rule 1802 shown in FIG. 18, the bodily injury accident limit product configuration rules 1902 may be of the product conditional rule type. Moreover, the bodily injury accident limit product configuration rules 1902 may be class two product configuration rules; that is, product configuration rules that are evaluated by the client device 102 and/or the product configuration server 110. As shown in FIG. 19, the bodily injury accident limit product configuration rules 1902 include such rules as "If the bodily injury per person limit is 20, then the bodily injury per accident limit is 40," or "If the bodily injury per person limit is 25, then the bodily injury per accident limit is 50."

Figure 20:
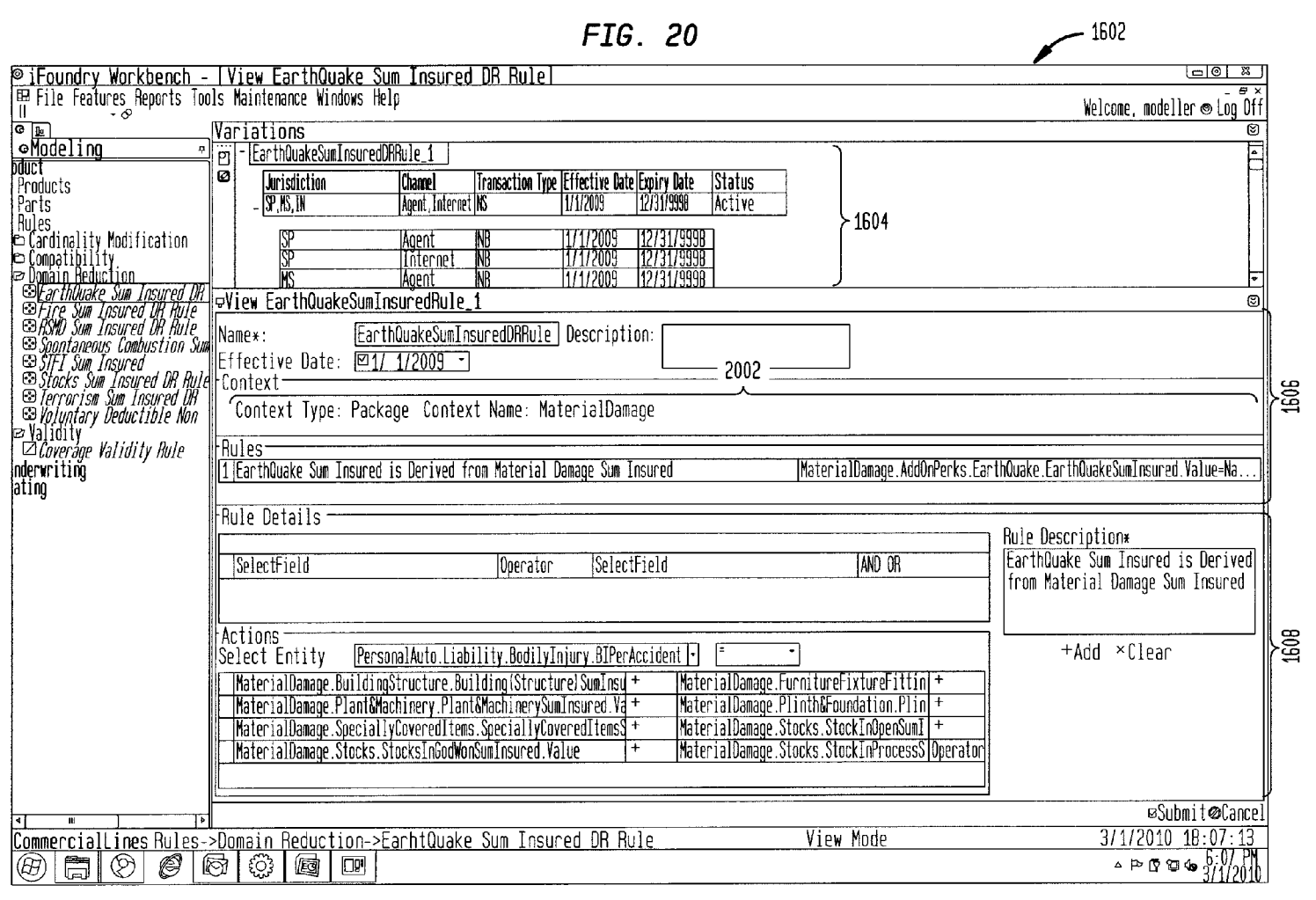

FIG. 20 illustrates yet a further example of the graphical user interface 1602. In FIG. 20, the graphical user interface 1602 displays the details for an earthquake summation product configuration rule 2002. In one implementation, the earthquake summation product configuration rule 2002 states that an earthquake summation insured is derived from a material damage sum insured. The earthquake summation product configuration rule 2002 is one example of a product conditional aggregation rule, which may be a class three product configuration rule.

Figure 21:
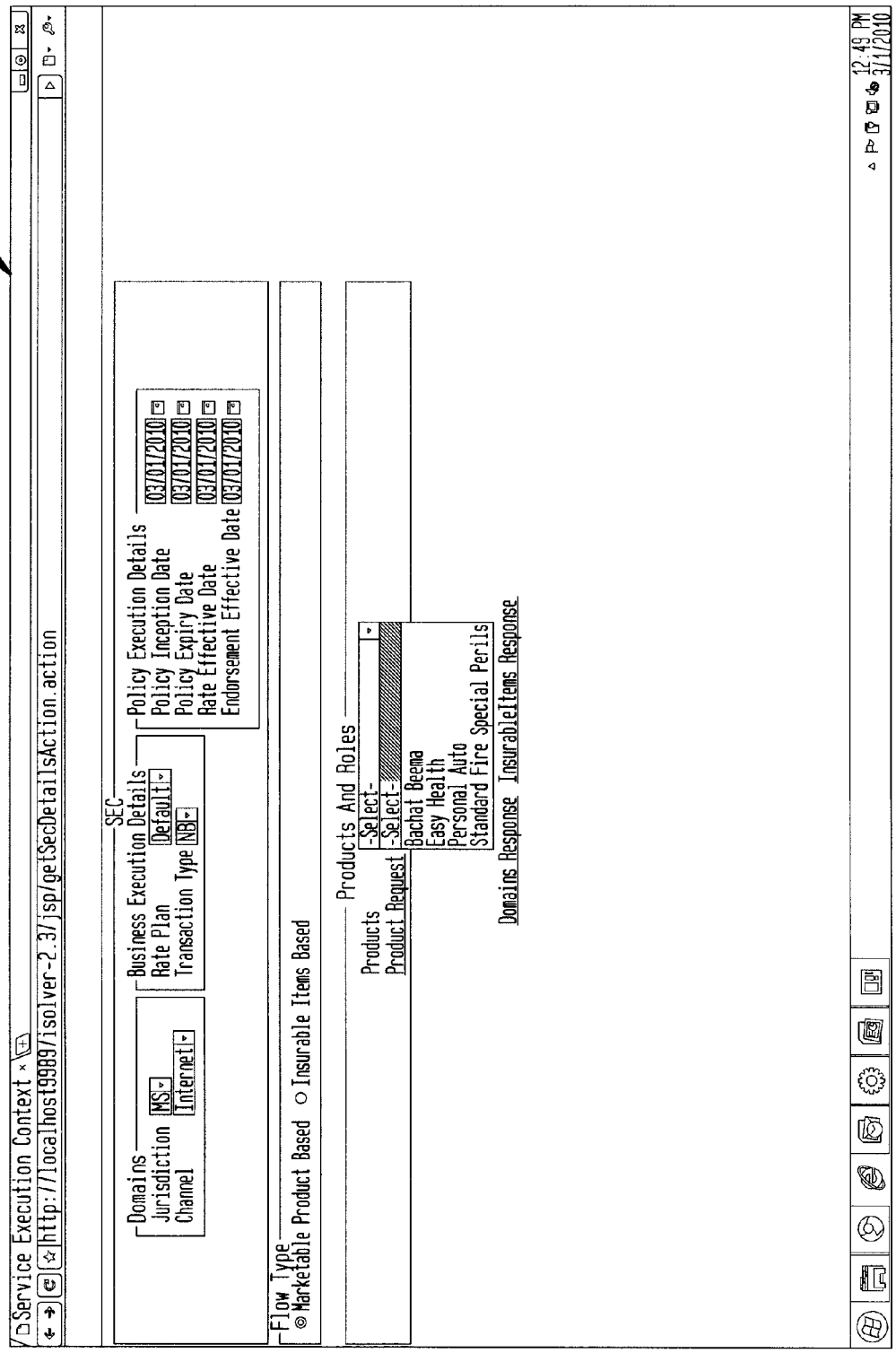

Turning next to FIGS. 21-32, and with reference to FIG. 14, are exemplary graphical user interfaces for interacting with a network application 234. The network application 234 may be operative to receive input from a user for configuring an insurance product. FIG. 21 illustrates one exemplary graphical user interface 2102 that may be displayed to a user when a user first engages the network application 234. Initially, the network application 234 may request that the user select a configurable product to configure. As shown in FIG. 22, the configurable products initially selectable by the user may include "Bachat Beema," "Easy Health," "Personal Auto," and "Standard Fire Special Perils." FIGS. 22-32 display graphical user interfaces as if the customer had selected the "Personal Auto" configurable product.

FIG. 22 illustrates one example of a graphical user interface 2202 for providing and selecting various customer attribute values for a configurable product, such as the "Personal Auto" configurable product referred to in FIG. 22 above. The graphical user interface 2202 may be provide one or more customer attribute values for one or more customer attributes to the product configuration server 110. For example, the customer may provide attribute values for a driver experience attribute, a driver age attribute, an automobile year attribute, a vehicle type attribute, a vehicle cost attribute, or other customer attributes. The attribute values for the various customer attributes shown in FIG. 22 may be transmitted to the product configuration server 110 for evaluating one or more class one product configuration rules. After the product configuration server 110 has evaluated the one or more class one product configuration rules, the product configuration server 110 may instruct the network application 234 to display additional graphical user interfaces for further configuring the configurable product.

With reference to FIG. 16, FIGS. 23-24 illustrate examples of a graphical user interface 2302 and 2402 that may be displayed after the graphical user interface 2202. In particular, FIGS. 23-24 illustrate an example where the collision coverage product configuration rule 1610 may be evaluated based on a selected attribute value. As shown in FIG. 23, a graphical user interface 2302 may include the option of selecting a collision attribute 2304 or a comprehensive attribute 2306. In FIG. 23, neither the collision attribute 2304 nor the comprehensive attribute 2306 is selected. However, as the collision cover product configuration rule 1610 provides, when the collision attribute 2304 is selected, the comprehensive attribute 2306 must also be selected. The evaluation of the collision coverage product configuration rule 1610 is illustrated in FIG. 24. In FIG. 24, a customer has selected the collision attribute 2304, which caused the evaluation of the collision coverage product configuration rule 1610, and thereby has caused the automatic selection of the comprehensive attribute 2306. In other words, selecting the collision attribute 2304 automatically caused the selection of the comprehensive attribute 2306. The automatic selection of the comprehensive attribute 2306 is one example of an evaluation of a product configuration rule of the non-conditional product configuration rule type.

Figure 26:
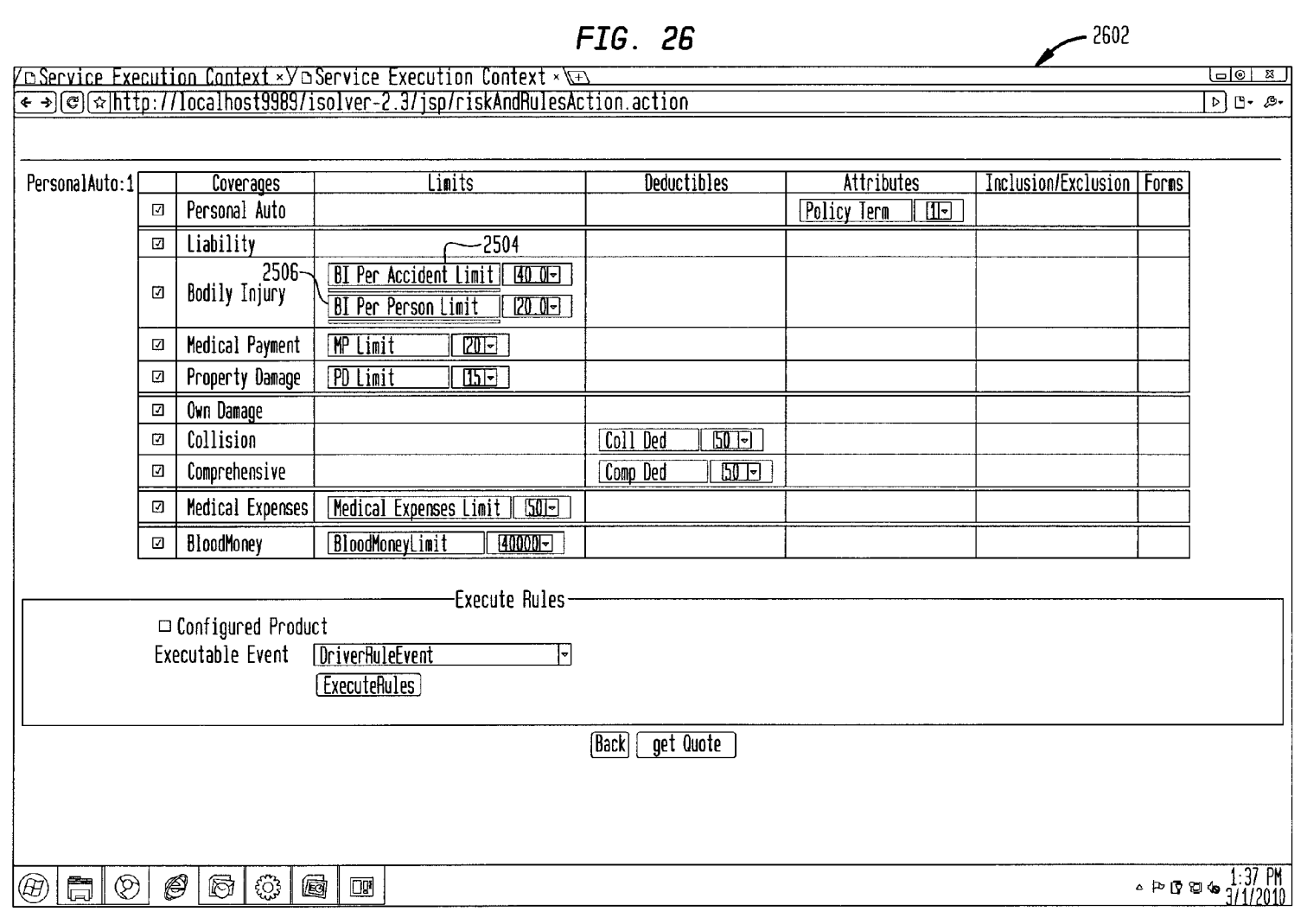

With reference to FIG. 19, FIGS. 25-29 illustrate various examples of graphical user interfaces 2502-2902 displayed during the evaluation of a product configuration rule of the product conditional rule type. In particular, the various graphical user interfaces 2502-2902 illustrate the evaluation of the bodily injury accident limit product configuration rules 1902. Starting with FIG. 25, a graphical user interface 2502 may display selectable attribute values for a bodily injury per accident limit attribute 2504 and a bodily injury per person limit attribute 2506. As shown in FIG. 26, when the bodily injury per person limit attribute is an attribute value other than "20," "25," or "50," multiple bodily injury per accident product attribute values may be selectable, such as "40.0," "50.0," "100.0," "300.0," "500.0," or other attribute values.

Figure 27:
Figure 28:
Figure 29:
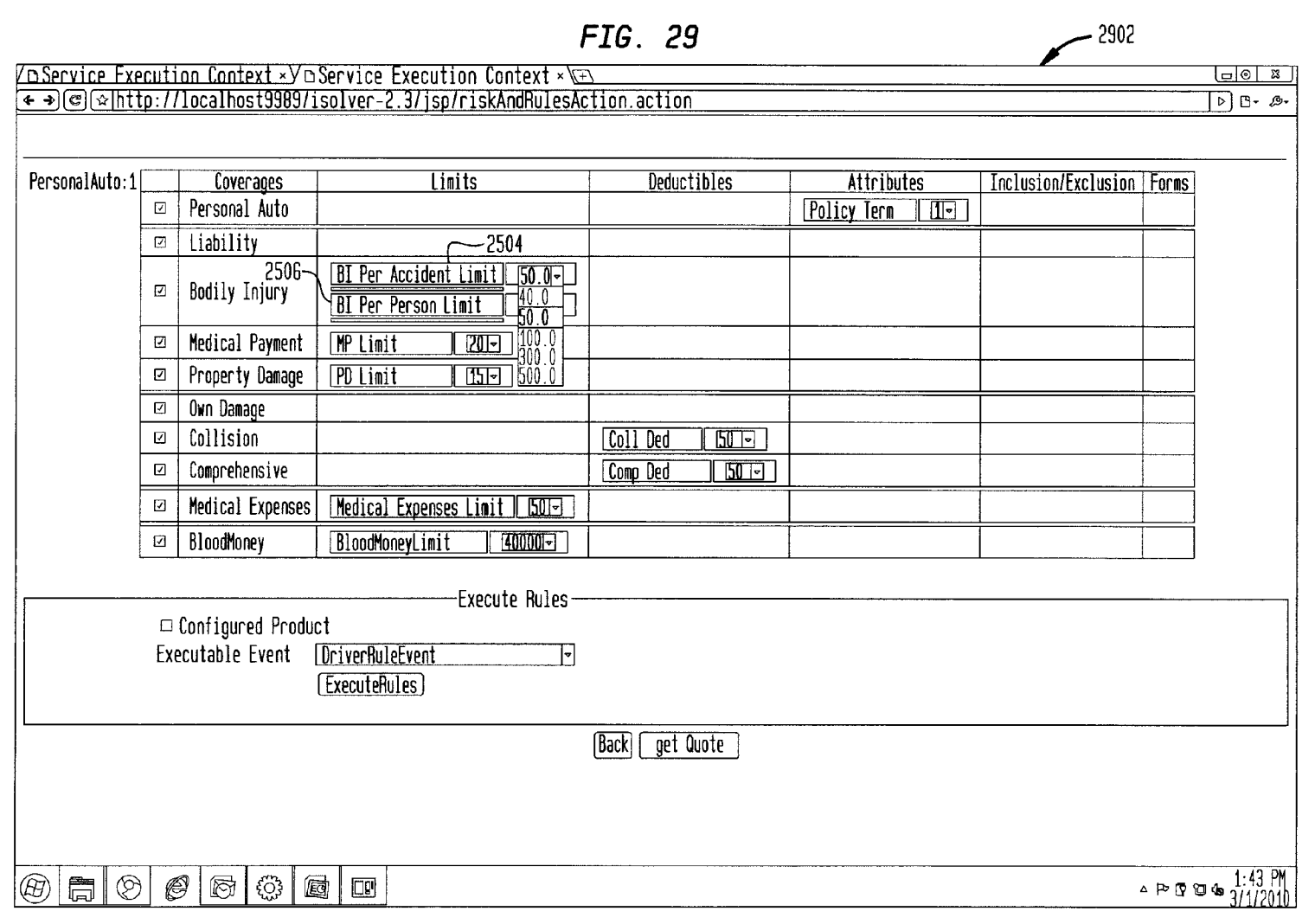

In FIGS. 26-29, the selection of an attribute value for the bodily injury per person limit attribute 2506 may limit which attribute values for the bodily injury per accident limit attribute 2504 are offered or selectable by the customer. In FIG. 26, when the bodily injury per person limit attribute value is selected as "20.0," the bodily injury accident limit product configuration rules 1902 may be evaluated to determine that the only selectable bodily injury per accident limit attribute value is "40.0." Similarly, FIGS. 27-29 illustrate that when the bodily injury per person limit attribute is changed to "25.0," the client device 102 and/or the product configuration server 110 may determine, based on evaluating the bodily injury accident limit product configuration rules 1902, that the only selectable attribute value for the bodily injury per accident limit attribute 2504 is "50.0." Although, as FIG. 29 illustrates, one or more attribute values for the bodily injury per accident limit attribute 2504 may be displayed to the customer even when the bodily injury per person limit attribute value is selected as "25.0," these other attribute values may not be selectable by the customer. In other words, the evaluation of one or more product configuration rules may limit which attribute values are selectable by a customer, even though the non-selectable values are displayed to the customer. In other implementations of the graphical user interfaces 2602-2902, non-selectable attribute values may not be displayed to the customer.

Figure 32:
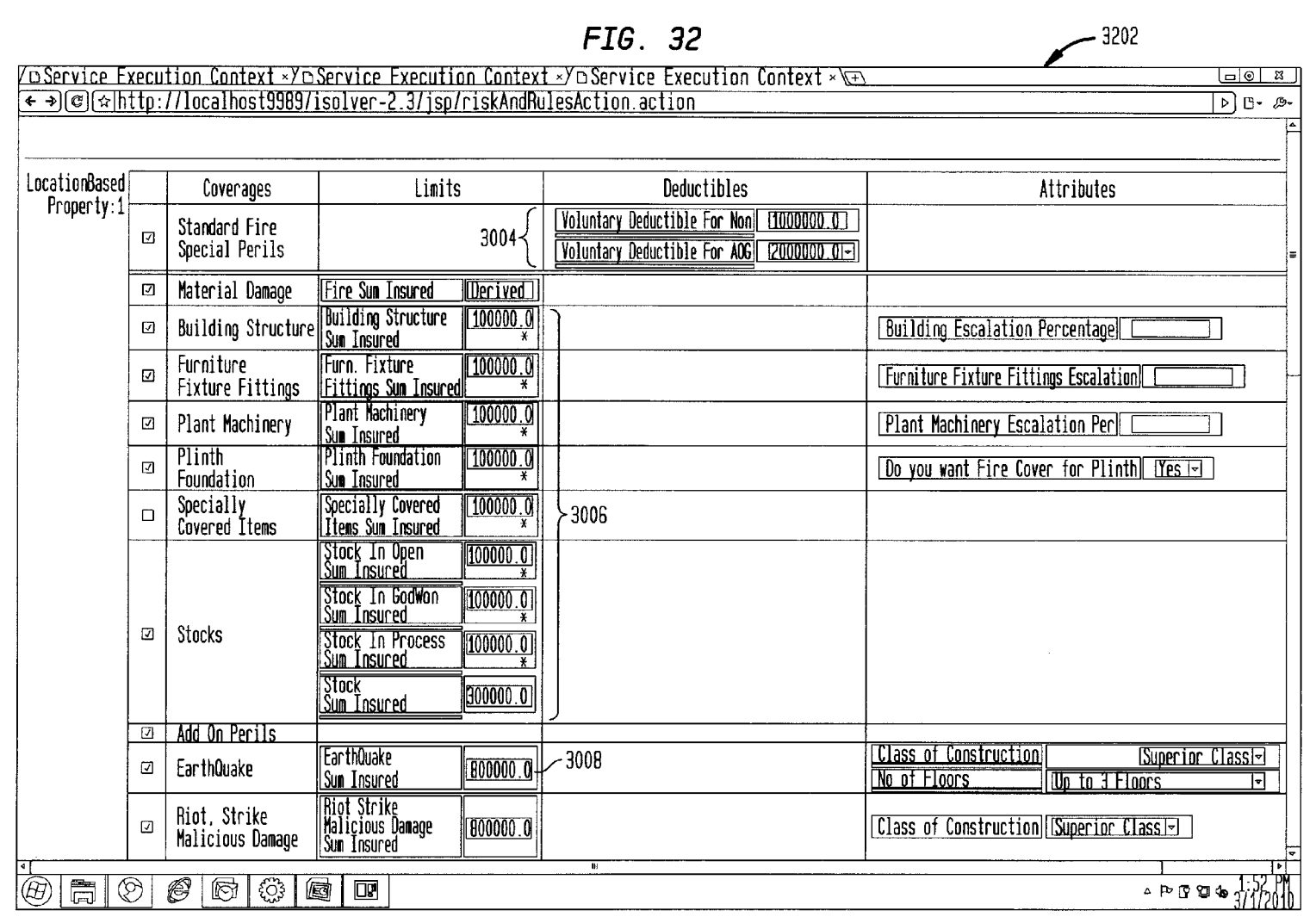

Turning next to FIGS. 30-32, and with reference to FIG. 20, these figures illustrate various examples of graphical user interfaces 3002-3202 displayed during the evaluation of the earthquake summation product configuration rule 2002. Referring to the earthquake summation product configuration rule 2002, graphical user interfaces 3002-3202 illustrate that an earthquake sum insured product attribute 3008 may be determined based on a set of deductible product attributes 3004 and a set of coverages product attributes 3006. More generally, and with reference to FIGS. 30-32, a product aggregation rule may be defined for any of the sum insured fields that may derive its value from other sum insured fields illustrated in the graphical user interfaces 3002-3202.

Figure 33:
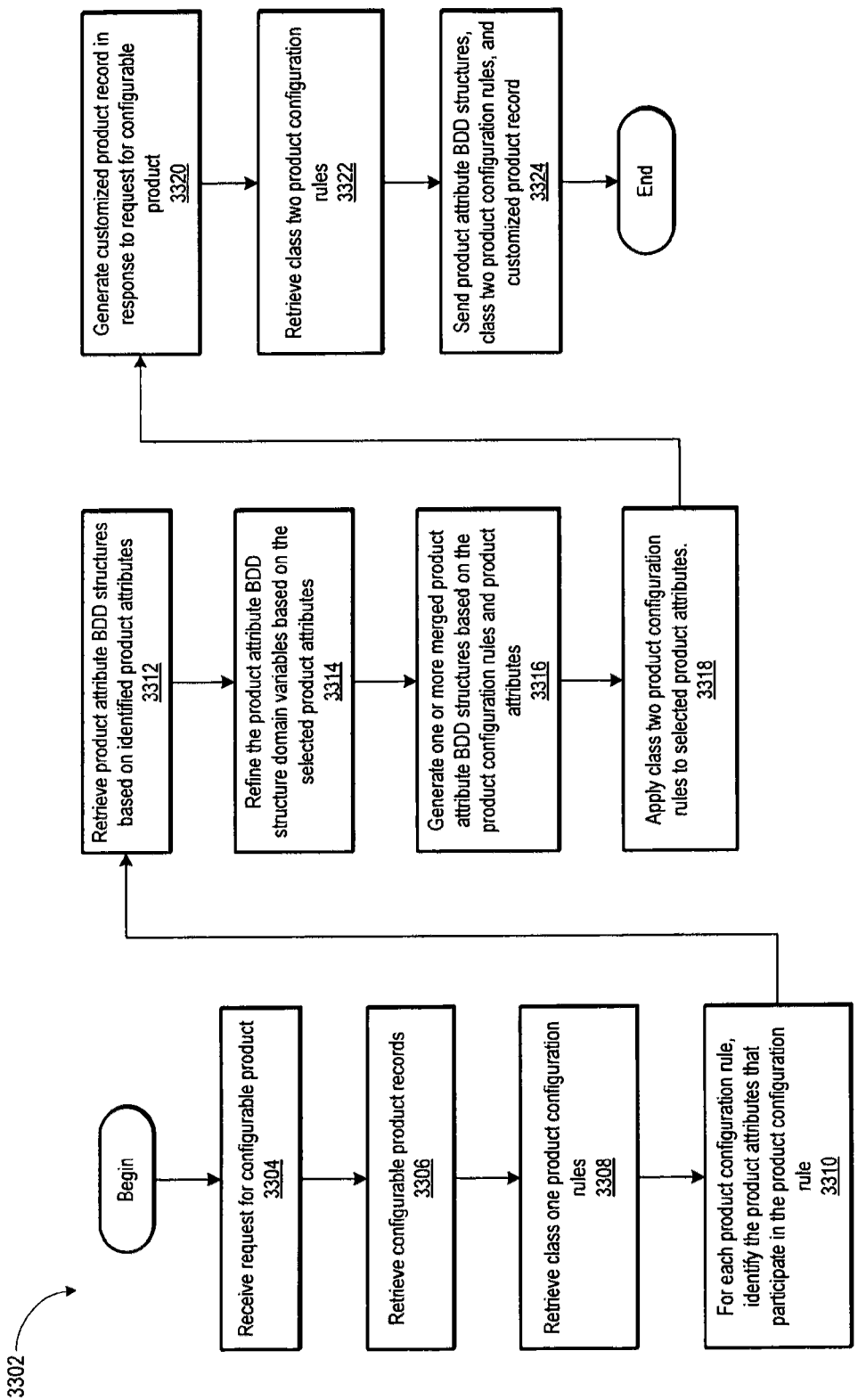
FIG. 33 illustrates one example of logic flow for preparing a customized product record for sending in response to a request to configure a configurable product.

Turning next to FIG. 33, and with reference to FIG. 14, is an illustration of one example of logic flow 3302 for preparing a customized product record for sending in response to a request to configure a configurable product. Initially, the product configuration server 110 may receive a request from the client device 102 to view configurable products (Block 3304). As part of an initial response, the product configuration server 110 may present a list of configurable products. The product configuration server 110 may then receive a selection of a configurable product to configure and may then retrieve one or more product records for the selected configurable product (Block 3306).

After retrieving the one or more product records, the product configuration server 110 may then determine which product configuration rules should be initially evaluated, such as class one product configuration rules. The product configuration server 110 then retrieves the class one product configuration rules (Block 3308) and, in one implementation, for each class one product configuration rule, the product configuration server 110 may identify one or more product attributes of the configurable product that participate(s) in the class one product configuration rules (Block 3310).

Based on the identified product attributes, the product configuration server 110 may then retrieve corresponding product attribute BDD structures (Block 3312). The product configuration server may then refine the variables of the product attribute BDD structures based on the selected product attributes and product configuration rules (Block 3314). Refining the variables of the product attribute BDD structures may include an instance where the allowed channel options for a user request may be reduced from "NBC", "CBS", "ABC", "FOX", "CNN", "CNBC", "Bloomberg", "Weather Channel" to "NBC", "CBS", "ABC", "FOX", "CNN", "CNBC". i.e., based on a user request and a selected product configuration rule. After refining the variables of one or more of the product attribute BDD structures, the product configuration server 110 may then generate one or more merged product attribute BDD structures, such as the merged product attribute BDD structure 1202 shown in FIG. 12, based on the product configuration rules in which one or more product attributes participate (Block 3316).

Next, the product configuration server 110 may apply class two product configuration rules to selected product attributes (Block 3318). The product configuration server 110 may then generate a customized product record for sending in response to the request for the configurable product (Block 3320).

Figure 34:
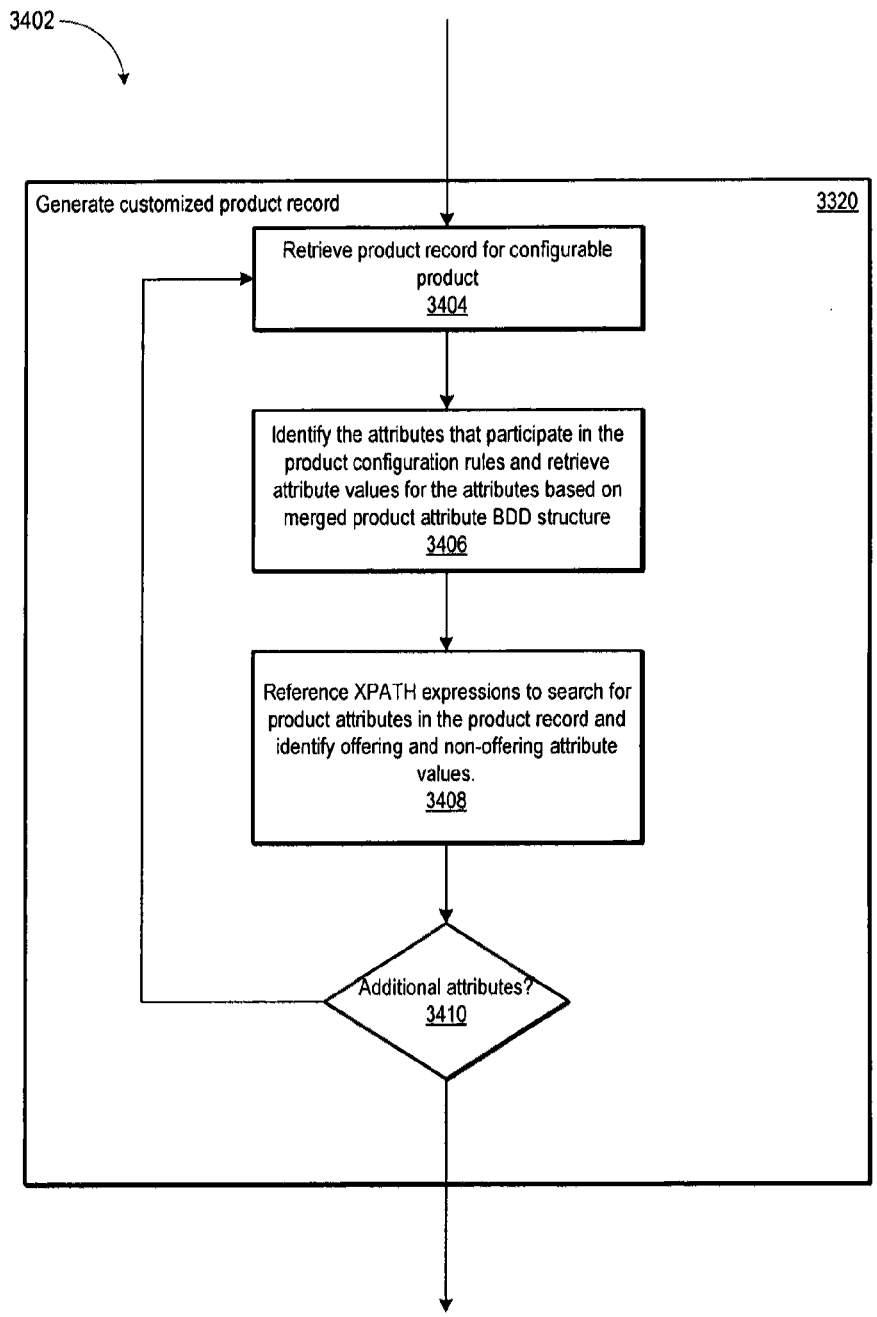
FIG. 34 illustrates one example of logic flow regarding additional details for preparing the customized product record.

FIG. 34 illustrates one example of logic flow 3402 for generating the customized product record. The product configuration server 110 may first retrieve or analyze the product record for the configurable product to identify the attributes of the configurable product (Block 3404). The product configuration server 110 may base the attributes of the customized product record on the attributes of the initial product record. Then, the product configuration server 110 may analyze the product configuration rules, such as the class one, two, or three, product configuration rules, and retrieve attribute values to include in the customized product record based on one or more merged product attribute BDD structures or other product attribute BDD structures (Block 3406). Thereafter, the product configuration server 110 may reference the XPATH expressions of the one or more merged product attribute BDD structures or other product attribute BDD structures to identify offering and non-offering attribute values (e.g., selectable and non-selectable attribute values) for the product attributes of the customized product record (Block 3408). The foregoing actions of FIG. 34 may be repeated for each of the product attributes of the configurable product that are to be included in the customized product record (Block 3410).

Referring back to FIG. 33, the product configuration server may then retrieve one or more class two product configuration rules to send in response to the request for the configurable product (Block 3324). Finally, the product configuration server 110 may then send the customized product record, one or more class two product configuration rules, and one or more corresponding product attribute BDD structures (merged or otherwise), in response to the request for the configurable product (Block 3326).

Figure 35:
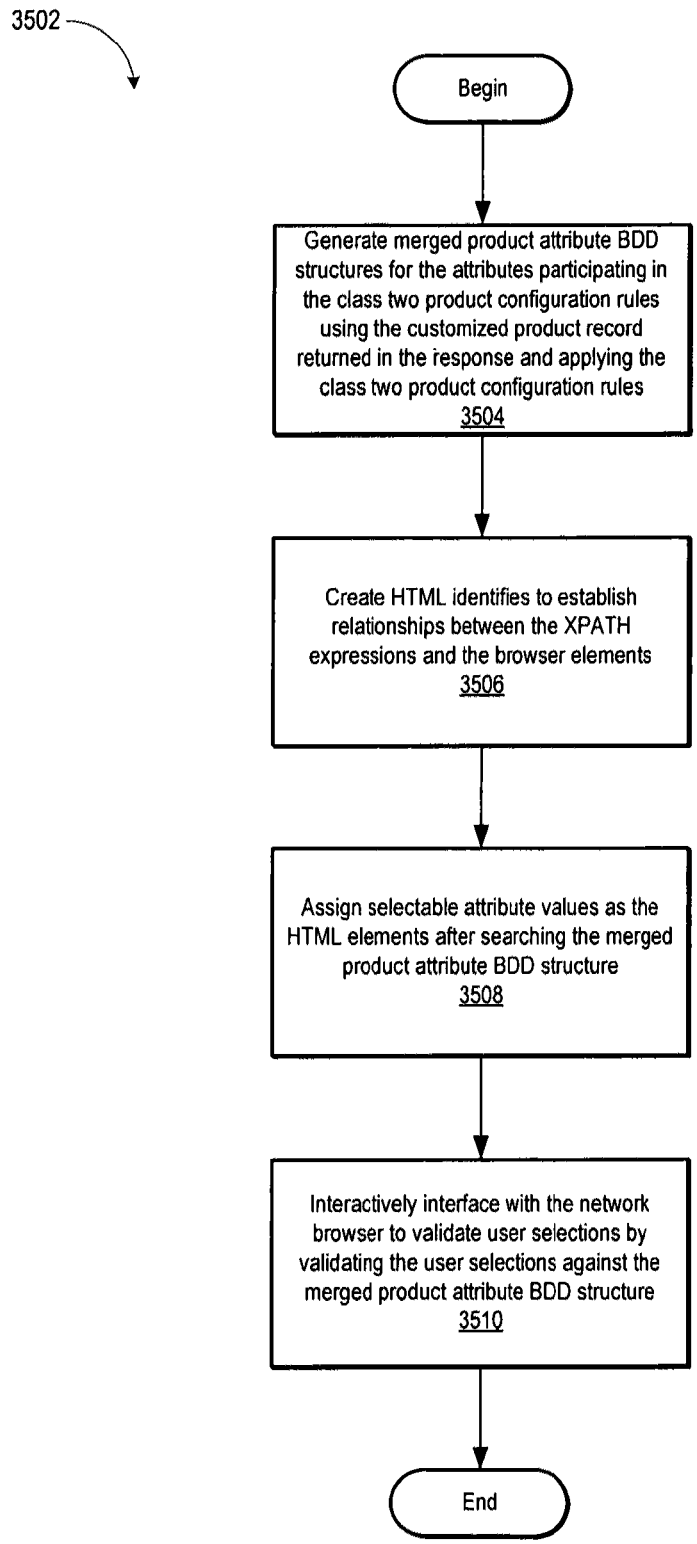
FIG. 35 illustrates one example of logic flow for displaying selectable attribute values to a customer based on the customized product record.

Referring next to FIG. 35 is an illustration of one example of logic flow 3502 for displaying selectable attribute values to a customer based on the customized product record. The logic flow 3502 may be implemented by the client device 102, such as by the network browser 232, the network browser extension 236, the network application 234, or any other component of the client device 102.

Initially, the client device 102 may receive the various product attribute BDD structures, the class two product configuration rules, and the customized product record from the product configuration server 110. Thereafter, the client device 102 may generate one or more merged product attribute BDD structures for the product attributes participating in the class two product configuration rules using the customized product record to identify which product attributes participate in the class two product configuration rules (Block 3504). The client device 102 may also apply one or more class two product configuration rules to selected product attributes displayed on one or more graphical user interfaces (Block 3504). The client device 102 may then generate Hypertext Markup Language ("HTML") identifiers for the network application 234 to establish relationships between the XPATH expressions of the various product attribute BDD structures and the network application elements of the network application (Block 3506). The HTML identifiers are one example of a mechanism by which the network browser 232 or the network application 234 may refer to the XPATH expressions.

The client device 102 may then determine which attribute values are selectable by a customer using the network browser 232. For example, the client device 102 may assign selectable values as HTML elements after searching through the one or more merged product attribute BDD structures to determine which attribute values are selectable or non-selectable (Block 3508). Thereafter, the client device 102 may interactively interface with the network browser 232 to validate user selections by validating the user selections against the one or more merged product attribute BDD structures or other product attribute BDD structures (Block 3510).

Figure 36:
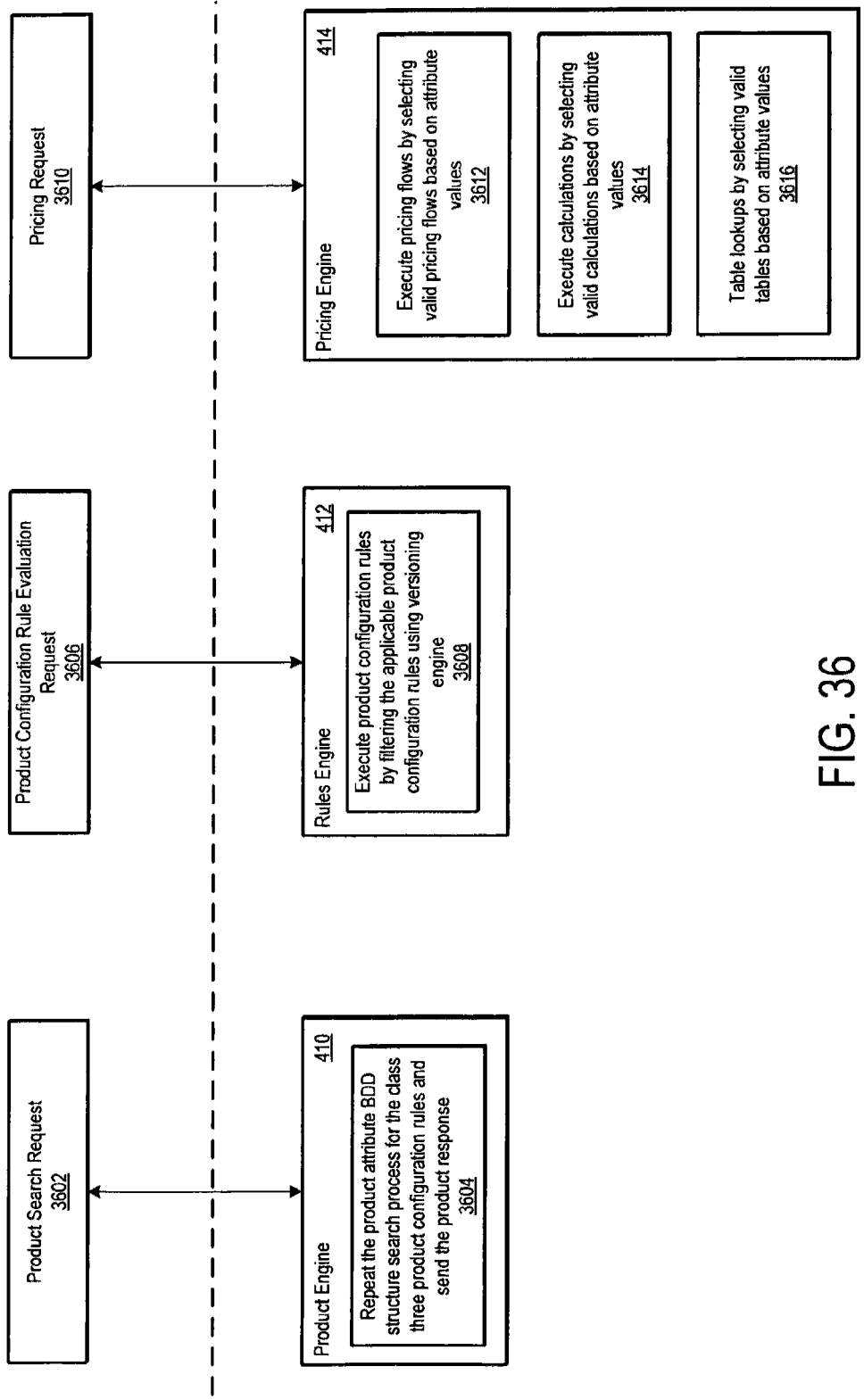
FIG. 36 illustrates one example of other actions that one or more of the engines from FIG. 4 may take in response to one or more requests.

Referring to FIG. 36 is an illustration of other actions that one or more of the engines 410-416 may take in response to one or more requests. For example, with regard to the product engine 410, the product engine 410 may repeat the product attribute BDD structure search process for the class three product configuration rules in response to product search request (Block 3602) and send a product response that includes the results of this product attribute BDD structure search (Block 3604). The product attribute BDD structure search based on class three product configuration rules may occur at any time after a request for a configurable product is received. For example, the product attribute BDD structure search based on class three product configuration rules may occur prior to sending a customized product record to the client device 102 or even after sending the customized product record to the client device 102.

With regard to the rules engine 412, in response to a product configuration rule evaluation request (Block 3606) the rules engine 412 may evaluate one or more product configuration rules to facilitate the generation of the one or more product attribute BDD structures. Moreover, the rules engine 412 may determine which product configuration rules to evaluate by filtering the various product configuration rules using the versioning engine (Block 3608). The product configuration rule evaluation request may be received externally from any system, such as from the client device 102, or internally from any component, such as the product engine 410.

With regard to the pricing engine 414, the pricing engine 414 may take one or more pricing actions in response to a pricing request (Block 3610). For example, the pricing engine 414 may execute one or more pricing flows by selecting valid pricing flows based on attribute values, such as customer attribute values or product attribute values (Block 3612). In addition, the pricing engine 414 may execute one or more calculations by selecting valid calculations based on one or more attribute values, such as the customer attribute values or product attribute values (Block 3614). Furthermore, the pricing engine 414 may conduct one or more table lookups in a pricing table based on the customer attribute values and/or the product attribute values (Block 3616).

The systems may be implemented in software, hardware, or a combination of software and hardware. The systems, logic, and/or modules may be implemented in a computer programming language, such as C# or Java, or any other computer programming language now known or later developed. The systems, logic, and/or modules may also be implemented in a computer scripting language, such as JavaScript, PHP, ASP, or any other computer scripting language now known or later developed. Furthermore, one or more of the systems, logic, and/or modules may be implemented using a combination of computer programming languages and computer scripting languages.

Furthermore, the systems may be implemented with additional, different, or fewer components. As one example, a processor or any other logic or component may be implemented with a microprocessor, a microcontroller, a DSP, an application specific integrated circuit (ASIC), program instructions, discrete analog or digital logic, or a combination of other types of circuits or logic. As another example, memories may be DRAM, SRAM, Flash or any other type of memory. The systems may be distributed among multiple components, such as among multiple processors and memories, optionally including multiple distributed processing systems.

Logic, such as programs or circuitry, may be combined or split among multiple programs, distributed across several memories and processors, and may be implemented in or as a function library, such as a dynamic link library (DLL) or other shared library. The DLL, for example, may store code that implements functionality for a specific module as noted above. As another example, the DLL may itself provide all or some of the functionality of the system.

Moreover, one or more networks may be implemented as any combination of networks. A network may be a WAN, such as the Internet; a LAN; a Personal Area Network ("PAN"), or a combination of WANs, LANs, and PANs. Moreover, a network may involve the use of one or more wired protocols, such as SOAP; wireless protocols, such as 802.11a/b/g/n, Bluetooth, or WiMAX; transport protocols, such as TCP or UDP; an Internet layer protocol, such as IP; application-level protocols, such as HTTP, a combination of any of the aforementioned protocols, or any other type of network protocol now known or later developed.

Interfaces between the systems and the logic and modules within systems may be implemented in numerous ways. For example, interfaces between systems may be Web Services, Simple Object Access Protocol, or Enterprise Service Bus interfaces. Other examples of interfaces include message passing, such as publish/subscribe messaging, shared memory, and remote procedure calls.

Although aspects of the invention herein have been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the invention as defined by the appended claims. Furthermore, while certain operations and functions are shown in a specific order, they may be performed in a different order unless it is expressly stated otherwise.

The invention claimed is:

1. A computer-implemented system for providing selectable attribute values for one or more products, comprising:
   at least one memory storage device storing:
      a set of product records that identify products potentially selectable by a user, wherein the product records comprise product attributes that represent one or more features of a product, wherein the product attributes comprise one or more attribute values; and
      one or more product configuration rules used to define permissible or impermissible product configurations and attributes of the products;
   at least one processor programmed to:
      create one or more attribute binary decision diagram (BDD) structures representative of the product attributes, the BDD structures including offering attribute nodes representative of product attribute values selectable by the user based on the product configuration rules, and non-offering attribute nodes representative of product attribute values not selectable by the user based on the product configuration rules; and
      evaluate the BDD structures and prepare a customized set of product records for transmission to the user, wherein the customized set of product records contains product attribute values corresponding to the offering attribute nodes.

2. The computer-implemented system of claim 1, wherein the at least one processor is further programmed to:
   analyze the product configuration rules to determine whether the product attributes are involved in evaluating the product configuration rules;
   when the product attributes are involved in evaluating the product configuration rules, generate and store the BDD structures in the memory storage device.

3. The computer-implemented system of claim 1, wherein the at least one processor is further programmed to:
   assign a query-language formatted expression to each attribute node of at least one attribute BDD structure, wherein each of the query-language formatted expressions identifies the product attribute value corresponding to the attribute node of the assigned query-language formatted expression;
   evaluate the at least one attribute BDD structure to identify whether at least one attribute node of the at least one attribute BDD structure is a non-offering attribute node; and
   when the at least one attribute node of the at least one attribute BDD structure is identified as a non-offering attribute node, evaluate the query-language formatted expression assigned to the at least one non-offering attribute node to identify a location of the product attribute value in a corresponding at least one product record; and customize at least one customized product record by:

including the product attribute value of the at least one product record in the at least one customized product record; and identifying that the product attribute value of the at least one customized product record is not selectable by the user.

4. The computer-implemented system of claim 1, wherein the at least one processor is further programmed to:

assign a query-language formatted expression to the at least one attribute BDD structure, wherein the query-language formatted expression identifies the location of the product attribute represented by the at least one attribute BDD structure in a corresponding product record; and, customize at least one customized product record by:

evaluating the query-language formatted expression to locate the at least one attribute in the corresponding product record;

identifying whether a product attribute value for the at least one attribute has a corresponding non-offering node in the least one attribute BDD structure;

including the product attribute value of the at least one attribute of the corresponding product record in the at least one customized product record; and when the product attribute value of the at least one attribute has a corresponding non-offering node in the at least one attribute BDD structure, identifying that the product attribute value of the at least one customized product record is not selectable by the user.

5. The computer-implemented system of claim 4, wherein the at least one processor is further programmed to customize the at least one customized product record by:

including each product attribute value of the product attribute of the corresponding product record in the at least one customized product record; and, for each product attribute value of the product attribute, identifying that the product attribute value of the at least one customized product record is not selectable by the user when the product attribute value of the product attribute has a corresponding non-offering node in the at least one attribute BDD structure.

6. The computer-implemented system of claim 4, wherein the query-language formatted expression is structured to navigate through an electronic document formatted according to an extensible markup language.

7. The computer-implemented system of claim 1, wherein at least one product record of the set of products records is structured according to a meta-language syntax, wherein the meta-language syntax comprises at least one element of data content and at least one element identifier that describes the type of content of the at least one element of data content.

8. The computer-implemented system of claim 1, wherein the at least one memory storage device is segmented into:

at least one product record repository storing the set of product records, wherein each product record of the set of product records is structured according to a meta-language syntax; and, at least one product configuration rule repository storing the one or more product configuration rules, wherein the one or more product configuration rules are structured according to the meta-language syntax; wherein:

the meta-language syntax comprises at least one element of data content and at least one element identifier that describes the type of content of the at least one element of data content.

9. The computer-implemented system of claim 8, wherein the meta-language syntax comprises an extensible markup language.

10. The computer-implemented system of claim 1, wherein at least one product configuration rule of the product configuration rules has a rule type selected from a group of rule types comprising:

a non-conditional rule type, wherein the non-conditional rule type comprises an action statement that is not dependent upon a conditional statement;

a product conditional rule type, wherein the product conditional rule type comprises an action statement dependent upon a conditional statement comprising a product attribute value; and, a customer conditional rule type, wherein the customer conditional rule type comprises an action statement dependent upon a conditional statement comprising a customer attribute value.

11. A computer-implemented method for providing selectable attribute values for one or more products, comprising:

storing a set of product records in at least one memory storage device, wherein the set of product records identify products potentially selectable by a user, wherein the product records comprise product attributes that represent one or more features of a product, wherein the product attributes comprise one or more attribute values;

storing one or more product configuration rules in the at least one memory storage device, wherein the one or more product configuration rules are used to define permissible or impermissible product configurations and attributes of the products;

creating one or more attribute binary decision diagram (BDD) structures with at least one processor, wherein the BDD structures are representative of the product attributes, the BDD structures including offering attribute nodes representative of product attribute values selectable by the user based on the product configuration rules, and non-offering attribute nodes representative of product attribute values not selectable by the user based on the product configuration rules;

evaluating the BDD structures with the at least one processor; and, preparing a customized set of product records for transmission to the user with the at least one processor, wherein the customized set of product records contains product attribute values corresponding to the offering attribute nodes.

12. The computer-implemented method of claim 11, further comprising:

analyzing with the at least one processor the product configuration rules to determine whether the product attributes are involved in evaluating the product configuration rules; and, when the product attributes are involved in evaluating the product configuration rules, generating and storing the BDD structures in the memory storage device.

13. The computer-implemented method of claim 11, further comprising:

assigning with the at least one processor a query-language formatted expression to each attribute node of at least one attribute BDD structure, wherein each of the query-language formatted expressions identifies the product attribute value corresponding to the attribute node of the assigned query-language formatted expression;

evaluating with the at least one processor the at least one attribute BDD structure to identify whether at least one attribute node of the at least one attribute BDD structure is a non-offering attribute node;

when the at least one attribute node of the at least one attribute BDD structure is identified as a non-offering attribute node, evaluating the query-language formatted expression assigned to the at least one non-offering attribute node to identify a location of the product attribute value in a corresponding at least one product record; and customizing at least one customized product record by:
including the product attribute value of the at least one product record in the at least one customized product record; and
identifying that the product attribute value of the at least one customized product record is not selectable by the user.

14. The computer-implemented method of claim 11, further comprising:
assigning with the at least one processor a query-language formatted expression to the at least one attribute BDD structure, wherein the query-language formatted expression identifies the location of the product attribute represented by the at least one attribute BDD structure in a corresponding product record; and,
customizing at least one customized product record by:
evaluating the query-language formatted expression to locate the at least one attribute in the corresponding product record;
identifying whether a product attribute value for the at least one attribute has a corresponding non-offering node in the least one attribute BDD structure;
including the product attribute value of the at least one attribute of the corresponding product record in the at least one customized product record; and
when the product attribute value of the at least one attribute has a corresponding non-offering node in the at least one attribute BDD structure, identifying that the product attribute value of the at least one customized product record is not selectable by the user.

15. The computer-implemented method of claim 14, wherein customizing the at least one customized product record further comprises:
including each product attribute value of the product attribute of the corresponding product record in the at least one customized product record; and,
for each product attribute value of the product attribute, identifying that the product attribute value of the at least one customized product record is not selectable by the user when the product attribute value of the product attribute has a corresponding non-offering node in the at least one attribute BDD structure.

16. The computer-implemented method of claim 14, wherein the query-language formatted expression is structured to navigate through an electronic document formatted according to an extensible markup language.

17. The computer-implemented method of claim 11, wherein at least one product record of the set of products records is structured according to a meta-language syntax, wherein the meta-language syntax comprises at least one element of data content and at least one element identifier that describes the type of content of the at least one element of data content.

18. The computer-implemented method of claim 11, wherein the at least one memory storage device is segmented into:

at least one product record repository storing the set of product records, wherein each product record of the set of product records is structured according to a meta-language syntax; and, at least one product configuration rule repository storing the one or more product configuration rules, wherein the one or more product configuration rules are structured according to the meta-language syntax; wherein:

the meta-language syntax comprises at least one element of data content and at least one element identifier that describes the type of content of the at least one element of data content.

19. The computer-implemented method of claim 18, wherein the meta-language syntax comprises an extensible markup language.

20. The computer-implemented method of claim 11, wherein at least one product configuration rule of the product configuration rules has a rule type selected from a group of rule types comprising:

a non-conditional rule type, wherein the non-conditional rule type comprises an action statement that is not dependent upon a conditional statement;

a product conditional rule type, wherein the product conditional rule type comprises an action statement dependent upon a conditional statement comprising a product attribute value; and, a customer conditional rule type, wherein the customer conditional rule type comprises an action statement dependent upon a conditional statement comprising a customer attribute value.

21. A computer-implemented system for efficiently displaying selectable attribute values for a product based on a provided criterion, comprising:

at least one memory storage device storing:
a set of product records that identify products potentially selectable by a user, wherein the product records comprise product attributes that represent one or more features of the product, wherein the product attributes comprise one or more attribute values; and
one or more product configuration rules used to define permissible or impermissible product configurations and attributes of the products;

at least one processor programmed to:
analyze at least one product configuration rule to determine whether at least one product attribute of at least one product record is used in evaluating the at least one product configuration rule;
create an attribute binary decision diagram (BDD) structure representative of the at least one product attribute of the least one product record when the at least one processor determines that the at least one product attribute is used in evaluating the at least one product configuration rule; and
evaluate the attribute BDD structure and prepare a customized set of product records for transmission to the user, wherein the customized set of product records contains product attribute values selectable by the user.

22. The computer-implemented system of claim 21, wherein the attribute BDD structure comprises:
an offering attribute node representative of a product attribute value selectable by the user based on evaluating the at least one product configuration rule.

23. The computer-implemented system of claim 21, wherein the attribute BDD structure comprises:

a non-offering attribute node representative of a product attribute value that is not selectable by the user based on evaluating the at least one product configuration rule.

24. The computer-implemented system of claim 21, wherein the at least one processor is further programmed to:
assign a query-language formatted expression to the at least one attribute BDD structure, wherein the query-language formatted expression identifies the location of the product attribute represented by the at least one attribute BDD structure in a corresponding product record; and,
customize at least one customized product record by:
evaluating the query-language formatted expression to locate the at least one attribute in the corresponding product record;
identifying whether a product attribute value for the at least one attribute has a corresponding non-offering node in the least one attribute BDD structure;
including the product attribute value of the at least one attribute of the corresponding product record in the at least one customized product record; and
when the product attribute value of the at least one attribute has a corresponding non-offering node in the at least one attribute BDD structure, identifying that the product attribute value of the at least one customized product record is not selectable by the user.

25. The computer-implemented system of claim 24, wherein the query-language formatted expression is structured to navigate through an electronic document formatted according to an extensible hypertext markup language.

26. The computer-implemented system of claim 21, wherein at least one product record of the set of products records is structured according to a meta-language syntax, wherein the meta-language syntax comprises at least one element of data content and at least one element identifier that describes the type of content of the at least one element of data content.

27. The computer-implemented system of claim 21, wherein the at least one memory storage device is segmented into:
at least one product record repository storing the set of product records, wherein each product record of the set of product records is structured according to a meta-language syntax; and,
at least one product configuration rule repository storing the one or more product configuration rules, wherein the one or more product configuration rules are structured according to the meta-language syntax; wherein:
the meta-language syntax comprises at least one element of data content and at least one element identifier that describes the type of content of the at least one element of data content.

28. The computer-implemented system of claim 27, wherein the meta-language syntax comprises an extensible hypertext markup language.

29. The computer-implemented system of claim 21, wherein at least one product configuration rule of the product configuration rules has a rule type selected from a group of rule types comprising:
a non-conditional rule type, wherein the non-conditional rule type comprises an action statement that is not dependent upon a conditional statement;
a product conditional rule type, wherein the product conditional rule type comprises an action statement dependent upon a conditional statement comprising a product attribute value; and,
a customer conditional rule type, wherein the customer conditional rule type comprises an action statement dependent upon a conditional statement comprising a customer attribute value.

30. A computer-implemented method for efficiently displaying selectable attribute values for a product based on a provided criterion, comprising:
storing in at least one memory storage device:
a set of product records that identify products potentially selectable by a user, wherein the product records comprise product attributes that represent one or more features of the product, wherein the product attributes comprise one or more attribute values; and
one or more product configuration rules used to define permissible or impermissible product configurations and attributes of the products;
analyzing with at least one processor at least one product configuration rule to determine whether at least one product attribute of at least one product record is used in evaluating the at least one product configuration rule;
creating with the at least one processor an attribute binary decision diagram (BDD) structure representative of the at least one product attribute of the least one product record when the at least one processor determines that the at least one product attribute is used in evaluating the at least one product configuration rule;
evaluating with the at least one processor the attribute BDD structure; and
preparing with the at least one processor a customized set of product records for transmission to the user, wherein the customized set of product records contains product attribute values selectable by the user.

31. The computer-implemented method of claim 30, wherein the attribute BDD structure comprises:
an offering attribute node representative of a product attribute value selectable by the user based on evaluating the at least one product configuration rule.

32. The computer-implemented method of claim 30, wherein the attribute BDD structure comprises:
a non-offering attribute node representative of a product attribute value that is not selectable by the user based on evaluating the at least one product configuration rule.

33. The computer-implemented method of claim 30, further comprising:
assigning with the at least one processor a query-language formatted expression to the at least one attribute BDD structure, wherein the query-language formatted expression identifies the location of the product attribute represented by the at least one attribute BDD structure in a corresponding product record; and,
customizing at least one customized product record by:
evaluating the query-language formatted expression to locate the at least one attribute in the corresponding product record;
identifying whether a product attribute value for the at least one attribute has a corresponding non-offering node in the least one attribute BDD structure;
including the product attribute value of the at least one attribute of the corresponding product record in the at least one customized product record; and
when the product attribute value of the at least one attribute has a corresponding non-offering node in the at least one attribute BDD structure, identifying that the product attribute value of the at least one customized product record is not selectable by the user.

34. The computer-implemented method of claim 33, wherein the query-language formatted expression is struc-

49 tured to navigate through an electronic document formatted according to an extensible hypertext markup language.

35. The computer-implemented method of claim 30, wherein at least one product record of the set of products records is structured according to a meta-language syntax, wherein the meta-language syntax comprises at least one element of data content and at least one element identifier that describes the type of content of the at least one element of data content.

36. The computer-implemented method of claim 30, wherein the at least one memory storage device is segmented into:
   at least one product record repository storing the set of product records, wherein each product record of the set of product records is structured according to a meta-language syntax; and,
   at least one product configuration rule repository storing the one or more product configuration rules, wherein the one or more product configuration rules are structured according to the meta-language syntax; wherein:
   the meta-language syntax comprises at least one element of data content and at least one element identifier that describes the type of content of the at least one element of data content.

37. The computer-implemented method of claim 36, wherein the meta-language syntax comprises an extensible hypertext markup language.

38. The computer-implemented method of claim 30, wherein at least one product configuration rule of the product configuration rules has a rule type selected from a group of rule types comprising:
   a non-conditional rule type, wherein the non-conditional rule type comprises an action statement that is not dependent upon a conditional statement;
   a product conditional rule type, wherein the product conditional rule type comprises an action statement dependent upon a conditional statement comprising a product attribute value; and,
   a customer conditional rule type, wherein the customer conditional rule type comprises an action statement dependent upon a conditional statement comprising a customer attribute value.

39. A computer-implemented system for efficiently displaying selectable attribute values for a product based on a provided criterion, comprising:
   at least one memory storage device storing:
      a set of product records that identify products potentially selectable by a user, wherein the product records comprise product attributes that represent one or more features of the product, wherein the product attributes comprise one or more attribute values; and
      a set of product configuration rules used to define permissible or impermissible product configurations and attributes of the products, wherein the set of product configuration rules comprises:
         a non-conditional rule that comprises an action statement that is not dependent upon a conditional statement;
         a product conditional rule that comprises an action statement dependent upon a conditional statement comprising a product attribute value; and,
         a customer conditional rule that comprises an action statement dependent upon a conditional statement comprising a customer attribute value;
   at least one server-side processor programmed to:
      receive a customer attribute value for a customer attribute;

50 prepare a customized product record for transmission to a customer by:
         evaluating the non-conditional rule; and
         evaluating the customer conditional rule using the received customer attribute value as the customer attribute value; and
      prepare a client-side set of product configuration rules, wherein the client-side set of product configuration rules comprises the product conditional rule; and
   at least one client-side processor programmed to:
      receive the client-side set of product configuration rules;
      receive the customized product record;
      receive a selection of a product attribute value for a product attribute of the customized product record;
      evaluate the client-side set of product configuration rules using the received product attribute value as the product attribute value for at least one of the client-side set of product configuration rules; and
      display a product corresponding to the customized product record having a permissible product attribute value based on the evaluation of the client-side set of product configuration rules.

40. The computer-implemented system of claim 39, wherein:
   the set of product configuration rules further comprises:
      a product conditional aggregation rule programmed to perform at least one of an aggregation function or a summation function based on a user selection; and
   the at least one client-side processor is further programmed to:
      evaluate the product conditional aggregation rule, wherein the user selection of the product conditional aggregation rule comprises the received selection of the product attribute value for the product attribute of the customized product record; and
      further display the product corresponding to the customized product record based on the evaluation of the product conditional aggregation rule.

41. The computer-implemented system of claim 39, wherein the at least one product configuration rule of the client-side set of product configuration rules is structured according to a meta-language syntax, wherein:
   the meta-language syntax comprises at least one element of data content and at least one element identifier that describes the type of content of the at least one element of data content.

42. The computer-implemented system of claim 39, wherein the customized product record is structured according to a meta-language syntax, wherein:
   the meta-language syntax comprises at least one element of data content and at least one element identifier that describes the type of content of the at least one element of data content.

43. The computer-implemented system of claim 39, wherein the at least one client-side processor comprises an expansion module that interacts with a client application, wherein the client application transmits a request to the at least one server-side processor for information regarding a product corresponding to at least one product record of the set of product records.

44. The computer-implemented system of claim 39, wherein the at least one server-side processor is further programmed to:
   analyze at least one product configuration rule to determine whether at least one product attribute of at least one product record is used in evaluating the at least one product configuration rule;

create an attribute binary decision diagram (BDD) structure representative of the at least one product attribute of the least one product record when the at least one processor determines that the at least one product attribute is used in evaluating the at least one product configuration rule; and evaluate the attribute BDD structure to further prepare the customized product record.

45. The computer-implemented system of claim 44, wherein the attribute BDD structure comprises:
an offering attribute node representative of a product attribute value selectable by the user based on evaluating the at least one product configuration rule.

46. The computer-implemented system of claim 44, wherein the attribute BDD structure comprises:
a non-offering attribute node representative of a product attribute value that is not selectable by the user based on evaluating the at least one product configuration rule.

47. The computer-implemented system of claim 44, wherein the at least one server-side processor is further programmed to:
assign a query-language formatted expression to the at least one attribute BDD structure, wherein the query-language formatted expression identifies the location of the product attribute represented by the at least one attribute BDD structure in a corresponding product record; and,
customize at least one customized product record by:
evaluating the query-language formatted expression to locate the at least one attribute in the corresponding product record;
identifying whether a product attribute value for the at least one attribute has a corresponding non-offering node in the least one attribute BDD structure;
including the product attribute value of the at least one attribute of the corresponding product record in the at least one customized product record; and
when the product attribute value of the at least one attribute has a corresponding non-offering node in the at least one attribute BDD structure, identifying that the product attribute value of the at least one customized product record is not selectable by the user.

48. The computer-implemented system of claim 47, wherein the query-language formatted expression is structured to navigate through an electronic document formatted according to an extensible hypertext markup language.

49. A computer-implemented method for efficiently displaying selectable attribute values for a product based on a provided criterion, comprising:
storing in at least one memory storage device:
a set of product records that identify products potentially selectable by a user, wherein the product records comprise product attributes that represent one or more features of the product, wherein the product attributes comprise one or more attribute values; and
a set of product configuration rules used to define permissible or impermissible product configurations and attributes of the products, wherein the set of product configuration rules comprises:
a non-conditional rule that comprises an action statement that is not dependent upon a conditional statement;
a product conditional rule that comprises an action statement dependent upon a conditional statement comprising a product attribute value; and,
a customer conditional rule that comprises an action statement dependent upon a conditional statement comprising a customer attribute value;
receiving with at least one server-side processor a customer attribute value for a customer attribute;
preparing with the at least one server-side processor a customized product record for transmission to a customer by:
evaluating the non-conditional rule;
evaluating the customer conditional rule using the received customer attribute value as the customer attribute value; and
preparing a client-side set of product configuration rules, wherein the client-side set of product configuration rules comprises the product conditional rule;
receiving with at least one client-side processor the client-side set of product configuration rules;
receiving with the at least one client-side processor the customized product record;
receiving with the at least one client-side processor a selection of a product attribute value for a product attribute of the customized product record;
evaluating with the at least one client-side processor the client-side set of product conditional rules using the received product attribute value as the product attribute value for the product conditional rule; and
displaying with a display device a product corresponding to the customized product record having a permissible product attribute value based on the evaluation of the product conditional rule.

50. The computer-implemented method of claim 49, wherein:
the set of product configuration rules further comprises:
a product conditional aggregation rule programmed to perform at least one of an aggregation function or a summation function based on a user selection; and
the computer-implemented method further comprises:
evaluating with the client-side processor the product conditional aggregation rule, wherein the user selection of the product conditional aggregation rule comprises the received selection of the product attribute value for the product attribute of the customized product record; and
wherein displaying on the display device comprises displaying the product corresponding to the customized product record based on the evaluation of the product conditional aggregation rule.

51. The computer-implemented method of claim 49, wherein the at least one product configuration rule of the client-side set of product configuration rules is structured according to a meta-language syntax, wherein:
the meta-language syntax comprises at least one element of data content and at least one element identifier that describes the type of content of the at least one element of data content.

52. The computer-implemented method of claim 49, wherein the customized product record is structured according to a meta-language syntax, wherein:
the meta-language syntax comprises at least one element of data content and at least one element identifier that describes the type of content of the at least one element of data content.

53. The computer-implemented method of claim 49, further comprising:
transmitting with the at least one client-side processor a request to the server-side processor for information regarding a product corresponding to at least one product record of the set of product records.

54. The computer-implemented method of claim 49, further comprising:
analyzing with the at least one server-side processor at least one product configuration rule to determine whether at least one product attribute of at least one product record is used in evaluating the at least one product configuration rule;
creating with the at least one server-side processor an attribute binary decision diagram (BDD) structure representative of the at least one product attribute of the least one product record when the at least one server-side processor determines that the at least one product attribute is used in evaluating the at least one product configuration rule; and
evaluating with the at least one server-side processor the attribute BDD structure to further prepare the customized product record.

55. The computer-implemented method of claim 54, wherein the attribute BDD structure comprises:
an offering attribute node representative of a product attribute value selectable by the user based on evaluating the at least one product configuration rule.

56. The computer-implemented method of claim 54, wherein the attribute BDD structure comprises:
a non-offering attribute node representative of a product attribute value that is not selectable by the user based on evaluating the at least one product configuration rule.

57. The computer-implemented method of claim 54, further comprising:
assigning with the at least one server-side processor a query-language formatted expression to the at least one attribute BDD structure, wherein the query-language formatted expression identifies the location of the product attribute represented by the at least one attribute BDD structure in a corresponding product record; and,
customizing with the at least one server-side processor at least one customized product record by:
evaluating the query-language formatted expression to locate the at least one attribute in the corresponding product record;
identifying whether a product attribute value for the at least one attribute has a corresponding non-offering node in the least one attribute BDD structure;
including the product attribute value of the at least one attribute of the corresponding product record in the at least one customized product record; and
when the product attribute value of the at least one attribute has a corresponding non-offering node in the at least one attribute BDD structure, identifying that the product attribute value of the at least one customized product record is not selectable by the user.

58. The computer-implemented method of claim 57, wherein the query-language formatted expression is structured to navigate through an electronic document formatted according to an extensible hypertext markup language.

* * * * *